US011277627B2

(12) United States Patent
Song et al.

(10) Patent No.: US 11,277,627 B2
(45) Date of Patent: Mar. 15, 2022

(54) HIGH-FIDELITY FULL REFERENCE AND HIGH-EFFICIENCY REDUCED REFERENCE ENCODING IN END-TO-END SINGLE-LAYER BACKWARD COMPATIBLE ENCODING PIPELINE

(71) Applicant: Dolby Laboratories Licensing Corporation, San Francisco, CA (US)

(72) Inventors: Qing Song, Sunnyvale, CA (US); Harshad Kadu, Santa Clara, CA (US); Guan-Ming Su, Fremont, CA (US)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

(21) Appl. No.: 17/054,495

(22) PCT Filed: May 9, 2019

(86) PCT No.: PCT/US2019/031620
§ 371 (c)(1),
(2) Date: Nov. 10, 2020

(87) PCT Pub. No.: WO2019/217751
PCT Pub. Date: Nov. 14, 2019

(65) Prior Publication Data
US 2021/0195221 A1  Jun. 24, 2021

Related U.S. Application Data

(60) Provisional application No. 62/720,375, filed on Aug. 21, 2018, provisional application No. 62/670,086, filed on May 11, 2018.

(30) Foreign Application Priority Data

May 11, 2018  (EP) ..................................... 18171795

(51) Int. Cl.
*H04N 19/186* (2014.01)
*H04N 19/105* (2014.01)
(Continued)

(52) U.S. Cl.
CPC ......... *H04N 19/186* (2014.11); *H04N 19/105* (2014.11); *H04N 19/159* (2014.11); *H04N 19/23* (2014.11); *H04N 19/44* (2014.11)

(58) Field of Classification Search
CPC .. H04N 19/186; H04N 19/105; H04N 19/159; H04N 19/23; H04N 19/44; H04N 19/117; H04N 19/154; H04N 19/182
(Continued)

(56) References Cited

U.S. PATENT DOCUMENTS 9,584,701 B2 * 2/2017 Kelly ................... H04N 19/186
10,032,262 B2   7/2018 Kheradmand
(Continued)

FOREIGN PATENT DOCUMENTS

WO  2017165494  9/2017
WO  2018005705  1/2018
(Continued)

OTHER PUBLICATIONS

ITU-R Recommendation ITU-R BT.1886 "Reference Electro-Optical Transfer Function for Flat Panel Displays Used in HDTV Studio Production" Mar. 2011, pp. 1-7.
SMPTE 2084:2014 "High Dynamic Range Electro-Optical Transfer Function of Mastering Reference Displays" Aug. 16, 2014.

*Primary Examiner* — Marnie A Matt

(57) ABSTRACT

3D mapping statistics are generated for a first image of a first dynamic range and a second image of a second dynamic range different from the first dynamic range. Multivariate multiple regression (MMR) coefficients are generated by solving an optimization problem formulated using an MMR matrix built with the 3D mapping statistics without a letter-
(Continued)

box constraint, and used to generate chroma mappings for predicting chroma codeword values of the second image. It is determined whether a letterbox exists in the images. If so, it is determined whether the chroma mappings accurately predict chroma codeword values in the second image. A reconstructed image generated by a recipient device by backward reshaping one of the images is rendered by a display device operating in conjunction with the recipient device.

27 Claims, 16 Drawing Sheets

(51) Int. Cl.
*H04N 19/159* (2014.01)
*H04N 19/23* (2014.01)
*H04N 19/44* (2014.01)

(58) Field of Classification Search
USPC .................................................. 375/240.08
See application file for complete search history.

(56) References Cited

U.S. PATENT DOCUMENTS

| | | | |
|---|---|---|---|
| 10,264,287 B2 | 4/2019 | Wen | |
| 10,575,028 B2 | 2/2020 | Kadu | |
| 10,659,749 B2 | 5/2020 | Kadu | |
| 10,701,375 B2 | 6/2020 | Su | |
| 2010/0002145 A1* | 1/2010 | Spence | G06T 5/40 348/576 |
| 2016/0125579 A1* | 5/2016 | Song | H04N 19/117 382/261 |
| 2016/0373613 A1* | 12/2016 | Kelly | H04N 19/44 |
| 2017/0308996 A1 | 10/2017 | Kadu | |
| 2018/0007356 A1 | 1/2018 | Kadu | |
| 2018/0020224 A1 | 1/2018 | Su | |
| 2018/0098094 A1 | 4/2018 | Wen | |

FOREIGN PATENT DOCUMENTS

| | | |
|---|---|---|
| WO | 2018049335 | 3/2018 |
| WO | 2019169174 | 9/2019 |

* cited by examiner (a) (b)

(a) (b)

```
┌─────────────────────────────────────────────┐
│ generate 3D mapping statistics for a first image of │
│ a first dynamic range and a second image that │
│ corresponds to the first image 4002 │
└─────────────────────────────────────────────┘
                       │
┌─────────────────────────────────────────────┐
│ generate chroma mappings with the 3D mapping │
│ statistics without a letterbox constraint 4004 │
└─────────────────────────────────────────────┘
                       │
┌─────────────────────────────────────────────┐
│ determine whether a letterbox exists 4006 │
└─────────────────────────────────────────────┘
                       │
┌─────────────────────────────────────────────┐
│ if so, determine whether the chroma mappings are │
│ Sufficiently accurate 4008 │
└─────────────────────────────────────────────┘
                       │
┌─────────────────────────────────────────────┐
│ cause a reconstructed image generated at least by │
│ backward reshaping one of the first image or a third │
│ image approximating the second image to be │
│ rendered by a display device 4010 │
└─────────────────────────────────────────────┘
```

FIG. 4D identify, in source HDR images, a set of HDR luma codeword values mapped by luma forward reshaping mappings to a forward reshaped SDR luma codeword value in SDR images generated from the source HDR images via forward reshaping 4022 use the set of HDR luma codeword values to determine a weighted HDR luma codeword value 4024 construct backward reshaping mappings with a backward reshaping luma mapping mapping the forward reshaped SDR luma codeword value to the weighted HDR luma codeword value 4026 cause backward reshaping image metadata generated from the backward reshaping mappings to be provided with the forward reshaped images to a recipient device to render the reconstructed HDR images 4028

*FIG. 4E*

HIGH-FIDELITY FULL REFERENCE AND HIGH-EFFICIENCY REDUCED REFERENCE ENCODING IN END-TO-END SINGLE-LAYER BACKWARD COMPATIBLE ENCODING PIPELINE

CROSS-REFERENCE TO RELATED APPLICATIONS

This patent application claims the benefit of priority from U.S. Provisional Patent Application No. 62/670,086, filed on 11 May 2018; European Patent Application No. 18171795.0, filed on 11 May 2018, and U.S. Provisional Patent Application No. 62/720,375, filed on 21 Aug. 2018, each one incorporated by reference in its entirety.

TECHNOLOGY

The present invention relates generally to images. More particularly, an embodiment of the present invention relates to high-fidelity full reference and high-efficiency reduced reference encoding in end-to-end single-layer backward compatible encoding pipeline(s).

BACKGROUND

As used herein, the term "dynamic range" (DR) may relate to a capability of the human visual system (HVS) to perceive a range of intensity (e.g., luminance, luma) in an image, e.g., from darkest blacks (darks) to brightest whites (highlights). In this sense, DR relates to a "scene-referred" intensity. DR may also relate to the ability of a display device to adequately or approximately render an intensity range of a particular breadth. In this sense, DR relates to a "display-referred" intensity. Unless a particular sense is explicitly specified to have particular significance at any point in the description herein, it should be inferred that the term may be used in either sense, e.g. interchangeably.

As used herein, the term high dynamic range (HDR) relates to a DR breadth that spans the some 14-15 or more orders of magnitude of the human visual system (HVS). In practice, the DR over which a human may simultaneously perceive an extensive breadth in intensity range may be somewhat truncated, in relation to HDR. As used herein, the terms enhanced dynamic range (EDR) or visual dynamic range (VDR) may individually or interchangeably relate to the DR that is perceivable within a scene or image by a human visual system (HVS) that includes eye movements, allowing for some light adaptation changes across the scene or image. As used herein, EDR may relate to a DR that spans 5 to 6 orders of magnitude. Thus while perhaps somewhat narrower in relation to true scene referred HDR, EDR nonetheless represents a wide DR breadth and may also be referred to as HDR.

In practice, images comprise one or more color components (e.g., luma Y and chroma Cb and Cr) of a color space, where each color component is represented by a precision of n-bits per pixel (e.g., n=8). Using non-linear luminance coding (e.g., gamma encoding), images where n≤8 (e.g., color 24-bit JPEG images) are considered images of standard dynamic range, while images where n>8 may be considered images of enhanced dynamic range.

A reference electro-optical transfer function (EOTF) for a given display characterizes the relationship between color values (e.g., luminance) of an input video signal to output screen color values (e.g., screen luminance) produced by the display. For example, ITU Rec. ITU-R BT. 1886, "Reference electro-optical transfer function for flat panel displays used in HDTV studio production," (March 2011), which is incorporated herein by reference in its entirety, defines the reference EOTF for flat panel displays. Given a video stream, information about its EOTF may be embedded in the bitstream as metadata. The term "metadata" herein relates to any auxiliary information transmitted as part of the coded bitstream and assists a decoder to render a decoded image. Such metadata may include, but are not limited to, color space or gamut information, reference display parameters, and auxiliary signal parameters, as those described herein.

The term "PQ" as used herein refers to perceptual luminance amplitude quantization. The human visual system responds to increasing light levels in a very nonlinear way. A human's ability to see a stimulus is affected by the luminance of that stimulus, the size of the stimulus, the spatial frequencies making up the stimulus, and the luminance level that the eyes have adapted to at the particular moment one is viewing the stimulus. In some embodiments, a perceptual quantizer function maps linear input gray levels to output gray levels that better match the contrast sensitivity thresholds in the human visual system. An example PQ mapping function is described in SMPTE ST 2084:2014 "High Dynamic Range EOTF of Mastering Reference Displays" (hereinafter "SMPTE"), which is incorporated herein by reference in its entirety, where given a fixed stimulus size, for every luminance level (e.g., the stimulus level, etc.), a minimum visible contrast step at that luminance level is selected according to the most sensitive adaptation level and the most sensitive spatial frequency (according to HVS models).

Displays that support luminance of 200 to 1,000 cd/m$^2$ or nits typify a lower dynamic range (LDR), also referred to as a standard dynamic range (SDR), in relation to EDR (or HDR). EDR content may be displayed on EDR displays that support higher dynamic ranges (e.g., from 1,000 nits to 5,000 nits or more). Such displays may be defined using alternative EOTFs that support high luminance capability (e.g., 0 to 10,000 nits). An example of such an EOTF is defined in SMPTE. As appreciated by the inventors here, improved techniques for encoding and decoding video data that can be used to support display capabilities of a wide variety of SDR and HDR display devices are desired.

The approaches described in this section are approaches that could be pursued, but not necessarily approaches that have been previously conceived or pursued. Therefore, unless otherwise indicated, it should not be assumed that any of the approaches described in this section qualify as prior art merely by virtue of their inclusion in this section. Similarly, issues identified with respect to one or more approaches should not assume to have been recognized in any prior art on the basis of this section, unless otherwise indicated.

BRIEF DESCRIPTION OF THE DRAWINGS

An embodiment of the present invention is illustrated by way of example, and not in way by limitation, in the figures of the accompanying drawings and in which like reference numerals refer to similar elements and in which:

FIG. 4D through FIG. 4G illustrate example process flows.

DESCRIPTION OF EXAMPLE EMBODIMENTS

Figure 1:
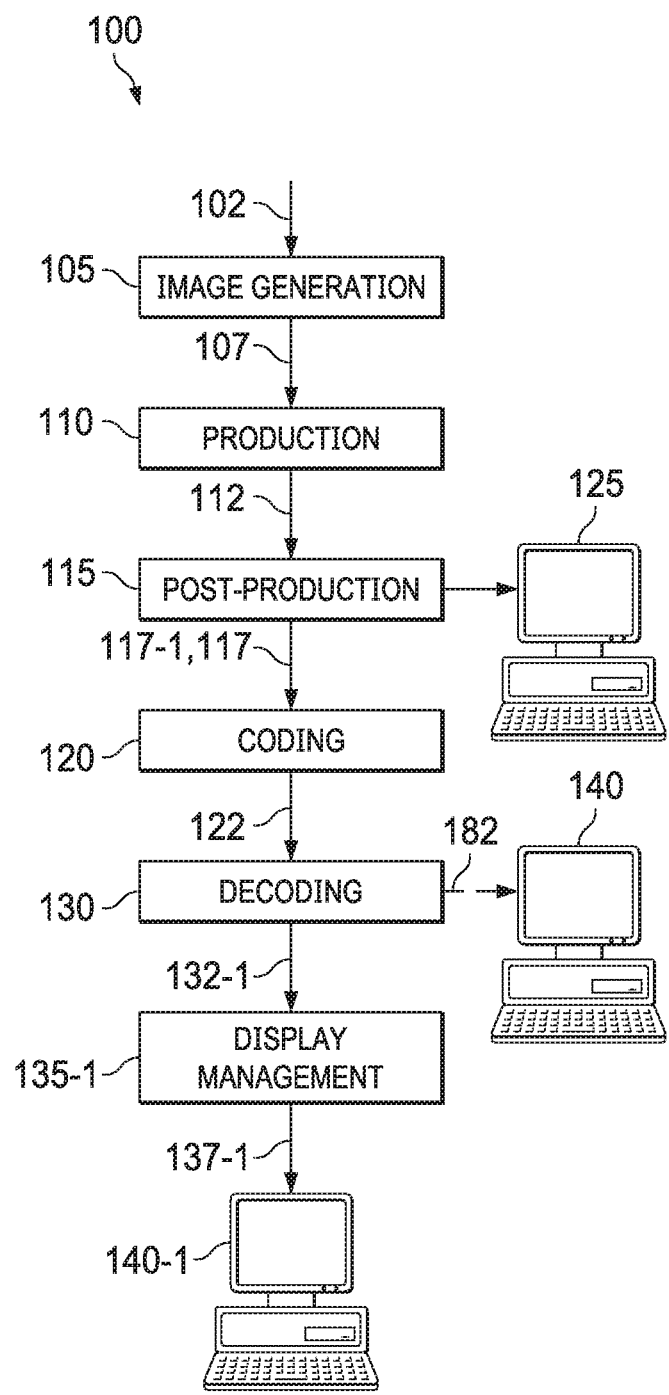
FIG. 1 depicts an example process of a video delivery pipeline.

High-fidelity full reference (HFFR) and high-efficiency reduced reference (HERR) encoding in end-to-end single-layer backward compatible encoding pipeline(s) is described herein. In the following description, for the purposes of explanation, numerous specific details are set forth in order to provide a thorough understanding of the present invention. It will be apparent, however, that the present invention may be practiced without these specific details. In other instances, well-known structures and devices are not described in exhaustive detail, in order to avoid unnecessarily occluding, obscuring, or obfuscating the present invention.

Overview

Example embodiments described herein relate to encoding image data. 3D mapping statistics are generated for a first image of a first dynamic range and a second image that corresponds to the first image. The second image is of a second dynamic range different from the first dynamic range. Multivariate multiple regression (MMR) coefficients are generated by solving an optimization problem formulated using an MMR matrix built at least in part with the 3D mapping statistics without a letterbox constraint. The MMR coefficients are used to generate chroma mappings for predicting chroma codeword values of the second image. It is determined whether a letterbox exists in at least one of the first image or the second image. In response to determining that a letterbox exists in at least one of the first image or the second image, it is determined whether the chroma mappings generated from solving the unconstrained optimization problem accurately predict chroma codeword values in the second image. One of the first image or a third image approximating the second image is provided to a recipient device to cause a reconstructed image generated at least by backward reshaping the one of the first image or a third image approximating the second image is caused to be rendered by a display device operating in conjunction with the recipient device.

Example embodiments described herein relate to encoding image data. A set of one or more HDR luma codeword values that are mapped by luma forward reshaping mappings to a forward reshaped standard dynamic range (SDR) luma codeword value in one or more SDR images generated from one or more source HDR images via forward reshaping based at least in part on the luma forward reshaping mappings is identified in the one or more source HDR images. The set of one or more HDR luma codeword values is used to determine a weighted HDR luma codeword value. Backward reshaping mappings are constructed to comprise at least a backward reshaping luma mapping that maps the forward reshaped SDR luma codeword value to the weighted HDR luma codeword value. The backward reshaping mappings are used to backward reshape the one or more reshaped SDR images into one or more reconstructed HDR images to approximate the one or more source HDR images. Backward reshaping image metadata is generated at least in part from the backward reshaping mappings to be provided with the one or more forward reshaped images to a recipient device to render the one or more reconstructed HDR images.

Example embodiments described herein relate to decoding image data. A video signal comprising backward reshaping image metadata to generate a reconstructed image of a first dynamic range is received. The reconstructed image is to approximate a first image of the first dynamic range. The reconstructed image is to be generated by backward reshaping, based on the backward reshaping image metadata, a second image of a second dynamic range different from the first dynamic range. The second image corresponds to the first image. The backward reshaping image metadata comprises chroma mappings generated from MMR coefficients. The MMR coefficients are generated by solving an optimization problem formulated using an MMR matrix built at least in part from three-dimensional (3D) mapping statistics that are generated for the first image and the second image that corresponds to the first image. The second image is decoded from the video signal. The second image of the second dynamic range is backward reshaped, based on the backward reshaping image metadata to generate the reconstructed image of the first dynamic range. The reconstructed image is caused to be rendered by a display device.

Example embodiments described herein relate to decoding image data. A video signal comprising backward reshaping image metadata to generate one or more reconstructed high dynamic range (HDR) images is received. The one or more reconstructed HDR images are to approximate one or more source HDR images. The one or more reconstructed HDR images are to be generated by backward reshaping, based on the backward reshaping image metadata, one or more forward reshaped SDR images corresponding to the one or more source HDR images. The backward reshaping image metadata is generated at least in part from backward reshaping mappings that comprise at least a backward reshaping luma mapping that maps a forward reshaped SDR luma codeword value in the one or more forward reshaped SDR images to a weighted HDR luma codeword value. A set of one or more HDR luma codeword values is used to determine the weighted HDR luma codeword value. The set of one or more HDR luma codeword values is identified in the one or more source HDR images. Each HDR luma codeword value in the set of one or more HDR luma codeword values in the one or more source HDR images is mapped by luma forward reshaping mappings to the forward reshaped SDR luma codeword value in the one or more forward reshaped SDR images. The one or more forward reshaped SDR images are generated from the one or more source HDR images via forward reshaping based at least in part on the luma forward reshaping mappings. The one or more forward reshaped SDR images are decoded from the video signal. The one or more forward reshaped images are backward reshaped, based on the backward reshaping image metadata to generate the one or more reconstructed HDR images. The one or more reconstructed HDR images are caused to be rendered by a display device.

Example Video Delivery Processing Pipeline

FIG. 1 depicts an example process of a video delivery pipeline (100) showing various stages from video capture to video content display. A sequence of video frames (102) is captured or generated using image generation block (105). Video frames (102) may be digitally captured (e.g. by a digital camera) or generated by a computer (e.g. using computer animation) to provide video data (107). Alternatively, video frames (102) may be captured on film by a film camera. The film is converted to a digital format to provide the video data (107). In a production phase (110), the video data (107) is edited to provide a video production stream (112).

The video data of the production stream (112) is then provided to a processor for post-production editing (115). The post-production editing (115) may include adjusting or modifying colors or brightness in particular areas of an image to enhance the image quality or achieve a particular appearance for the image in accordance with the video creator's creative intent. This is sometimes called "color timing" or "color grading." Other editing (e.g. scene selection and sequencing, manual and/or automatic scene cut information generation, image cropping, addition of computer-generated visual special effects, etc.) may be performed at the post-production editing (115) to yield a release version of HDR images (117-1) or SDR (or relatively narrow dynamic range) images (117) (e.g., SDR, etc.). In some embodiments, during post-production editing (115), the HDR images (117-1) are viewed on a reference HDR display that supports the high dynamic range by a colorist who is performing post-production editing operations on the HDR images (117-1). Additionally, optionally or alternatively, during post-production editing (115), the SDR images (117) are viewed on a reference display (125) that supports the standard dynamic range (or a relatively narrow dynamic range) by a colorist who is performing post-production editing operations on the SDR images (117). Additionally, optionally or alternatively, the SDR images (117) may be content mapped from the HDR images (117-1).

Figure 2A:
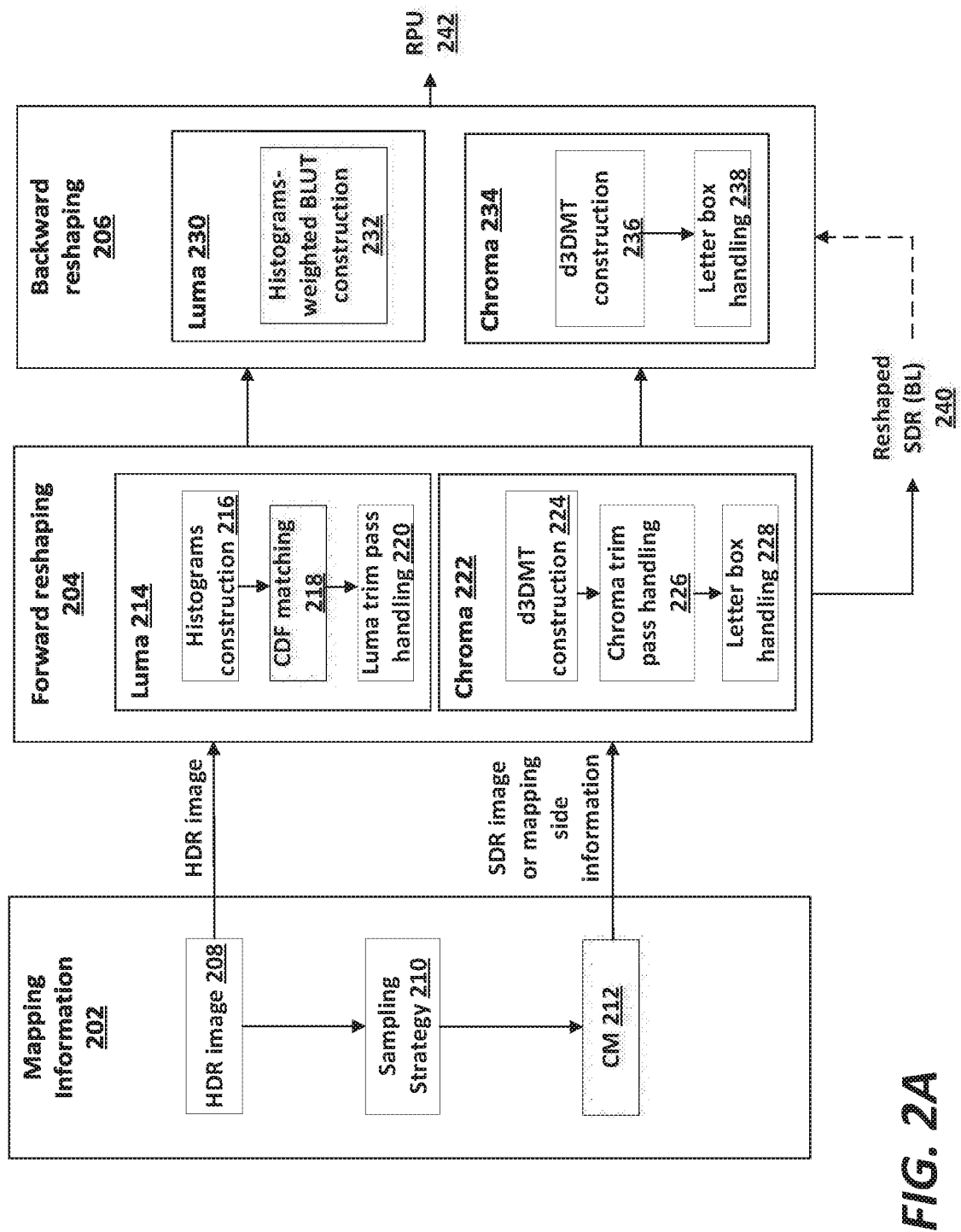
FIG. 2A illustrates an overall view of an example end-to-end single-layer-backward-compatible (SLBC) encoding pipeline.
Figure 2B:
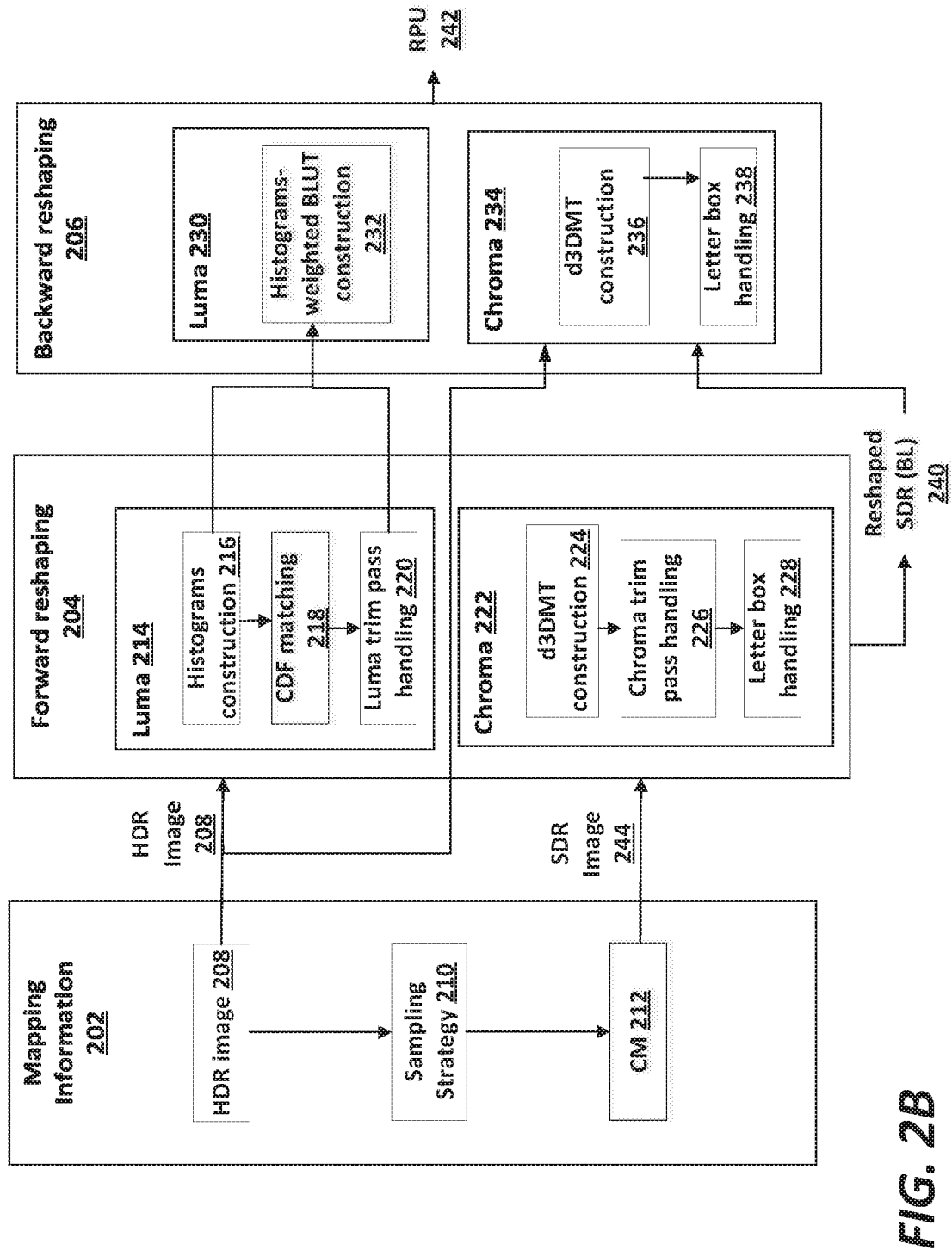
FIG. 2B illustrates an example end-to-end SLBC encoding pipeline operating in a high-fidelity full reference mode.
Figure 2C:
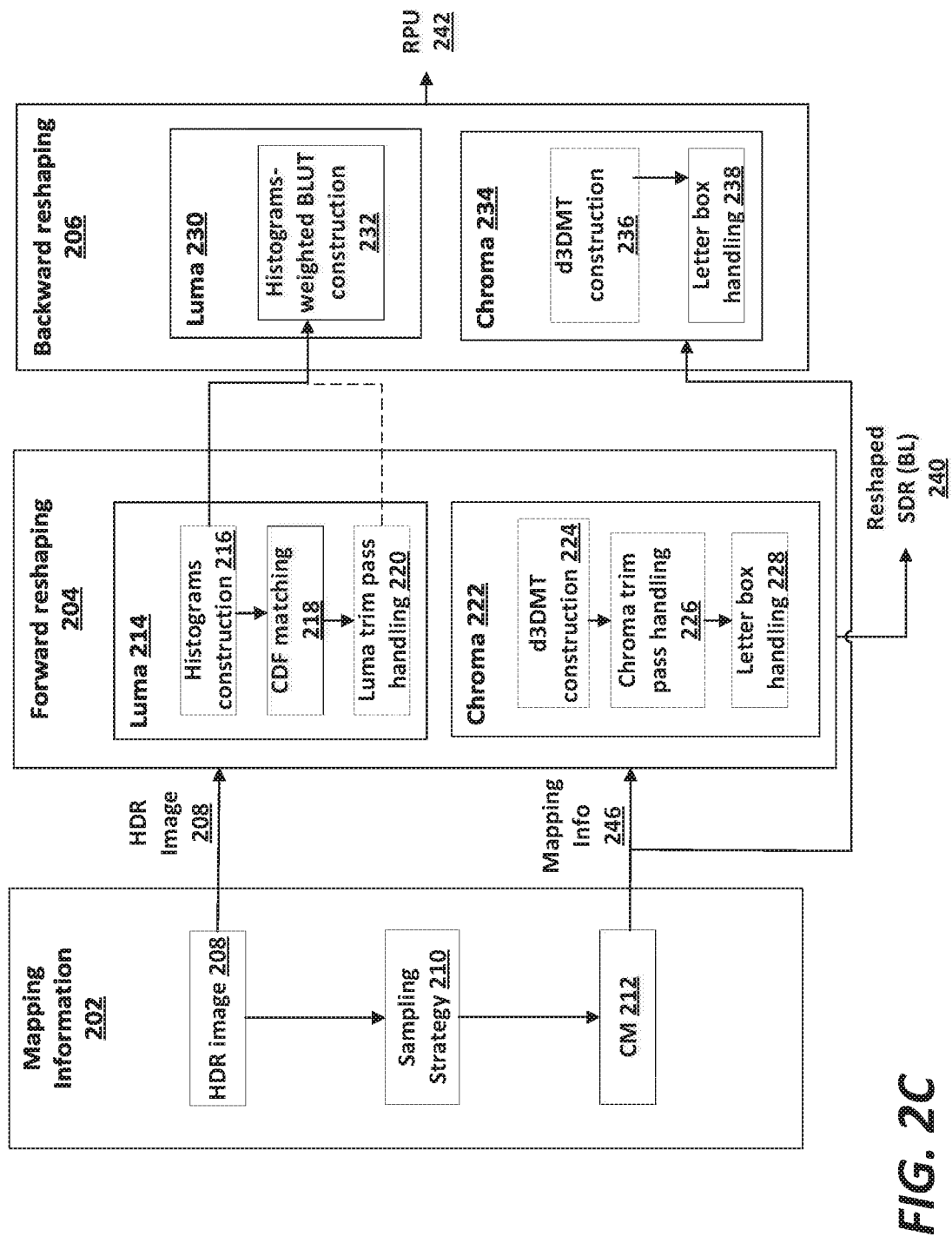
FIG. 2C illustrates an example end-to-end SLBC encoding pipeline operating in a high-efficiency reduced reference mode.

In some embodiments, the coding block (120) may implement high-fidelity full reference and high-efficiency reduced reference encoding in end-to-end single-layer backward compatible encoding pipeline(s) such as illustrated in FIG. 2A through FIG. 2C. The coding block (120) receives the HDR images (117-1) from the post-production editing (115), and forward reshapes the HDR images (117-1) into (forward) reshaped SDR images.

The reshaped SDR images can be compressed/encoded by the coding block (120) into a coded bitstream (122), for example in a single layer. In some embodiments, the coding block (120) may include audio and video encoders, such as those defined by ATSC, DVB, DVD, Blu-Ray, and other delivery formats, to generate the coded bitstream (122).

The reshaped SDR images may be encoded into video data in a video signal (e.g., an 8-bit SDR video signal, a 10-bit SDR video signal, etc.) that is backward compatible with a wide variety of SDR display devices (e.g., SDR displays, etc.). In a non-limiting example, the video signal encoded with the reshaped SDR images may be a single-layer backward compatible video signal. Here, a "single-layer backward compatible video signal" may refer to a video signal that carries SDR images that are specifically optimized or color graded for SDR displays in a single signal layer.

In some embodiments, the coded bitstream (122) outputted by the coding block (120) may represent an output 8-bit SDR YCbCr video signal with the image metadata including but not limited to composer metadata as generated by the coding block (120). The composer metadata (or backward reshaping mappings) can be used by downstream decoders to perform backward reshaping (e.g., inverse tone mapping, etc.) on the reshaped SDR images in order to generate backward reshaped images that may be optimized for rendering on an HDR reference display. In some embodiments, the backward reshaped images may be generated from the reshaped SDR images (or a decoded version thereof) using one or more SDR-to-HDR conversion tools implementing inverse tone mapping based at least in part on the composer metadata. A used herein, backward reshaping refers to image processing operations that convert re-quantized images back to the original EOTF domain (e.g., gamma, PQ, hybrid log gamma or HLG, etc.), for further downstream processing, such as the display management. Example backward reshaping operations are described in U.S. Provisional Application Ser. No. 62/136,402, filed on Mar. 20, 2015, (also published on Jan. 18, 2018, as U.S. Patent Application Publication Ser. No. 2018/0020224), the entire contents of which are hereby incorporated by reference as if fully set forth herein.

Additionally, optionally, or alternatively, the coded bit stream (122) is further encoded with image metadata including but not limited to display management (DM) metadata that can be used by the downstream decoders to perform display management operations on the backward reshaped images for the HDR reference displays to generate display images optimized for rendering on other displays such as non-reference HDR displays, etc.

The coded bitstream (122) is then delivered downstream to receivers such as decoding and playback devices, media source devices, media streaming client devices, television sets (e.g., smart TVs, etc.), set-top boxes, movie theaters, and the like. In a receiver (or a downstream device), the coded bitstream (122) is decoded by decoding block (130) to generate decoded images 182, which may be the same as the reshaped SDR images, subject to quantization errors generated in compression performed by the coding block (120) and decompression performed by the decoding block (130).

In operational scenarios in which the receiver operates with (or is attached to) a target display 140 that supports the standard dynamic range or a relatively narrow dynamic range comparable with or less than the standard dynamic range, the decoding block (130) can decode the reshaped SDR images from (e.g., the single layer in, etc.) the coded bitstream (122), and use the decoded reshaped SDR images directly or indirectly for rendering on the target display (140). In embodiments in which the target display (140) is of similar characteristics as the SDR reference display (125), the reshaped SDR images can be directly watchable on the target display (140).

In some embodiments, the receiver operates with (or is attached to) a HDR target display 140-1 that supports a high dynamic range (e.g., 400 nits, 1000 nits, 4000 nits, 10000 nits or more, etc.) can extract the composer metadata from (e.g., the metadata container in, etc.) the coded bitstream (122), use the composer metadata to compose backward reshaped images 132-1 from the reshaped SDR images by backward reshaping the reshaped SDR images based on the composer metadata, and use the backward reshaped images (132-1) directly or indirectly for rendering on the HDR target display (140-1).

The backward reshaped images (132-1) may be optimized for viewing on a HDR reference display that is not the same but rather is comparable with—for example, supports a maximum or peak luminance value greater than that of—the HDR target display (140-1). A display management block (e.g., 135-1, etc.)—which may be in the receiver, in the HDR target display (140-1), or in a separate device—further adjusts the backward reshaped images (132-1) to characteristics of the HDR target display (140-1) by generating a display-mapped signal (137-1) adapted to the characteristics of the HDR target display (140-1).

Codec Architecture(s)

A goal for implementing a HFFR encoding architecture for an end-to-end SLBC encoding pipeline is to achieve a relatively high (e.g., the highest, etc.) fidelity to input reference images. In some operational scenarios, the HFFR encoding architecture can be incorporated into, or implemented as a part of, a studio's workflow to work with image content with heavy trim pass usage and to preserve artist intent (e.g., meet or relatively closely approximate colorist intent, etc.) represented in the image content.

In addition, a HERR encoding architecture is also described herein. The HERR encoding architecture may be implemented at least in part by using a subset of coding tools in the HFFR architecture possibly with reduced supports for some features provided by the HFFR encoding architecture. The HERR encoding architecture may be used to trade off a relatively small amount of quality degradation for a relatively low (e.g., the lowest, etc.) computation cost/time. The HERR encoding architecture may be applied to computation-limited platforms, such as mobile devices, lightweight broadcasting, delay sensitive media consumption applications, and so forth.

FIG. 2A illustrates an overall view of an example end-to-end SLBC encoding pipeline, which comprises a mapping information stage (or module) 202 for generating HDR-to-SDR mapping information (e.g., to be used in HERR operations, etc.), a forward reshaping stage (or module) 204 for generating a revertible SDR image (or a forward reshaped SDR image 240) which looks as close to a reference SDR image as possible, a backward reshaping stage (or module) 206 for generating image metadata (denoted as "RPU" or "rpu") that may be used by a recipient device to reconstruct an HDR image (e.g., backward reshaped from the revertible SDR, etc.) that looks as close to a reference HDR image (e.g., corresponding to the revertible SDR image, etc.) as possible.

An end-to-end SLBC encoding pipeline as described herein may be implemented by more or fewer processing blocks. By way of illustration but not limitation, some or all blocks marked with dotted line, as illustrated in FIG. 2B and FIG. 2C, may be optional depending on whether the encoding architecture is HFFR or HERR.

Depending on the information provided by the mapping information stage (202), there may be two different ways to perform forward/backward reshaping.

FIG. 2B illustrates an example end-to-end SLBC encoding pipeline operating in a HFFR mode. In this mode, (e.g., complete, etc.) reference HDR images and (e.g., complete, etc.) reference SDR images may be provided by the mapping information stage (202) to the forward reshaping stage (204). Thus, (e.g., the most comprehensive, the richest, etc.) information about what the final reconstructed SDR and HDR images should look like or closely approximate is available by way of these reference HDR and reference SDR images. The information can be used by the encoding pipeline, or the forward reshaping stage (204) and the backward reshaping stage (206) therein, to generate reshaped SDR images and accompanying image metadata that can be used by recipient devices to reconstruct SDR and HDR images with a relatively high (e.g., the highest, etc.) video quality.

Image processing operations in the HFFR mode may make use of, or may be applied to, each pixel in a relatively large number of pixels (e.g., all pixels, all pixels of a salient part, etc.) in each of the reference SDR images and/or the reference HDR images corresponding to the reference SDR images. For example, content mapping (CM) 212 that generates the reference SDRs from the reference HDRs may operate with a sampling strategy 210 which may cause content mapping to operate for every single pixel of the reference SDRs and/or the reference HDRs, and thus can incur a relatively large amount of computation costs. Thus, the CM (212) can be applied to every pixel of an HDR image 208 to generate a reference SDR image 244.

A relatively large amount of bandwidth resource between the mapping information stage (202) and the forward reshaping stage (204) may be provisioned to accommodate sending the (e.g., entire, etc.) reference SDR images from the mapping information stage (202) to the forward reshaping stage (204).

The forward reshaping stage (204) may be used to condense or distill the reference SDR images into image metadata. The image metadata derived from the reference SDR images, instead of the pixel information of the reference SDR images directly, can be used to facilitate constructing reshaping functions.

The forward reshaping stage (204) may comprise a luma forward reshaping part 214 and a chroma forward reshaping part 222. The luma forward reshaping part (214) comprises a histogram construction block 216, a cumulative density function (CDF) matching block 218, a luma trim pass handling block 220, etc. The chroma forward reshaping part (222) comprises a dynamic 3D mapping table (d3DMT) construction block 224, a chroma trim pass handling block 226, a letterbox handling block 228, etc.

In the luma forward reshaping part (214), 1D luma histograms of both the reference HDR image (208) and the reference SDR image (244) are respectively constructed by the histogram construction block (216) from these images. A FLUT may be built by the CDF matching block (218) for forward reshaping (HDR) luma codewords in the reference HDR image (208) to reshaped (SDR) luma codewords in a reshaped SDR image 240 (which may be provided in a coded bitstream to a recipient device or a receiver operating with a display device). Example CDF matching operations are described in PCT Application No. PCT/US2017/50980, filed on Sep. 11, 2017; U.S. Provisional Application Ser. No. 62/404,307, filed on Oct. 5, 2016, (also published in Apr. 5, 2018, as U.S. Patent Application Publication Ser. No. 2018/0098094), the entire contents of which are hereby incorporated by reference as if fully set forth herein.

In some operational scenarios, trim pass operations performed as a part of content mapping (e.g., the CM (212), etc.) from the reference HDR image (208) to the reference SDR image (244) may cause the reference SDR image (244) to lose image information that can be used to generate correct luminances (or image details) in the reconstructed HDR image. The luma trim pass handling block (220) may be used to help build the FLUT in a way that avoids loss of image details in a reconstructed HDR image that is to be constructed by a recipient device from the reshaped SDR image (240). Example trim pass detection and correction for luma are described in U.S. Patent Application Publication No. 2018/0007356, published on Jan. 4, 2018, the entire contents of which are hereby incorporated by reference as if fully set forth herein.

In the chroma forward reshaping part (222), A d3DMT is built by the d3DMT construction block (224) from the reference HDR image (208) and the reference SDR image (244) for forward reshaping chroma codewords in the reference HDR image (208) to reshaped chroma codewords in the reshaped SDR image (240) to achieve a relatively high (e.g., the highest, etc.) fidelity of perceived color. In some operational scenarios, trim pass operations performed as a part of content mapping (e.g., the CM (212), etc.) from the reference HDR image (208) to the reference SDR image (244) may cause the reference SDR image (244) to lose image information that can be used to generate accurate colors in the reconstructed HDR image. The chroma trim pass handling block (226) may be used to help build the d3DMT in a way that avoids color loss (or loss of color accuracy) in the reshaped SDR image (240) and/or reconstructed HDR image. The letterbox handling block (228) can be used to handle any letterbox that may exists in the reference HDR image (208) to help ensure the d3DMT to generate correct colors in the reshaped SDR image (240) and/or the reconstructed HDR image.

The backward reshaping stage (206) may comprise a luma backward reshaping part 230 and a chroma backward reshaping part 234. The luma backward reshaping part (230) comprises a histogram weighted BLUT construction block 232, etc. The chroma backward reshaping part (234) comprises a dynamic 3D mapping table (d3DMT) construction block 236, a letterbox handling block 238, etc.

In the luma backward reshaping part (230), the histogram weighted BLUT construction block (232) may apply a histograms-weighted method to construct the BLUT for backward reshaping (SDR) luma codewords in the reshaped SDR image (240) to reconstructed (HDR) luma codewords in the reconstructed HDR image. Thus, in building a CDF transfer function that accumulates probability for mappings between codewords, weighted codewords are used. Example CDF transfer function are described in the previously mentioned U.S. Provisional Application Ser. No. 62/404,307.

In the chroma backward reshaping part (234), another d3DMT is constructed by the d3DMT construction block (236) from the reshaped SDR image (240) and the reference HDR image (208) for backward reshaping chroma codewords in the reshaped SDR image (240) to reconstructed chroma codewords in the reconstructed HDR image to achieve a relatively high (e.g., the highest, etc.) fidelity of perceived color. The letterbox handling block (238) can be used to handle any letterbox that may exists in the reshaped SDR image (240) to help ensure the d3DMT to generate correct colors in the reconstructed HDR image.

Backward reshaping image metadata comprising (or specifying) the BLUT and the d3DMT may be outputted in the coded bitstream as a part of image metadata (e.g., RPU 242, etc.) accompanying the reshaped SDR image (240).

FIG. 2C illustrates an example end-to-end SLBC encoding pipeline operating in a HERR mode. In this mode, only (e.g., complete, etc.) reference HDR images but no reference SDR images may be provided by the mapping information stage (202) to the forward reshaping stage (204). Instead of providing the reference SDR images, mapping side information condensed/distilled/derived for SDR images generated from content mapping the reference HDR images may be provided by the mapping information stage (202) to the forward reshaping stage (204). In some embodiments, the mapping side information may comprise a 3D-LUT, flat mapping tables, histograms, etc. Video quality of a reshaped SDR image (e.g., 240, etc.) and/or a reconstructed HDR image generated by backward reshaping the reshaped SDR image (240) may be impacted due to incomplete information received by the forward reshaping stage (204) and/or the backward reshaping stage (206) from the mapping information stage (202).

In the mapping information stage (202), based at least in part on the sampling strategy (210), a 3D sampling grid (e.g., a rectilinear 3D grid, a sparse 3D grid, a 3D grid with even or uneven distribution/density of vertices, etc.) may be constructed. In various embodiments, sampling points may or may not be selected based on 3D sampling grid. In some embodiments, sampling points may be selected based on a density distribution; for example the sampling points are selected according to whether the color present in the picture as indicated in the density distribution. The CM (212) may be used to generate (e.g., only, etc.) sampled content mappings from HDR sampled points to SDR sampled points. The sampled content mappings may represent a small (proper) subset of content mappings at a relatively small number of sampled points (e.g., 10,000 sampled points, etc.) from all HDR pixels (e.g., 2 million pixels or more for an image of a 1920×1080 spatial resolution, etc.) to corresponding SDR pixels, and thus is much lighter to generate than all content mappings for all pixels.

A relatively small amount of bandwidth resource between the mapping information stage (202) and the forward reshaping stage (204) may be provisioned to accommodate sending mapping side information 246—which comprises information generated from the content mappings for selected sampled points—from the mapping information stage (202) to the forward reshaping stage (204).

In the HERR mode, as mapping side information (e.g., content mapping information, etc.) between HDR and SDR has been captured by the mapping information stage (202) at the selected sampled points, in the forward reshaping stage (204), no computation is performed for constructing or deriving content mapping information in the pixel domain (e.g., for each of some or all pixels of a given image, etc.). As a result, CPU and memory usages can be reduced in image processing operations in this mode.

A chroma backward reshaping function (e.g., MMR coefficients, etc.) can be constructed in parallel with the construction of a chroma forward reshaping function, as the same mapping side information (246) as provided by the mapping information stage (202) may be used (e.g., concurrently, in any order, etc.) by both the forward reshaping stage (204) and the backward reshaping stage (206).

Some processing blocks used in the HFFR mode such as the luma trim pass handling block (220), the chroma trim pass handling block (226), the d3DMT construction blocks (224 and 236), etc., can be turned off (or removed in some operational scenarios in which the HFFR mode does not need to be supported). In the encoding architecture for the HERR mode, content mapping is not applied to every pixel of the reference HDR image (208). In some embodiments, a 3D sampling grid is used to select sampled points. Content mapping may be performed with respect to the sampled points. HDR samples (or pixel values at the HDR sampled points) and mapped SDR samples (or pixel values at the SDR sampled points) as generated by content mapping the HDR samples can be sent by the mapping information stage (202) to the forward reshaping stage (204) and/or the backward reshaping stage (206). The HDR samples and their corresponding content mapped SDR samples can be represented as a plurality of HDR-SDR mapping pairs and captured in the mapping side information (246). Not only computations at the latter forward and backward reshaping stages (204 and 206) but also computations at the mapping information stage (202) can be saved or reduced.

In the forward reshaping stage (204), luma histograms of HDR and SDR can be constructed (or restored) by the histogram construction block (216) from the sparse-sampled mapping side information (246). A forward reshaping lookup table (FLUT) may be built by the CDF matching block (218) for forward reshaping (HDR) luma codewords in the reference HDR image (208) to reshaped (SDR) luma codewords in a reshaped SDR image 240 (which may be provided in a coded bitstream to a recipient device or a receiver operating with a display device). Luma trim pass handling may not be performed in the HERR mode.

In the chroma forward reshaping part (222), chroma reshaping MMR coefficients can be generated directly from the mapping side information (246) received from the mapping information stage (202) is used directly to generate the chroma reshaping MMR coefficients. Example MMR coefficient generation operations are described in the previously mentioned U.S. Provisional Application Ser. No. 62/404, 307.

The FLUT and the MMR coefficients can then be applied in the forward reshaping stage (204) to forward reshape luma and chroma codewords in the reference HDR image (208) to forward reshaped luma and chroma codewords in a reshaped SDR image.

In the backward reshaping stage (206), a BLUT for luma backward reshaping is constructed by the histograms-weighted BLUT construction block (232) using a histograms-weighted method. The mapping side information (246) is used to generate backward reshaping MMR coefficients for chroma backward reshaping. Backward reshaping image metadata (denoted as RPU (242)) specifying the backward reshaping MMR coefficients and the BLUT can be written into or included by a coded bitstream that is encoded with the forward reshaped SDR image (240).

In the HERR mode, a d3DMT is constructed in neither the forward reshaping stage (204) nor the backward reshaping stage (206), as the mapping side information (246) already includes mappings between HDR (luma and chroma) codewords and SDR (luma and chroma) codewords. The generation of the chroma forward reshaping MMR coefficients can be processed in parallel or in any order with the generation of the chroma backward reshaping MMR coefficients, based on the mapping side information (246) from the mapping information stage (202), as there is no dependency between these two generation operations.

In summary, techniques as described herein may be used to support an end-to-end encoding pipeline operating in a high-fidelity full reference mode with a number of high-fidelity coding tools. Luma reshaping operations may be implemented in a way that eliminates or avoids letterbox brightening and block vanishing problems. Chroma reshaping operations may be implemented in a way that eliminates or avoids problems such as color artifacts, letterbox color issues, and color loss caused by severe trim pass operations, etc.

Additionally, optionally or alternatively, techniques as described herein may be used to support an end-to-end encoding pipeline operating in a high-efficiency reduced reference mode with relatively low-cost encoding tools in terms of computing resources incurred to generate reshaped SDR images and backward reshaping image metadata. FLUTs may be efficiently constructed with sparse sampled d3DMTs from the mapping information stage (202). Chroma reshaping MMR coefficients for both forward reshaping and backward reshaping can be performed in parallel to reduce latencies or delays in the end-to-end encoding pipeline.

Figure 2D:
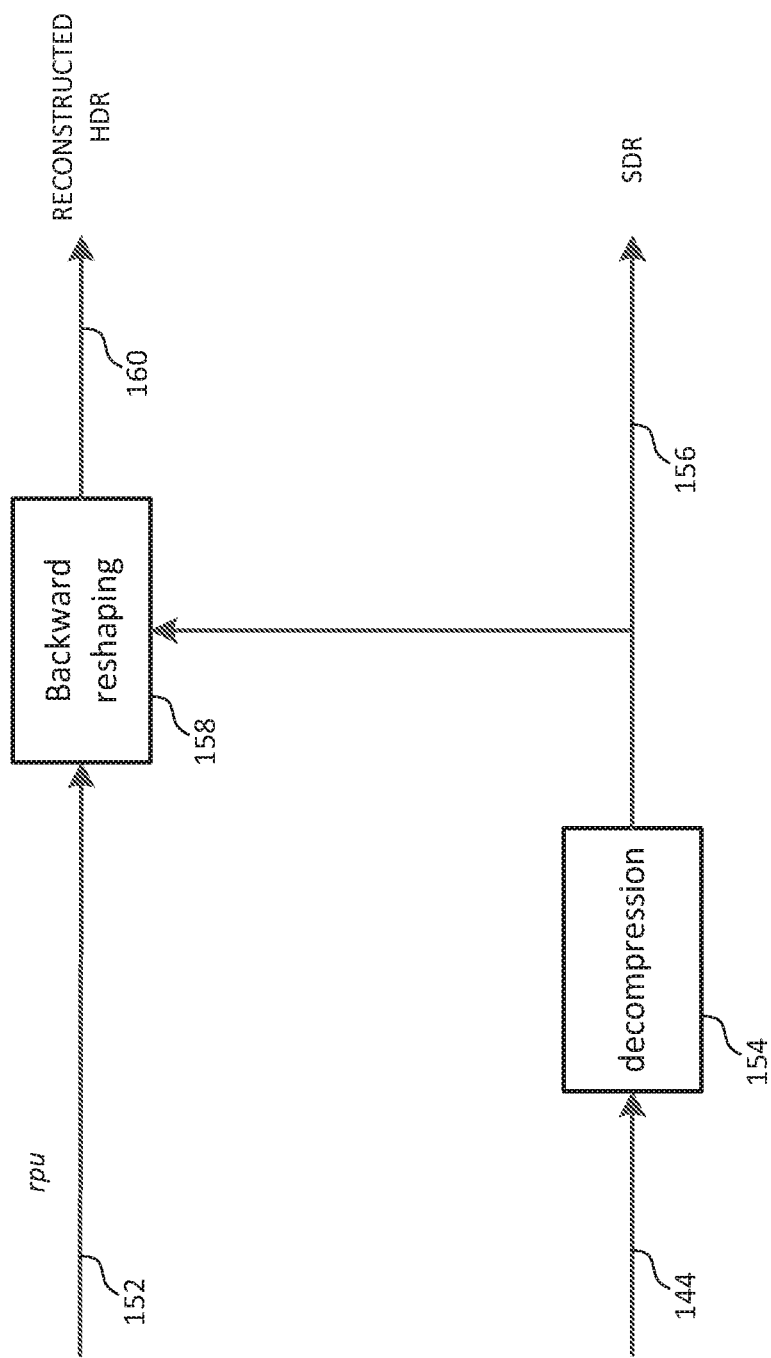
FIG. 2D illustrates an example of an SLBC decoder-side codec architecture.

FIG. 2D illustrates an example of an SLBC decoder-side codec architecture, which may also be implemented with one or more computing processors in a downstream video decoder (e.g., a receiver, etc.), etc.

In some embodiments, as illustrated in FIG. 2D, the video signal encoded with (forward) reshaped SDR images in a single layer 144 and image metadata 152 which includes but is not necessarily limited to only the backward reshaping image metadata (142)—as input by the video decoder.

A decompression block 154 (e.g., a part of the decoding block (130) of FIG. 1, etc.) decompresses/decodes compressed video data in the single layer (144) of the video signal into the decoded SDR images (182). The decoded SDR images (182) may be the same as the reshaped SDR images, subject to quantization errors in the coding block (120) and in the decompression block (154), which may have been optimized for SDR display devices. The decoded SDR images (182) may be outputted in an output SDR video signal 156 (e.g., over an HDMI interface, over a video link, etc.) to and rendered on an SDR display device.

In addition, a backward reshaping block 158 extracts the backward reshaping image metadata (142) from the input video signal, constructs optimal backward reshaping functions based on the extracted the backward reshaping image metadata (142) in the image metadata (152), and performs backward reshaping operations on the reshaped SDR images based on the optimal backward reshaping functions to generate the backward reshaped images (132-1) (or reconstructed HDR images).

In some embodiments, the backward reshaped images represent production-quality or near-production-quality HDR images that are optimized for an HDR target/reference display device. The backward reshaped images (132) may be outputted in an output HDR video signal 160 (e.g., over an HDMI interface, over a video link, etc.) to and rendered on the HDR display device. In some embodiments, DM functionality may not be implemented by a receiver to simplify device operations and reduce device costs.

Additionally, optionally or alternatively, in some embodiments, DM metadata may be transmitted in the image metadata (152) and the reshaped SDR images to the receiver. Display management operations specific to the HDR display device may be performed on the backward reshaped images (132) based at least in part on the DM metadata in the image metadata (152), for example to generate display images to be rendered on the HDR display device.

For the purpose of illustration, single layer codec architectures have been described. It should be noted that techniques as described herein can be used in different single-layer codec architectures other than those illustrated in FIG. 2A through FIG. 2D. Additionally, optionally or alternatively, these techniques can be used in multi-layer codec architectures. Thus, these and other variations of single-layer or multi-layer codec architectures may operate with some or all of the techniques as described herein.

Histograms-Weighted Luma Backward Reshaping

For luma reshaping, a forward LUT (or FLUT) represents a forward mapping function used to map (source) HDR luma codewords of a reference HDR image to (forward) reshaped SDR luma codewords. This forward mapping function may be many-to-one and thus may not be mathematically invertible, as there may be multiple HDR codeword entries in the FLUT that are mapped by the FLUT to a single SDR luma codeword. A FLUT may be built through CDF matching by the CDF matching block (218).

On the other hand, a backward LUT (or BLUT) represents a reverse (or backward) mapping function used to map reshaped SDR luma codewords of a reshaped SDR image to corresponding reconstructed HDR luma codewords. Constructing a BLUT from a FLUT may not be through a mathematical inversion of the FLUT but may be achieved through a BLUT estimation process.

Under some approaches, to build the BLUT, the average of all source HDR codewords corresponding to (or forward mapped to) a given reshaped SDR codeword is set to be a reconstructed HDR codeword to which the given reshaped SDR codeword is backward mapped in the BLUT. Under these approaches, a letterbox present in a reconstructed HDR image may appear brighter than a corresponding letterbox present in a corresponding reference HDR image in some operational scenarios. This averaging method may also suppress the BLUT in the dark and the bright image regions, thereby introducing block vanishing artifacts/problems in some reconstructed HDR images.

Under techniques as described herein, a histograms-weighted BLUT estimation process may be used to overcome shortcomings that may exist in other approaches such as the letterbox problem. Additionally, optionally or alternatively, in some embodiments, BLUT suppression operations may be disabled as a solution to the block vanishing problem.

Mathematically, the FLUT can be expressed as $f(w) \rightarrow c$, which specifies a corresponding reshaped SDR codeword c for an HDR entry of a source HDR codeword w. A BLUT estimation task is to construct a reverse LUT (or a corresponding BLUT) $f_b(c) \rightarrow w$ that can be used to map reshaped SDR codewords to reconstructed HDR codewords for the purpose of generating a reconstructed HDR image that closely approximates the reference HDR image.

As noted, the FLUT $f(w) \rightarrow c$ comprises possibly many-to-one mappings, or mappings each of which may map several source HDR codewords to the same reshaped SDR codeword.

Let $w_i$ and $w_j$ denote such HDR codewords and $c_k$ denote the same reshaped SDR codeword in such a many-to-one mapping.

By way of example but not limitation, a 16-bit source HDR video signal may support a source HDR codeword space comprising a total of 65536 available HDR codewords, whereas a 10-bit reshaped SDR video signal may support a reshaped SDR codeword space comprising a total of 1024 available SDR codewords. Thus, in this example, $w_i, w_j \in [0, 2^{16}-1]$, whereas $c_k \in [0, 2^{10}-1]$. Suppose source HDR codewords in the range $[w_i, w_j]$ are all mapped to the reshaped SDR codeword $c_k$ in the FLUT. In the BLUT $f_b(c) \rightarrow w$, the SDR value $c_k$ can have only one HDR entry with a single reconstructed HDR codeword denoted as $w_k$. This essentially means that reconstructed (or output) HDR image has 1024 unique reconstructed HDR codewords spanning over the range $[0, 2^{16}-1]$ instead of 65536 unique codewords representable in the 16-bit source HDR video signal. A challenging is to select those 1024 HDR codewords in the BLUT in such a way that the reconstructed HDR image still looks perceptually similar to the source (or reference) HDR image.

As noted, under some approaches, the averaging method for BLUT estimation selects the average of the HDR codewords in the range $[w_i, w_j]$ as the mapped (or reconstructed) value $w_k$ for the SDR codeword $c_k$ in the BLUT $f_b(c) \rightarrow w$, as follows:

$$w_k = \frac{\sum_{n=w_i}^{w_j} n}{w_j - w_i + 1} \quad (1)$$

This averaging method might work well with no perceptible quality loss in the reconstructed HDR image in some operational scenarios. A problem arises when the entries $[w_i, w_j]$ map to $c_k$ in the FLUT but the source HDR image does not have many (e.g., most, etc.) of those codewords in the range $[w_i, w_j]$.

Figure 3A:
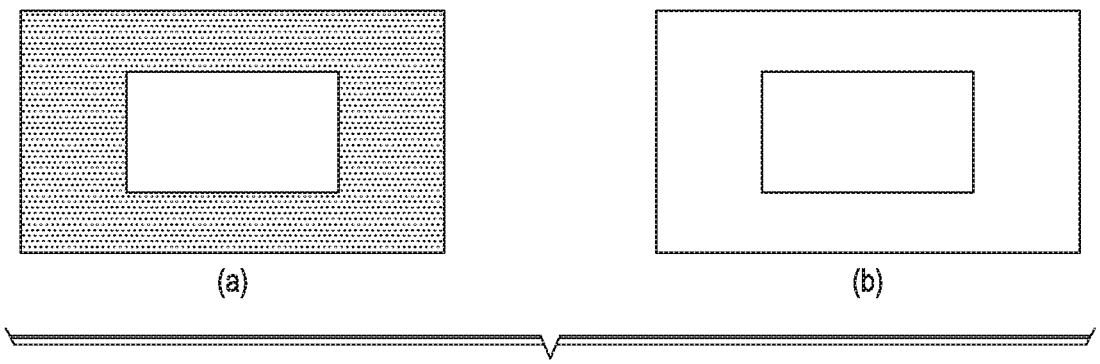
FIG. 3A illustrates an example source HDR image containing a letterbox and an example reconstructed HDR image in which the letterbox problem arises.

FIG. 3A illustrates an example source HDR image (a) containing a letterbox and an example reconstructed HDR image (b) in which the letterbox problem arises.

By way of illustration, the letterbox in the source HDR image (a) has a (e.g., relatively uniform, relatively consistent, etc.) source HDR codeword of 4096, whereas the letterbox in the reconstructed HDR image (b) has a reconstructed HDR codeword of 8608, which represents a large jump in value as compared with the source HDR codeword. This jump in value for the reconstructed HDR codeword in the letterbox of the reconstructed HDR image makes the letterbox look brighter than usual as can be seen in FIG. 3A (b). The reason for this discrepancy or jump can be explained as follows. The source HDR image has value of 4096 for letterbox and has the next higher-value HDR codeword above 13121. Under some approaches, all the HDR codewords in the range from 4096 up to 13120 (below the next higher-value HDR codeword) map to the same reshaped SDR codeword, for example a value of 67. In the BLUT for backward reshaping, the reshaped SDR codeword of 67 is mapped to the average of numeric values from 4096 to 13120, which is around (or rounded to) 8608. This makes the letterbox brighter in the reconstructed HDR image as compared with the letterbox in the source HDR image. This problem can be effectively solved by a histograms-weighted approach that better maintains luminance fidelity in the reconstructed HDR image.

Figure 3B:
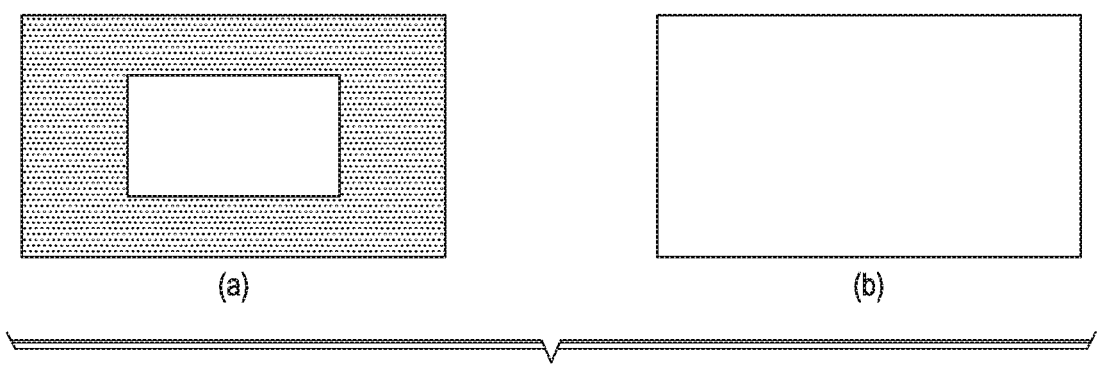
FIG. 3B illustrates an example source HDR image containing a white block on a black background and an example reconstructed HDR image in which the white block on the black background has vanished and becomes all gray.

Another problem arises under some other approaches is the vanishing block problem. FIG. 3B illustrates an example source HDR image (a) containing a white block on a black background and an example reconstructed HDR image (b) in which the white block on the black background has vanished and becomes all gray.

The black background in the source HDR image becoming gray in the reconstructed HDR image can be attributed to the averaging method (or the non-histogram-based averaging method) as discussed above. The source HDR image has only two codewords, for example white (55350) and black (7600). In the FLUT, all the source HDR codewords from 7600 up to 55349 are mapped to the same reshaped SDR codeword of 81. In BLUT, the reshaped SDR codeword of 81 is mapped to the average of numeric values from 7600 to 55349, or 31475. As a result, the background in the reconstructed HDR image turns to gray.

The white block disappears in the reconstructed HDR image due to a BLUT suppression operation.

Figure 3C:
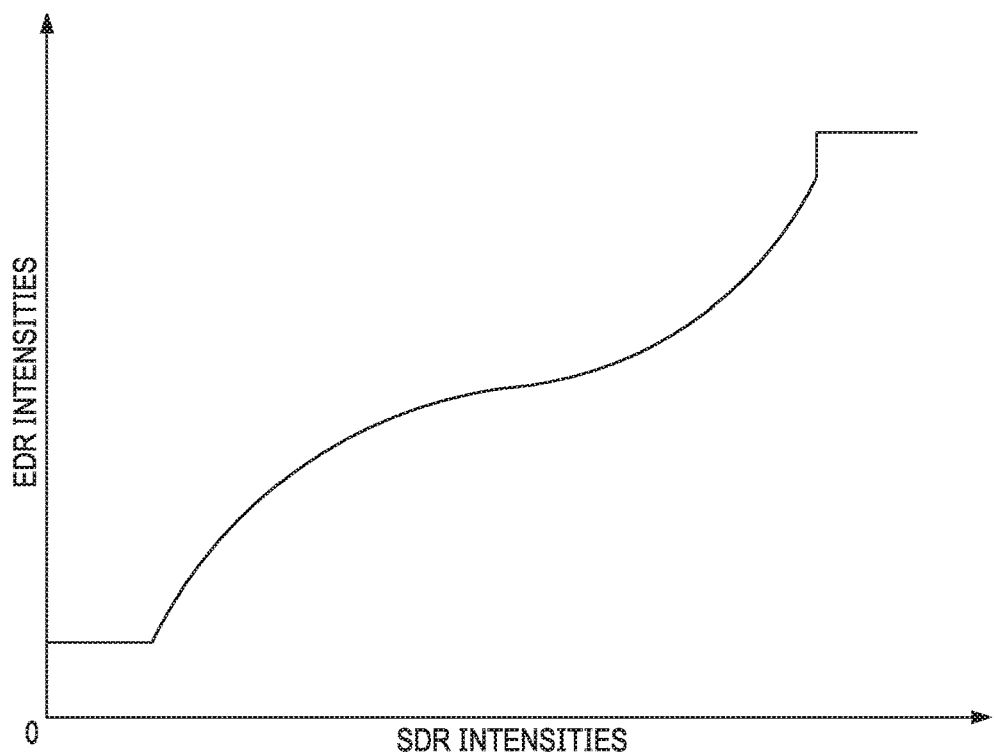
FIG. 3C illustrates an example plot representing a first backward look-up table (BLUT) constructed from a forward reshaping look-up table (FLUT) without suppression.

FIG. 3C illustrates an example plot representing a first BLUT constructed from a FLUT without suppression. As illustrated, the first BLUT generated without suppression includes a relatively sharp transition in the high intensity region (the high HDR codeword value region) at the very end of the plot.

Figure 3D:
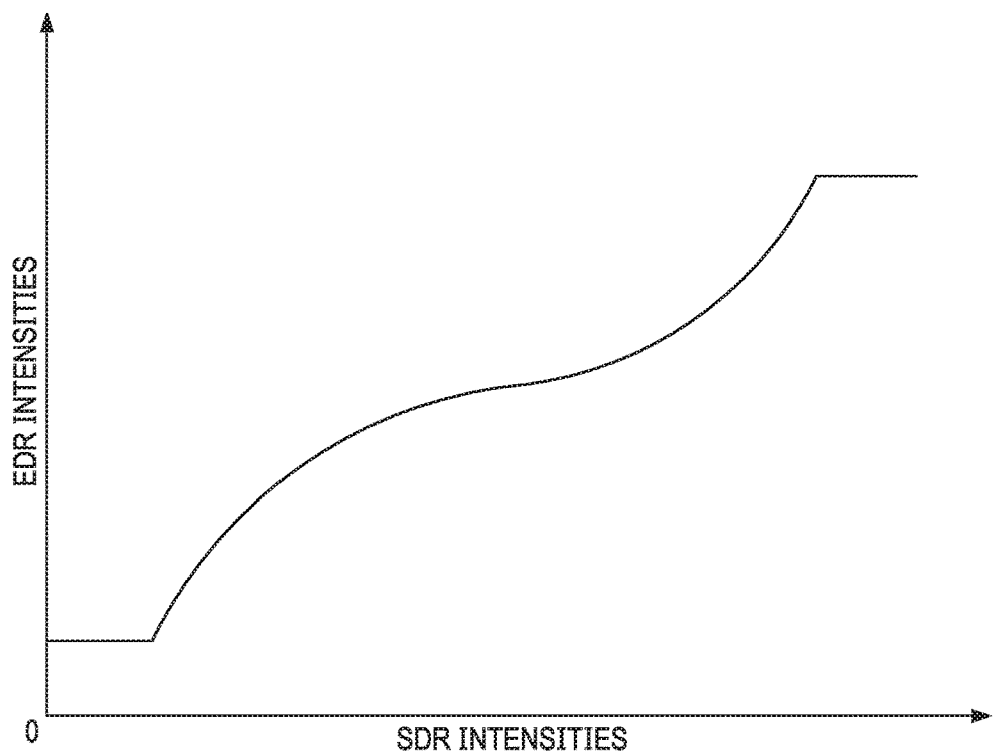
FIG. 3D illustrates an example plot representing a second BLUT constructed from the same FLUT with suppression.

FIG. 3D illustrates an example plot representing a second BLUT constructed from the same FLUT with suppression. As illustrated, the second BLUT generated with suppression has the relatively sharp transition in the high intensity region (the high HDR codeword value region) removed by a suppression operation at the very end of the plot. Under some approaches, the suppression operation is intended to make a curve (or plot) representing the second BLUT conducive to polynomial fitting/approximation. Example polynomial fitting/approximation operations are described in U.S. Patent Application Publication 2017/0308996, published on Oct. 26, 2017, the entire contents of which are hereby incorporated by reference as if fully set forth herein.

In some operational scenarios, a BLUT computed from FLUT using the averaging method without suppression may look like a step function. That is, a curve representing the BLUT may be flat in the dark and mid-tone region with a sharp (or relatively steep) transition in the high intensity region that maps relatively high luminance levels such as white in SDR to HDR. If the suppression operation is applied to the BLUT to generate another BLUT, then the sharp transition in the high intensity region of the former BLUT may be removed in the latter BLUT. As a result, in the latter BLUT, all SDR codewords may be mapped to the same reconstructed HDR codeword. This causes both the black background and the white box to map to the same reconstructed HDR codeword value, thereby making the box to disappear. On top of that, the averaging method makes everything gray as discussed earlier.

To overcome the problems associated with the averaging method, histograms-weighted BLUT generation techniques as described herein can be used to generate BLUTs. An HDR histogram can be (e.g., readily, etc.) derived from CDF matching, and can be used or leveraged to improve the BLUT generation/prediction.

Let I(p) denote the luma codeword (e.g., intensity, etc.) of a pixel located at p in a given (e.g., each, etc.) source HDR image I. The HDR histogram may be computed for the (e.g., each, etc.) source HDR image I, as follows:

$$\mathfrak{I}(n) = \sum_{p \in I} \Xi(I(p) == n) \quad (2)$$

where, n denotes a HDR luma codeword used as a bin index in the HDR histogram $\mathfrak{I}(\bullet)$; $\Xi(\bullet)$ represents the identity function. In some embodiments, the HDR histogram $\mathfrak{I}(\bullet)$ computed for the source HDR image I can be aggregated over an entire scene or over a number of frames in a sliding window. The aggregated HDR histogram (denoted as h(•)) can be used in CDF matching or for FLUT generation. The number of bins in the aggregated HDR histogram h(•) is equal to the maximum possible number of codewords in the HDR domain (or in the HDR codeword space).

Consider scenarios in which multiple (distinct) source HDR codewords $[w_i, w_j]$ are mapped to the same reshaped SDR codeword $c_k$ in the FLUT. The mapped (backward reshaped) HDR codeword $w_k$ to which the reshaped SDR codeword $c_k$ is mapped in the BLUT $f_b(c) \to w$ can be found, as follows:

$$w_k = \frac{\sum_{n=w_i}^{w_j} h(n) \times n}{\sum_{n=w_i}^{w_j} h(n)} \quad (3)$$

Consider the letterbox problem as illustrated in FIG. 3A with this histogram-based BLUT estimation method (or process). In the source HDR image (a) of FIG. 3A, source HDR codewords from 4096 up to 13120 are mapped to the reshaped SDR codeword 67. However, as there are no pixels in the source HDR image having the HDR codewords from 4097 up to 13120, expression (3) above is reduced to an expression as follows:

$$w_{67} = \frac{\sum_{n=4096}^{13120} h(n) \times n}{\sum_{n=4096}^{13120} h(n)} = \quad (4)$$

$$\frac{h(4096) \times 4096 + \sum_{n=4097}^{13120} h(n) \times n}{h(4096) + \sum_{n=4097}^{13120} h(n)} = \frac{h(4096) \times 4096 + 0}{h(4096) + 0} = 4096$$

As can be seen in expression (4) above, the histogram-based BLUT estimation method provides the correct BLUT mapping $f_b(67) \to 4096$. Thus, in the reconstructed HDR image, the letterbox is represented by a correct reconstructed HDR codeword.

To fix the vanishing block problem, the suppression operation can be disabled in the BLUT construction. In an example, the suppression operation can be disabled in images in which the vanishing block problem is likely to occur. In another example, the suppression operation can be disabled in scenarios in which a polynomial fitting/approximation process is equipped to handle any sharp transitions that may occur in a plot representing a BLUT.

Without suppression, the white rectangular block as illustrated in FIG. 3B (a) visible in the source HDR image can be maintained in the reconstructed HDR image. In addition, the black background as illustrated in FIG. 3B (a) visible in the source HDR image can also be maintained in the reconstructed HDR image.

High-Fidelity Full Reference SLBC Chroma Reshaping

Figure 4A:
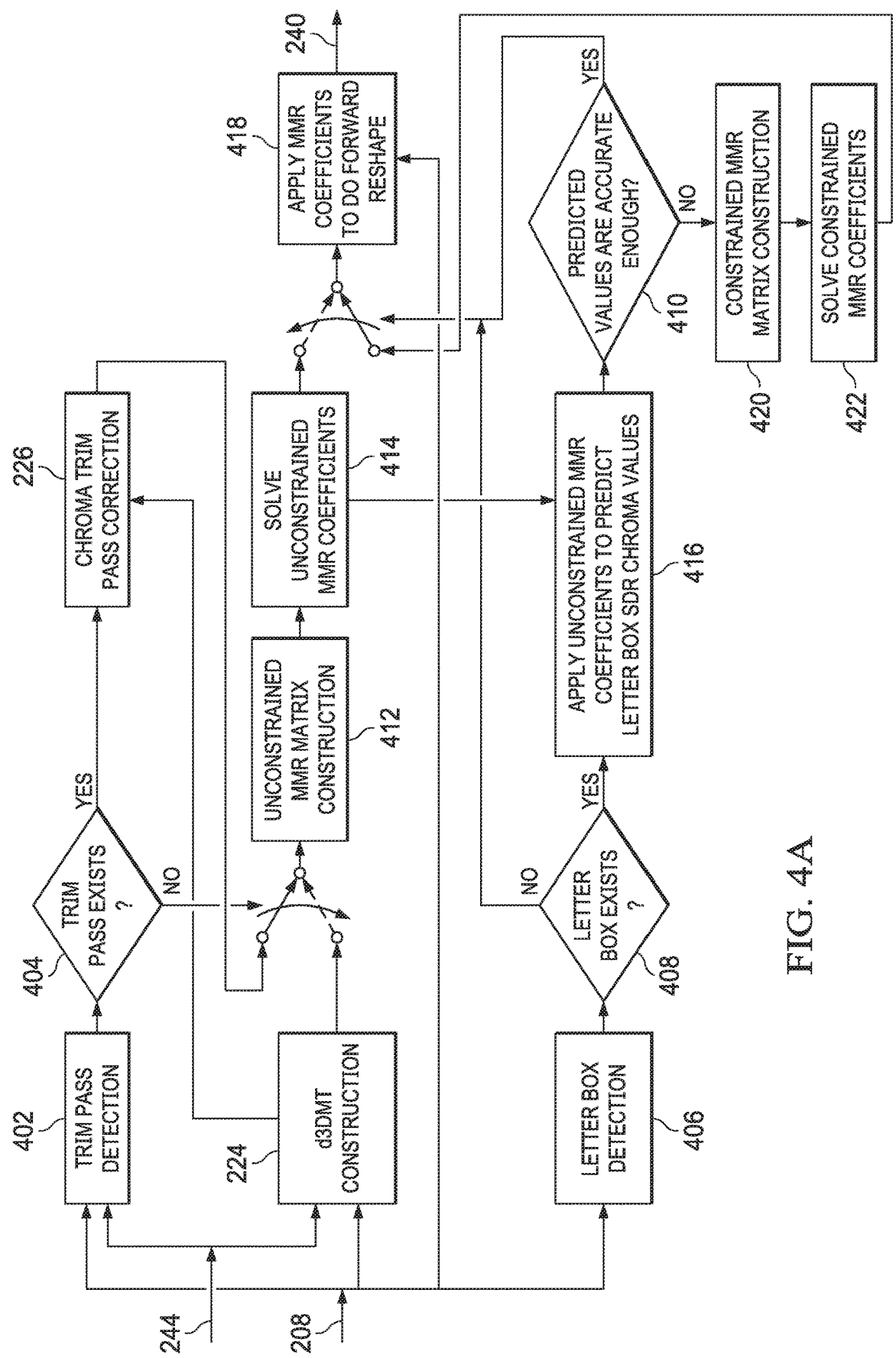
FIG. 4A illustrates an example process flow for high-fidelity full reference SLBC chroma forward reshaping.

FIG. 4A illustrates an example process flow for high-fidelity full reference SLBC chroma forward reshaping under techniques as described herein. MMR coefficients generated with this process flow can be used to forward reshape chroma codewords in a source (or reference) HDR video signal to reshaped chroma codewords in a reshaped SDR video signal and can preserve color fidelity in reshaped SDR images in the reshaped SDR video signal in relation to source (or reference) HDR images in the source HDR video signal. In some embodiments, one or more computing devices or components (e.g., an encoding device/module, a transcoding device/module, a decoding device/module, an inverse tone mapping device/module, a tone mapping device/module, a media device/module, etc.) may perform this process flow. For example, a chroma forward reshaping part (e.g., 222 of FIG. 2A or FIG. 2B, etc.) in a forward reshaping stage (e.g., 204 of FIG. 2A or FIG. 2B, etc.) of an end-to-end encoding pipeline may be used to carry out some or all operations in this process flow.

In contrast with other approaches, under techniques as described herein, a d3DMT construction block (e.g., 224, etc.) can be used to construct a dynamic 3D mapping table (d3DMT) from a source (or reference) HDR image (e.g., 208, etc.) and a reference SDR image (e.g., 244, etc.).

The reference SDR image (244), or distributions of luma and/or chroma codewords therein, can be analyzed in a trim pass detection block 402. In block 404, it is determined whether trim pass exists in the reference SDR image (244). Such trim pass may be introduced in content mapping (e.g., manipulations/operations performed based on artistic or colorist intent, color grading operations, etc.) from the source HDR video signal to a reference SDR video signal comprising the reference SDR image (244).

In response to determining that trim pass exists in the reference SDR image (244), such trim pass may be corrected by a chroma trim pass correction (e.g., 226, etc.) by merging the d3DMT of the reference SDR image (244), as generated by the d3DMT construction block (244), with a trained reference 3DMT for trimmed colors into a merged d3DMT.

Figure 4B:
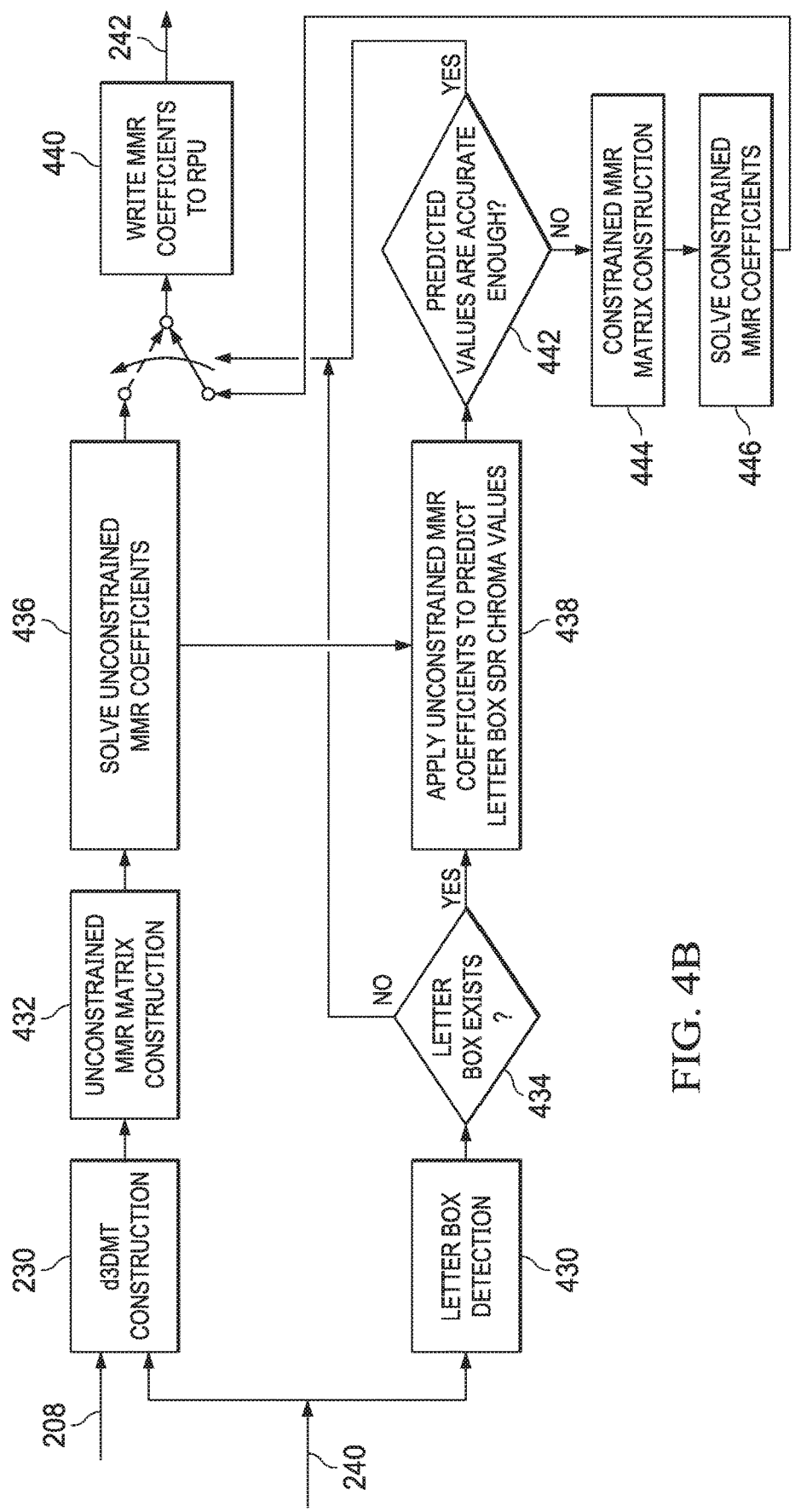
FIG. 4B illustrates an example process flow for high-fidelity full reference SLBC chroma backward reshaping.
Figure 4C:
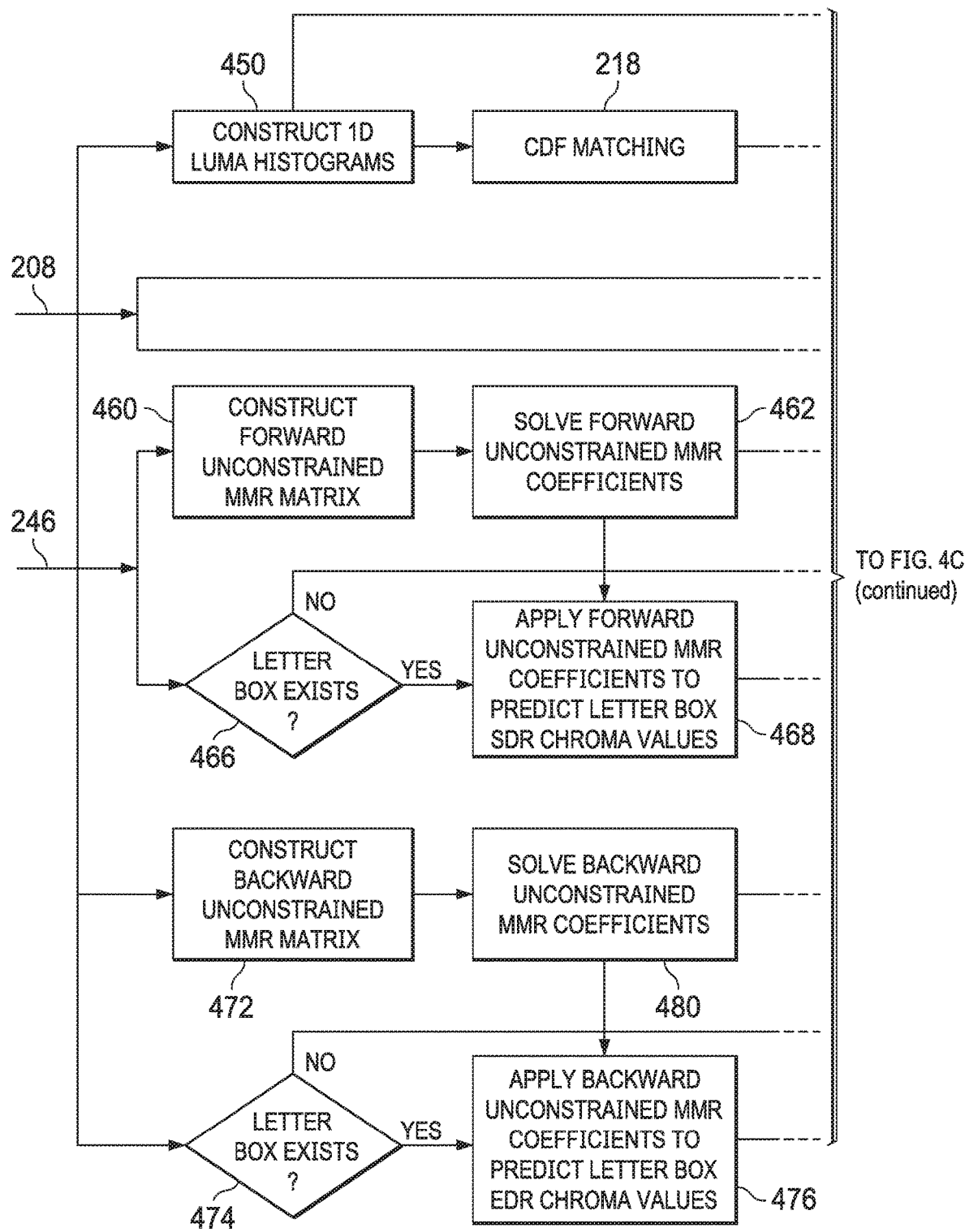
FIG. 4C illustrates an example process flow for high-efficiency reduced reference SLBC chroma forward and backward reshaping.
Figure 4C:
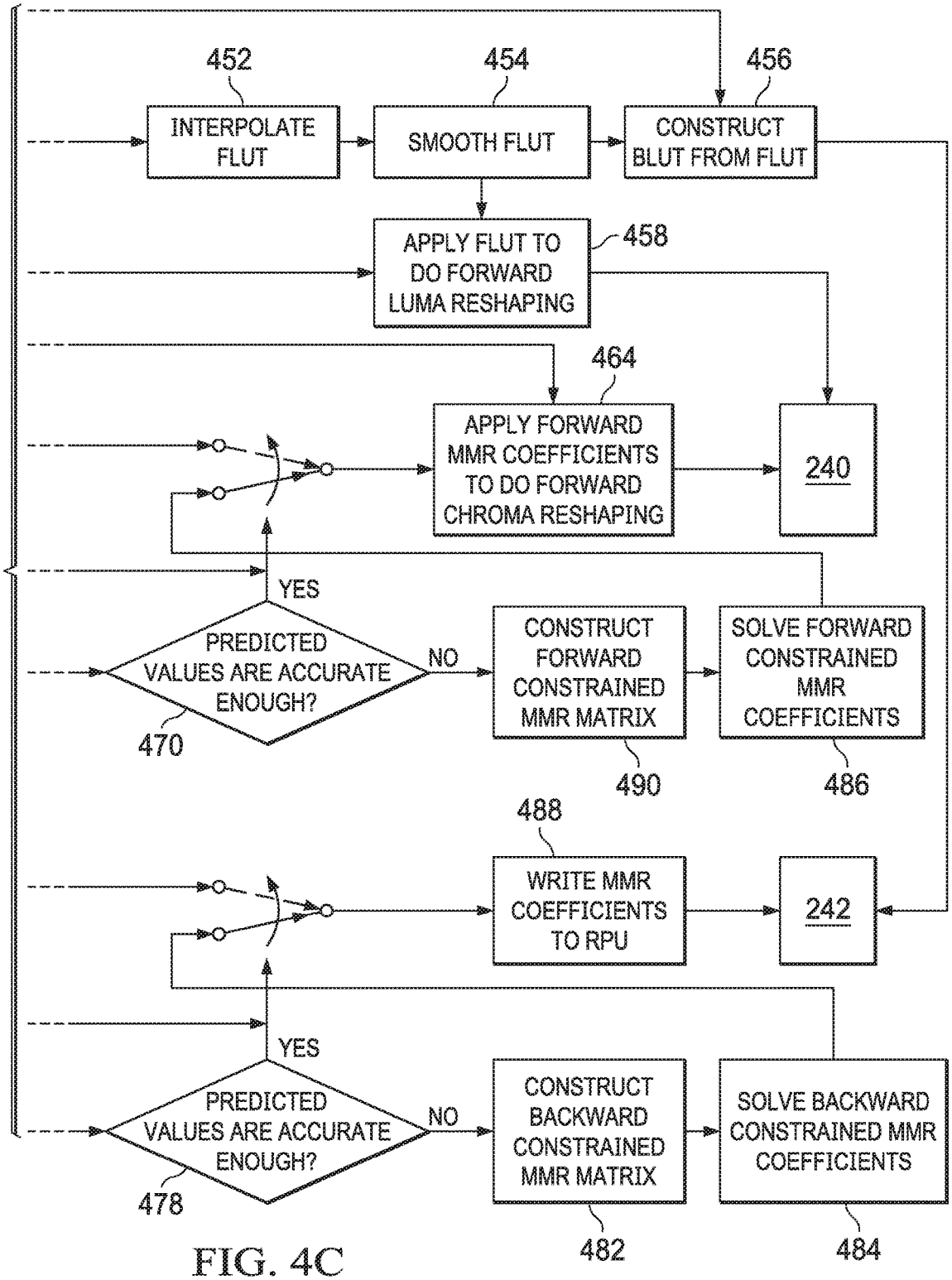

In FIG. 4A through FIG. 4C, an input to a block may depends on a decision made in another block. For example, as illustrated in FIG. 4A, either an output (or the d3DMT) of the d3DMT construction block (224) or an output (or the merged d3DMT) of the chroma trim pass correction block (226) is to be inputted to an unconstrained MMR matrix construction 412. The output of which of the two blocks (224 and 226) is the actual input to the unconstrained MMR matrix construction (412) depends on a decision in block 404 as to whether trim pass exists in the reference SDR image (244). If so, the merged d3DMT as outputted by the chroma trim pass correction block (226) is used as the (actual) input to the unconstrained MMR matrix construction (412). If not, the d3DMT (without merging with trained 3DMT data) as outputted by the d3DMT construction block (224) is used as the (actual) input to the unconstrained MMR matrix construction (412). In block 414, an unconstrained least-squares problem is formulated to solve for MMR coefficients that are to be used to forward reshape chroma codewords of the letterbox in the source HDR image (208) into reshaped chroma codewords of a corresponding letterbox in a reshaped SDR image (240).

The reference SDR image (244), or distributions of luma and/or chroma codewords therein, can be analyzed in a letterbox detection block 406. In block 408, it is determined whether a letterbox (e.g., a single letterbox, multiple letterboxes, etc.) exists in the reference SDR image (244).

In response to determining that a letterbox does not exist in the reference SDR image (244), in block 418, the MMR coefficients generated by the unconstrained MMR matrix construction block (412) by solving the unconstrained least-squares problem are applied to forward reshape chroma codewords in the source HDR image (208) into reshaped chroma codewords in a reshaped SDR image (e.g., 240, etc.), which can be outputted to recipient devices in a coded bitstream (e.g., a SLBC video signal, 112 of FIG. 1, etc.). Reshaped luma codewords in the reshaped SDR image (240) may be obtained by a luma forward reshaping part (e.g., 214 of FIG. 2A or FIG. 2B, etc.) by forward reshaping luma codewords in the source HDR image (208).

On the other hand, in response to determining that a letterbox exists in the reference SDR image (244), to guarantee the color (or to maintain color fidelity, etc.) of the letterbox, in block 416, the MMR coefficients generated by the unconstrained MMR matrix construction block (412) by solving the unconstrained least-squares problem are applied to forward reshape chroma codewords of the letterbox in the source HDR image (208) into reshaped chroma codewords of a corresponding letterbox in a reshaped SDR image (240).

In block 410, it is determined whether the reshaped chroma codewords of the corresponding letterbox in the reshaped SDR image (240), as predicted with the MMR coefficients generated from solving the unconstrained least-squares problem, are sufficiently accurate (e.g., based on one or more accuracy/range thresholds, etc.).

In response to determining that the reshaped chroma codewords of the corresponding letterbox in the reshaped SDR image (240), as predicted with the MMR coefficients generated from solving the unconstrained least-squares problem, are sufficiently accurate, the process flow goes to block 418 in which the MMR coefficients generated by the unconstrained MMR matrix construction block (412) by solving the unconstrained least-squares problem are applied to forward reshape chroma codewords in the source HDR image (208) into reshaped chroma codewords in a reshaped SDR image (e.g., 240, etc.), which can be outputted to recipient devices in a coded bitstream (e.g., a SLBC video signal, 112 of FIG. 1, etc.). Reshaped luma codewords in the reshaped SDR image (240) may be obtained by a luma forward reshaping part (e.g., 214 of FIG. 2A or FIG. 2B, etc.) by forward reshaping luma codewords in the source HDR image (208).

On the other hand, in response to determining that the reshaped chroma codewords of the corresponding letterbox in the reshaped SDR image (240), as predicted with the MMR coefficients generated from solving the unconstrained least-squares problem, are not sufficiently accurate, a constrained MMR matrix is constructed by a constrained MMR matrix construction block 420. In block 422, MMR coefficients that are to be used to forward reshape chroma codewords of the letterbox in the source HDR image (208) into reshaped chroma codewords of the corresponding letterbox in the reshaped SDR image (240) are generated through solving the optimization problem (e.g., a minimization problem, etc.) using the constrained MMR matrix. The process flow then goes to block 418 in which the MMR coefficients generated by the constrained MMR matrix construction block (420) by solving the constrained least-squares problem are applied to forward reshape chroma codewords in the source HDR image (208) into reshaped chroma codewords in a reshaped SDR image (e.g., 240, etc.), which can be outputted to recipient devices in a coded bitstream (e.g., a SLBC video signal, 112 of FIG. 1, etc.). Reshaped luma codewords in the reshaped SDR image (240) may be obtained by a luma forward reshaping part (e.g., 214 of FIG. 2A or FIG. 2B, etc.) by forward reshaping luma codewords in the source HDR image (208).

FIG. 4B illustrates an example process flow for high-fidelity full reference SLBC chroma backward reshaping under techniques as described herein. MMR coefficients generated with this process flow can be provided to as backward reshaping image metadata, and used by, a recipient device to backward reshape chroma codewords in a reshaped SDR image (e.g., 240, etc.) to reconstructed chroma codewords in a reconstructed HDR image and can preserve color fidelity in the reconstructed HDR image in relation to a source (or reference) HDR image (e.g., 208, etc.) used to generate the reshaped SDR image (240). In some embodiments, one or more computing devices or components (e.g., an encoding device/module, a transcoding device/module, a decoding device/module, an inverse tone mapping device/module, a tone mapping device/module, a media device/module, etc.) may perform this process flow. For example, a chroma backward reshaping part (e.g., 234 of FIG. 2A or FIG. 2B, etc.) in a backward reshaping stage (e.g., 206 of FIG. 2A or FIG. 2B, etc.) of an end-to-end encoding pipeline may be used to carry out some or all operations in this process flow.

A d3DMT construction block (e.g., 230, etc.) can be used to construct a dynamic 3D mapping table (d3DMT) from a reshaped SDR image (e.g., 240, as generated by a prior forward reshaping stage such as 204 of FIG. 2A or FIG. 2B, etc.) and a source (or reference) HDR image (e.g., 208, etc.).

The d3DMT as constructed by the d3DMT construction block (230) is to be inputted to an unconstrained MMR matrix construction 432 to construct an unconstrained MMR matrix. In block 436, an unconstrained least-squares problem is formulated to solve for MMR coefficients that are to be used to backward reshape chroma codewords of the reshaped SDR image (240) into reconstructed chroma codewords in the reconstructed HDR image.

Distributions of luma and/or chroma codewords in any of the reshaped SDR image (240), the source HDR image (208), or the reference SDR image (244), can be analyzed in a letterbox detection block 430. In some embodiment, a determination on whether a letterbox exists may be used by blocks 430 and 434 to determine whether a letterbox exists in any of these images.

In response to determining that a letterbox does not exist, in block 440, the MMR coefficients generated by the unconstrained MMR matrix construction block (436) by solving the unconstrained least-squares problem are included as backward reshaping image metadata to be transmitted to downstream recipient devices with the reshaped SDR image (e.g., 240, etc.) in a coded bitstream (e.g., a SLBC video signal, 112 of FIG. 1, etc.).

On the other hand, in response to determining that a letterbox exists, to guarantee the color (or to maintain color fidelity, etc.) of the letterbox, in block 438, the MMR coefficients generated by the unconstrained MMR matrix construction block (436) by solving the unconstrained least-squares problem are applied to backward reshape chroma codewords of the letterbox in the reshaped SDR image (240) into reconstructed chroma codewords of a corresponding letterbox in the reconstructed HDR image.

In block 442, it is determined whether the reconstructed chroma codewords of the corresponding letterbox in the reconstructed HDR image, as predicted with the MMR coefficients generated from solving the unconstrained least-squares problem, are sufficiently accurate (e.g., based on one or more accuracy/range thresholds, etc.).

In response to determining that the reconstructed chroma codewords of the corresponding letterbox in the reconstructed HDR image, as predicted with the MMR coefficients generated from solving the unconstrained least-squares problem, are sufficiently accurate, the process flow goes to block 440 in which the MMR coefficients generated by the unconstrained MMR matrix construction block (436) by solving the unconstrained least-squares problem are included as backward reshaping image metadata to be transmitted to downstream recipient devices with the reshaped SDR image (e.g., 240, etc.) in a coded bitstream (e.g., a SLBC video signal, 112 of FIG. 1, etc.).

On the other hand, in response to determining that the reconstructed chroma codewords of the corresponding letterbox in the reconstructed HDR image, as predicted with the MMR coefficients generated from solving the unconstrained least-squares problem, are not sufficiently accurate, a constrained MMR matrix is constructed by a constrained MMR matrix construction block 444. In block 446, MMR coefficients that are to be used to backward reshape chroma codewords of the letterbox in the reshaped SDR image (240) into reconstructed chroma codewords of the corresponding letterbox in the reconstructed HDR image are generated through solving the optimization problem (e.g., a minimization problem, etc.) using the constrained MMR matrix. The process flow then goes to block 440 in which included as backward reshaping image metadata to be transmitted to downstream recipient devices with the reshaped SDR image (e.g., 240, etc.) in a coded bitstream (e.g., a SLBC video signal, 112 of FIG. 1, etc.).

3dDMT Construction

A 3D mapping table (3DMT), including but not necessarily limited to only a trained 3DMT or a dynamic 3DMT (or d3DMT), can be built with each color channel (e.g., red or R, green or G, blue or B, Y, Cb, Cr, etc.) of a color space (e.g., RGB, YCbCr, etc.), for example by a d3DMT construction block (e.g., 226 or 236 of FIG. 2A or FIG. 2B, 226 of FIG. 4A, 226 of FIG. 4B, etc.). Example 3DMT (or 3D flattened mapping table) construction are described in U.S. Provisional Application Ser. No. 62/636,388, filed on Feb. 28, 2018, the entire contents of which are hereby incorporated by reference as if fully set forth herein.

The entire range of available component pixel values (or available component codewords) of a color channel can be statically partitioned into a number of fix-sized bins, or dynamically partitioned into a number of non-fix-sized bins depending on minimum and maximum component pixel values (or component codewords) of each color channel actually found in image(s), as will be further explained in detail below.

Since an end-to-end SLBC encoding pipeline includes both a forward reshaping stage (e.g., 204, etc.) and a backward reshaping stage (e.g., 206, etc.) and supports backward compatibility, the same d3DMT construction techniques as described herein can be used by both the forward reshaping stage (204) and the backward reshaping stage (206) to build their respective d3DMTs. In the forward reshaping stage (204), a first d3DMT is constructed to map the source (or reference) HDR image (208) to the reference SDR image (244). In the backward reshaping stage (206), a second d3DMT is constructed to map the reshaped SDR image (240) generated by forward reshaping the source HDR image (208) to the source HDR image (208).

For the purpose of illustration only, a d3DMT is deemed to represent mappings from a source signal to a target signal, or from a source image to a target image. Thus, the first d3DMT in the forward reshaping stage (204) represents mappings from a source signal such as a source (or reference) HDR video signal to a target signal such as a reference SDR video signal, or from a source image such as the HDR image (208) to a target image such as the reference SDR image (244). Similarly, the second d3DMT in the backward reshaping stage (206) represents mappings from a source signal such as the reshaped SDR video signal to a target signal such as the source HDR video signal, or from a source image such as the reshaped SDR image (240) to a target image such as the source (or reference) HDR image (208).

If resolutions of chroma channels of a source signal are different from (e.g., smaller than, etc.) a resolution of the luma channel, the luma channel of the source signal can be first downsampled such that the luma channel has the same resolution as the chroma channels.

Let $s_{t,i}^{ch}$ denote an un-normalized value of pixel i of (color) channel ch in frame t (or t-th source image) in the source signal, where channel ch={Y,$C_0$,$C_1$}. Let $r_{t,i}^{ch}$ denote an un-normalized value of a corresponding pixel i of a corresponding (color) channel ch in a corresponding target image in the target signal. For the purpose of illustration, assume the bit depth of the source signal is $b_s$, and the bit depth of the target signal is $b_r$.

First, for each channel of the source frame t, the un-normalized minimum (denoted as $L_t^{s,ch}$) and maximum (denoted as $H_t^{s,ch}$) can be found, as follows:

$$L_t^{s,ch} = \min_i(s_{t,i}^{ch}) \quad (5)$$
$$H_t^{s,ch} = \max_i(s_{t,i}^{ch})$$

Second, each channel may be uniformly quantized or partitioned into Q bins based on the un-normalized minimum and maximum. The range of bin j is as follows:

$$\left[ L_t^{s,ch} + \frac{j \cdot 2^{b_s}}{g_t^{ch} \cdot Q}, L_t^{s,ch} + \frac{(j+1) \cdot 2^{b_s}}{g_t^{ch} \cdot Q} \right) \quad (6)$$

where $$g_t^{ch} = \left\lfloor \frac{2^{b_s} - 1}{(H_t^{s,ch} - L_t^{s,ch})} \right\rfloor \text{ and } j \in \{0, 1, \ldots, Q-1\} \quad (7)$$

The partitioned bins (Q bins in each color channel) can be used to compute (Q×Q×Q) or 3D histogram (denoted as $\Omega_t^{Q,s}$) of the source frame tin the source signal. The 3D histogram $\Omega_t^{Q,s}$ contains $Q^3$ bins, such that each 3D bin therein can be specified by a bin index $q=(q^Y, q^{C_0}, q^{C_1})$ and represents the total number (or a count) of pixels having 3-channel quantized values falling within the respective value ranges of the color channels as represented by each such 3D bin. The bin index is determined as follows:

$$q^{ch} = \left\lfloor \frac{(s_{t,i}^{ch} - L_t^{s,ch}) g_t^{ch}}{2^{b_s}} \cdot Q \right\rfloor \quad (8)$$

A sum of source pixel values in each 3D bin of the 3D histogram $\Omega_t^{Q,s}$ may be computed for each luma or chroma channel. Let $\Psi_{t,Y,q}^{Q,s}$, $\Psi_{t,C_0,q}^{Q,s}$ and $\Psi_{t,C_1,q}^{Q,s}$ denote such sums in the three channels (e.g., in a YCbCr color space, etc.), respectively.

In addition, a sum of target pixel values mapped from source pixel values in each 3D bin of the 3D histogram $\Omega_t^{Q,s}$ may be computed for each chroma channel Let $\Psi_{t,C_0,q}^{Q,r}$ and $\Psi_{t,C_1,q}^{Q,r}$ denote such chroma sums in the two chroma channels (e.g., in a YCbCr color space, etc.), respectively, of a target image corresponding to the source image t.

An example procedure for collecting the foregoing statistics (and corresponding target pixel value statistics) for 3D bins in the 3D (source) histogram representing a d3DMT that describes mappings from the source video signal (or the source image t) to the target video signal (or the corresponding target image) is shown in TABLE 1 below.

TABLE 1

```
// STEP 1: 3D source histogram and 3D reference chroma values initialization
Ω_{t,q}^{Q,s} = 0 where q = (q^Y, q^{C_0}, q^{C_1}) and q^{ch} = 0, ..., Q - 1, for each ch = {Y, C_0, C_1}
Ψ_{t,Y,q}^{Q,s} = 0 where q = (q^Y, q^{C_0}, q^{C_1}) and q^{ch} = 0, ..., Q - 1, for each ch = {Y, C_0, C_1}
Ψ_{t,C_0,q}^{Q,s} = 0 where q = (q^Y, q^{C_0}, q^{C_1}) and q^{ch} = 0, ..., Q - 1, for each ch = {Y, C_0, C_1}
Ψ_{t,C_1,q}^{Q,s} = 0 where q = (q^Y, q^{C_0}, q^{C_1}) and q^{ch} = 0, ..., Q - 1, for each ch = {Y, C_0, C_1}
Ψ_{t,C_0,q}^{Q,r} = 0 where q = (q^Y, q^{C_0}, q^{C_1}) and q^{ch} = 0, ..., Q - 1, for each ch = {Y, C_0, C_1}
Ψ_{t,C_1,q}^{Q,r} = 0 where q = (q^Y, q^{C_0}, q^{C_1}) and q^{ch} = 0, ..., Q - 1, for each ch = {Y, C_0, C_1}
// STEP 2: scan for each pixel in the source and reference
// The number of pixels in the chroma plane is P
for ( i = 0; i < P; i ++ ){
```

$$q^Y = \left\lfloor \frac{(s_{t,i}^Y - L_t^{s,Y}) \cdot g_t^Y}{2^{b_s}} \cdot Q \right\rfloor; \quad \text{// source luma quantized value}$$

$$q^{C_0} = \left\lfloor \frac{(s_{t,i}^{C_0} - L_t^{s,C_0}) \cdot g_t^{C_0}}{2^{b_s}} \cdot Q \right\rfloor; \quad \text{// source chroma 0 quantized value}$$

$$q^{C_1} = \left\lfloor \frac{(s_{t,i}^{C_1} - L_t^{s,C_1}) \cdot g_t^{C_1}}{2^{b_s}} \cdot Q \right\rfloor; \quad \text{// source chroma 1 quantized value}$$

$$\Omega_{t,q}^{Q,s} ++; \quad \text{// 3D source histogram}$$

$$\Psi_{t,Y,q}^{Q,s} = \Psi_{t,Y,q}^{Q,s} + \frac{s_{t,i}^Y}{2^{b_s}}; \quad \text{// sum of source Y values}$$

$$\Psi_{t,C_0,q}^{Q,s} = \Psi_{t,C_0,q}^{Q,s} + \frac{s_{t,i}^{C_0}}{2^{b_s}}; \quad \text{// sum of source } C_0 \text{ values}$$

$$\Psi_{t,C_1,q}^{Q,s} = \Psi_{t,C_1,q}^{Q,s} + \frac{s_{t,i}^{C_1}}{2^{b_s}}; \quad \text{// sum of source } C_1 \text{ values}$$

$$\Psi_{t,C_0,q}^{Q,r} = \Psi_{t,C_0,q}^{Q,r} + \frac{r_{t,i}^{C_0}}{2^{b_r}}; \quad \text{// corresponding sum of reference } C_0 \text{ values}$$

TABLE 1-continued $$\Psi_{t,C_1,q}^{Q,r} = \Psi_{t,C_1,q}^{Q,r} + \frac{r_{t,i}^{C_1}}{2^{b_r}};$$    // corresponding sum of reference $C_1$ values

}

In some embodiments, for the (current) source frame at t (which represents a logical time such as a frame index), bins in the 3D histogram that have non-zero total number ($\Omega_{t,q}^{Q,s} \neq 0$) of pixels may be identified and kept; and all those bins that do not have any pixels are discarded from the 3D histogram. Let $\{q_0, q_1, \ldots, q_{K_t-1}\}$ denote $K_t$ such bins for which $\Omega_{t,q}^{Q,s} \neq 0$. The averages or centroids of $\Psi_{t,Y,q}^{Q,s}$, $\Psi_{t,C_0,q}^{Q,s}$, $\Psi_{t,C_1,q}^{Q,s}$, $\Psi_{t,C_0,q}^{Q,r}$, $\Psi_{t,C_1,q}^{Q,r}$ may be computed for these bins, respectively. An example procedure for such computation is shown in TABLE 2 below.

TABLE 2

$K_t = 0;$ // initialization
for ($q^Y = 0; q^Y < Q; q^Y$ ++ )
  for ($q^{C_0} = 0; q^{C_0} < Q; q^{C_0}$ ++ )
    for ($q^{C_1} = 0; q^{C_1} < Q; q^{C_1}$ ++) {
      if ($\Omega_{t,q}^{Q,s} \neq 0$) {

$$\Psi_{t,Y,q}^{Q,s} = \frac{\Psi_{t,Y,q}^{Q,s}}{\Omega_{t,q}^{Q,s}};$$    // Average source Y values $$\Psi_{t,C_0,q}^{Q,s} = \frac{\Psi_{t,C_0,q}^{Q,s}}{\Omega_{t,q}^{Q,s}};$$    // Average source $C_0$ values $$\Psi_{t,C_1,q}^{Q,s} = \frac{\Psi_{t,C_1,q}^{Q,s}}{\Omega_{t,q}^{Q,s}};$$    // Average source $C_1$ values $$\Psi_{t,C_0,q}^{Q,r} = \frac{\Psi_{t,C_0,q}^{Q,r}}{\Omega_{t,q}^{Q,s}};$$    // Average reference $C_0$ values $$\Psi_{t,C_1,q}^{Q,r} = \frac{\Psi_{t,C_1,q}^{Q,r}}{\Omega_{t,q}^{Q,s}};$$    // Average reference $C_1$ values $K_t$ ++;    // count the number of non-zero bins
      }
    }

The d3DMT comprising centroid values $\{\Psi_{t,Y,q_k}^{Q,s}\}$, $\{\Psi_{t,C_0,q_k}^{Q,s}\}$, $\{\Psi_{t,C_1,q_k}^{Q,s}\}$, $\{\Psi_{t,C_0,q_k}^{Q,r}\}$, $\{\Psi_{t,C_1,q_k}^{Q,r}\}$—for example as computed with the example procedure of TABLE 2 may be stored in a (e.g., relatively fast, low-latency, etc.) memory space, buffer, data store, etc. The d3DMT can be subsequently used to compute MMR coefficients, as will be further explained in detail later.

As noted, in some embodiments, each channel may not be partitioned from 0 to $2^{b_s}-1$, but rather may be partitioned from the actual minimum $L_t^{s,ch}$ to the actual maximum $$L_t^{s,ch} + \frac{2^{b_s}}{g_t^{ch}}$$

in each such channel. This is because pixels in some frames (or images) reside in a very small value range. For these frames, fixed partitioning (from 0 to $2^{b_s}-1$) yields very few non-zero bins in the d3DMT. As a result, an MMR matrix built from the fixed partitioned 3DMT is very likely to be singular, which means MMR computation would fail or would not converge. In that occurs, polynomial prediction, which in most cases provides less accurate prediction than MMR, can be used in place of the MMR-based prediction.

On the other hand, dynamic partitioning from the actual minimum $L_t^{s,ch}$ to the actual maximum $$L_t^{s,ch} + \frac{2^{b_s}}{g_t^{ch}}$$

in each channel can still provide finer (e.g., sized, ranged, etc.) partitions, which means pixels can still be categorized or populated into a relatively large number of different bins in the d3DMT. As the number of non-zero bins increases, an MMR matrix built from the d3DMT is more likely to be full rank (e.g., non-singular, less singular, etc.), meaning the MMR matrix can be solved to generate MMR coefficients for prediction in chroma channels.

Additionally, optionally or alternatively, the centroids (or the center of mass), instead of the midpoint, of each (source) bin can be determined and used to compute the MMR coefficients, thereby providing a relatively high accuracy in prediction relating to chroma channels.

Trim Pass Correction

Trim pass correction performed by one or more of: a luma trim pass handling block (e.g., 222 of FIG. 2A or FIG. 2B, etc.), a chroma trim pass handling block (e.g., 226 of FIG. 2A, FIG. 2B or FIG. 4A, etc.), and so forth, may be implemented in the forward reshaping stage (e.g., 204 of FIG. 2A or FIG. 2B, etc.).

A reference SDR image (e.g., 244, etc.) as described herein may be generated by one or more (e.g., programmatically performed, automatically performed, with minimal user interaction, etc.) CM algorithms from a source (or reference) HDR image (e.g., 208, etc.) based on content mapping metadata which may include but not necessarily limited to only SOP parameters (e.g., shift, offset, power, etc.). Sometimes the generated reference SDR image may be operated (e.g., with manual input, with user interaction, etc.) by a colorist (e.g., a video professional, a director, etc.) to adjust (e.g., manually, through interacting with GUI controls, etc.) trim pass parameters available in color grading tools (e.g., lift, gain, gamma, etc.) to achieve a desired look. The trim pass operations performed by the colorist represents colorist intervention in the process of achieving the desired look in the reference SDR image.

While the trim pass operations may be used to express or preserve artistic intent of the source (or reference) HDR image in the reference SDR image, clipping artifacts may be introduced in the reference SDR image in one or more luminance ranges. If not properly remedied, these clipping artifacts can cause visual artifacts in a backward reshaped HDR image generated from the reference SDR image with the trim pass operations and thus propagate to the backward reshaped HDR. For luma, the visual artifacts appear as loss of texture details. For chroma, the artifacts appear as loss of colors. For example, red rose color of a girl's lip in the reference HDR image or in the reference SDR image may look almost black in the backward reshaped HDR image.

In order to maintain reversibility of SDR codewords in the reshaped SDR image for generating relatively accurate HDR codewords in the backward reshaped HDR image, trim pass correction may be applied in the forward reshaping stage (204). The trim pass correction does not undo the effect of the trim pass operations on the expressed or represented artistic intent in the SDR domain. Rather, the trim pass correction as described herein avoids/reduces clipping (or non-reversible loss of luminance and chrominance information) resulting from the trim pass operations, yet still preserves the expressed or represented artistic intent represented in the colorist intervention in the reshaped SDR image.

In addition, as the details in the reference HDR image can be reshaped under techniques as described herein into reversible (or without clipping) SDR codewords in the reshaped SDR image, the reconstructed HDR image generated by backward reshaping the reshaped SDR image can contain relatively accurate luminance and chrominance information relative to the reference HDR image, thereby preserving in the reconstructed HDR image the same or similar artistic intent represented/expressed in the reference HDR image.

As previously noted, example trim pass detection and correction for luma are described in U.S. Patent Application Publication No. 2018/0007356. Trim pass correction for chroma is described in detail as follows.

First, the effect of trim pass operations on luma codewords at low intensity regions (or low luminance subranges) can be severe. Colors in those regions may be relatively severely clipped. For example, a large amount of image details on a face (e.g., a girl's face, etc.) disappears. During backward reshaping, reshaped SDR pixels with the same pixel value will be mapped or backward reshaped to the same HDR value. As a result, clipping in these regions is propagated to the reconstructed HDR image, resulting in non-reversibility of loss of image details and colors.

Second, to deal with this problem, as the loss of colors in the reconstructed HDR is caused by clipping in the reference SDR image, under techniques as described herein, colors can be restored in the reshaped SDR image such that the clipping effect in the reference SDR image is avoided or reduced in the reshaped SDR image, the latter of which may be used to reconstruct the reconstructed HDR image in place of the reference SDR image.

In some embodiments, the restoration of colors is achieved by merging a trained reference 3DMT (e.g., with no or little clipping, etc.) and the d3DMT built from the reference SDR image (e.g., with clipping, etc.). The trained reference 3DMT may be built from a population of training HDR-SDR image pairs (some or all of which may have no or little clipping) in a training dataset. For example, the trained reference 3DMT may be built as the average 3DMT of 3000+ HDR-SDR images (or frames) in the training dataset (e.g., uniformly sampled, randomly sampled, etc.) from a large number (e.g., 50+, etc.) of training HDR-SDR image pairs in video image sequences.

A 3DMT may be built from each training HDR-SDR image pair (or frame pair) using fixed partitioning from 0 to $2^{b_s}-1$, regardless of the range of the pixel values in the image. In other words, the 3DMT can be computed using the same procedures in TABLEs 1 and 2, where $L_t^{s,ch}$ is set to 0, and $g_t^{ch}$ is set to 1. Each color channel may be divided into $\hat{Q}$ bins (e.g., 32 bins, 64 bins, 128 bins, etc.). All individual 3DMT built from individual training HDR-SDR image pairs (or frame pairs) can then be averaged into the average 3DMT. If there are empty bins (e.g., bins with zero histogram count, etc.) in this average 3DMT, non-zero histogram counts of neighboring or adjacent non-empty bins may be used to derive interpolated histogram counts, for example using linear interpolation or other interpolation methods, to populate the previously empty bins. Empty bins at boundaries can be interpolated from their available nearest neighbors (e.g., multiple neighboring non-empty bins on one side of an empty bin, etc.) if necessary.

In some embodiments, for each color space and each type (e.g., PQ-based, gamma-based, HLG-based, etc.) of EOTF, a respective trained reference 3DMT can be built, for example through offline processing.

By way of example but not limitation, denote the mapped SDR chroma values in the trained reference 3DMT as $\{\hat{\Psi}_{C_0,\hat{q}_m}^{Q,r}\}$ and $\{\hat{\Psi}_{C_1,\hat{q}_m}^{Q,r}\}$ for $C_0$ and $C_1$ respectively. Let $\hat{q}_m = [\hat{q}^Y \ \hat{q}^{C_0} \ \hat{q}^{C_1}]$ where $\hat{q}^Y \in \{0, 1, \ldots, \hat{Q}-1\}$, $\hat{q}^{C_0} \in \{0, 1, \ldots, \hat{Q}-1\}$ and $\hat{q}^{C_2} \in \{0, 1, \ldots, \hat{Q}-1\}$, and where $m=0, 1, \ldots, \hat{Q}^3$.

During SLBC operations for predicting reshaped SDR chroma codewords, the trained reference 3DMT can be loaded into (e.g., relatively fast, with low latency, etc.) memory at initialization. For each reshaped SDR image, an individual d3DMT can be built using a source (or reference) HDR image that is to be forward reshaped into that reshaped SDR image and a reference SDR image corresponding to (e.g., content mapped with possible colorist intervention from, etc.) the source HDR image, for example using the procedures as shown in TABLEs 1 and 2. This d3DMT may be referred to as a frame-specific 3DMT, and may be represented by a 3D histogram comprising non-empty (or with non-zero histogram count) bins with source HDR values $\{\overline{\Psi}_{t,Y,q_k}^{Q,s}\}$, $\{\overline{\Psi}_{t,C_0,q_k}^{Q,s}\}$ and $\{\overline{\Psi}_{t,C_1,q_k}^{Q,s}\}$, and corresponding reference SDR values $\{\overline{\Psi}_{t,C_0,q_k}^{Q,r}\}$ and $\{\overline{\Psi}_{t,C_1,q_k}^{Q,r}\}$. The bin indexes used in the 3D histogram representing the frame-specific d3DMT may be $\{q_k\}$ where $k=0, 1, \ldots K_t-1$, and where $K_t$ is the number of nonzero bins $(\Omega_{t,Q}^{Q,s} \neq 0)$.

Trim pass (or the effect of trim pass operations) in the (e.g., each, etc.) reference SDR image can be detected using image information of the reference SDR image in the luma channel, for example by a luma trim pass handling block such as 220 of FIG. 2A or FIG. 2B implementing trim pass detection and correction techniques for the luma channel.

In response to determining that there is clipping (or trim pass) either at high or low SDR intensity regions (or SDR luminance sub-ranges) or at both high and low SDR intensity regions in the reference SDR image (e.g., frame t, etc.), bins in the frame-specific 3DMT with HDR intensity region(s) (or HDR luminance sub-ranges) corresponding to the clipped SDR intensity regions (or SDR luminance sub-ranges). The clipping point at the low intensity region may be denoted as $\rho_{cdf,t}^{low}$ for frame t, and the clipping point at the high intensity region may be denoted as $\rho_{cdf,t}^{high}$, which may represent luma codeword values (or luminance values) instead of bin indexes.

An example procedure for a trim pass correction operation is shown in TABLE 3 below. In this example procedure, for the bins in the frame-3DMT whose luma values are in the clipping range $((\overline{\Psi}_{t,Y,q_k}^{Q,s} < \rho_{cdf,t}^{low}) \| (\overline{\Psi}_{t,Y,q_k}^{Q,s} > \rho_{cdf,t}^{high}))$, the mapped SDR (codeword) values are replaced by the average of the mapped SDR (codeword) values of the frame-specific d3DMT and the mapped SDR (codeword)

values of the trained reference 3DMT. The SDR values of the other bins not in the clipping range may be unchanged.

constructed using average reference chroma values of the non-zero bins in the frame-specific d3DMT, as follows:

TABLE 3

//STEP 1: during initialization, load the trained reference 3DMT $\left(\left\{\hat{\Psi}_{C_0,\hat{q}_k}^{\hat{Q},r}\right\} \text{ and } \left\{\hat{\Psi}_{C_1,\hat{q}_k}^{\hat{Q},r}\right\}\right)$ that matches the color space and type (e.g., PQ-based, gamma-based, HLG-based, etc.) of EOTF for both source HDR (or EDR) and reference SDR.
//STEP 2: For frame t, build frame-3DMT: $\{\overline{\Psi}_{t,Y,q_k}^{Q,s}\}$, $\{\overline{\Psi}_{t,C_0,q_k}^{Q,s}\}$, $\{\overline{\Psi}_{t,C_1,q_k}^{Q,s}\}$, $\{\overline{\Psi}_{t,C_0,q_k}^{Q,r}\}$ and $\{\overline{\Psi}_{t,C_1,q_k}^{Q,r}\}$ as TABLEs 1-2.
//STEP 3: detect trim pass using luma channel only. If trim pass exists, set flag: is_trim = 1; find the low clipping point $\rho_{cdf,t}^{low}$ and high clipping point $\rho_{cdf,t}^{high}$. Otherwise set is_trim to 0.
//STEP 4: If trim pass exists, merge the frame-3DMT and the trained reference 3DMT for clipped bins:
if ( is_trim == 1 ){
  for ( k = 0; k < $K_t$; k++ ){
    if (($\overline{\Psi}_{t,Y,q_k}^{Q,s} < \rho_{cdf,t}^{low}$) || ($\overline{\Psi}_{t,Y,q_k}^{Q,s} > \rho_{cdf,t}^{high}$)) {
      $\hat{q}^Y = \lfloor \overline{\Psi}_{t,Y,q_k}^{Q,s} \cdot Q \rfloor$;   // index of luma of trained reference 3DMT
      $\hat{q}^{C_0} = \lfloor \overline{\Psi}_{t,C_0,q_k}^{Q,s} \cdot Q \rfloor$;   // index of $C_0$ of trained reference 3DMT
      $\hat{q}^{C_1} = \lfloor \overline{\Psi}_{t,C_1,q_k}^{Q,s} \cdot Q \rfloor$;   // index of $C_1$ of trained reference 3DMT
      $\hat{q}_m = [\hat{q}^Y \hat{q}^{C_0} \hat{q}^{C_1}]$;   // Find the corresponding entry in the trained reference
                                  3DMT. The index m for the trained reference 3DMT
                                  can be different from the index k for the frame-3DMT
    // average frame-3DMT and trained reference 3DMT $$\Psi_{t,C_0,q_k}^{Q,r} = \frac{\overline{\Psi}_{t,C_0,q_k}^{Q,r} + \hat{\Psi}_{t,C_0,\hat{q}_m}^{\hat{Q},r}}{2};$$

$$\Psi_{t,C_1,q_k}^{Q,r} = \frac{\overline{\Psi}_{t,C_1,q_k}^{Q,r} + \hat{\Psi}_{t,C_1,\hat{q}_m}^{\hat{Q},r}}{2};$$

}
  }
}

The updated SDR codeword values $\{\Psi_{t,C_0,q_k}^{Q,r}\}$ and $\{\Psi_{t,C_1,q_k}^{Q,r}\}$ may be used with the unchanged SDR codeword values $\{\overline{\Psi}_{t,C_0,q_k}^{Q,r}\}$ and $\{\overline{\Psi}_{t,C_1,q_k}^{Q,r}\}$ to generate an MMR matrix to determine optimal MMR coefficients used to forward reshape the reference HDR image into the reshaped SDR image with no or little loss of color.

Letterbox Constraint

Letterbox handling performed by a letterbox handling block (e.g., 228 or 238 of FIG. 2A or FIG. 2B, etc.) may be implemented in the forward reshaping stage (e.g., 204 of FIG. 2A or FIG. 2B, etc.) as well as the backward reshaping stage (e.g., 206 of FIG. 2A or FIG. 2B, etc.).

As previously noted, a d3DMT as described herein may be deemed to represent mappings from a source signal to a target signal, or from a source image to a target image. Thus, in the forward reshaping stage (204), a frame-specific d3DMT (which may be trim pass corrected) represents mappings from a source signal such as a source (or reference) HDR video signal to a target signal such as a reference SDR video signal, or from a source image such as the HDR image (208) to a target image such as the reference SDR image (244). Similarly, in the backward reshaping stage (206), a frame-specific d3DMT represents mappings from a source signal such as the reshaped SDR video signal to a target signal such as the source HDR video signal, or from a source image such as the reshaped SDR image (240) to a target image such as the source (or reference) HDR image (208). From a frame-specific d3DMT, two vectors can be $$v_t^{C_0} = \begin{bmatrix} \Psi_{t,C_0,q_0}^{Q,r} \\ \Psi_{t,C_0,q_1}^{Q,r} \\ \vdots \\ \Psi_{t,C_0,q_{K_t-1}}^{Q,r} \end{bmatrix}, v_t^{C_1} = \begin{bmatrix} \Psi_{t,C_1,q_0}^{Q,r} \\ \Psi_{t,C_1,q_1}^{Q,r} \\ \vdots \\ \Psi_{t,C_1,q_{K_t-1}}^{Q,r} \end{bmatrix} \quad (9)$$

Further, a matrix can be constructed using average source values of the non-zero bins in the frame-specific d3DMT, as follows:

$$S_t = \begin{bmatrix} p_{t,q_0}^T \\ p_{t,q_1}^T \\ \vdots \\ p_{t,q_{K_t-1}}^T \end{bmatrix} \quad (10)$$

where $$p_{t,q_k}^T = [1\ \overline{\Psi}_{t,Y,q_k}^{Q,s} \overline{\Psi}_{t,C_0,q_k}^{Q,s} \overline{\Psi}_{t,C_1,q_k}^{Q,s} \overline{\Psi}_{t,Y,q_k}^{Q,s} \cdot \overline{\Psi}_{t,C_0,q_k}^{Q,s} \overline{\Psi}_{t,Y,q_k}^{Q,s} \cdot \overline{\Psi}_{t,C_1,q_k}^{Q,s} \ldots] \quad (11)$$

which may be used to contain or represent all supported MMR. Example MMR related matrix and/or vector constructions are described in the previously mentioned U.S. Provisional Application Ser. No. 62/404,307.

MMR coefficients can be computed or generated by solving the optimization problem as follows:

$$\min_{x_t^{C_0}} \|S_t x_t^{C_0} - v_t^{C_0}\|^2 \qquad (12\text{-}1)$$

$$\min_{x_t^{C_1}} \|S_t x_t^{C_1} - v_t^{C_1}\|^2 \qquad (12\text{-}2)$$

where $x_t^{C_0}$ and $x_t^{C_1}$ denote the MMR coefficients for $C_0$ and $C_1$, respectively.

Let $$A_t = S_t^T S_t \qquad (13\text{-}1)$$

$$b_t^{C_0} = S_t^T v_t^{C_0}, b_t^{C_1} = S_t^T v_t^{C_1} \qquad (13\text{-}2)$$

A closed-form solution for the MMR coefficients may be given as follows:

$$x_t^{C_0} = (S_t^T S_t)^{-1}(S_t^T v_t^{C_0}) = (A_t)^{-1} b_t^{C_0} \qquad (14\text{-}1)$$

$$x_t^{C_1} = (S_t^T S_t)^{-1}(S_t^T v_t^{C_1}) = (A_t)^{-1} b_t^{C_1} \qquad (14\text{-}2)$$

As used herein, a letterbox may refer to black bars on the top, bottom, left or right of an image, a screen, and so forth, and may include a pillar box (e.g., comprising two opposing pillars, comprising two opposing bars, etc.). Pixels used to depict (or articulate) the letterbox may have the same pixel values, and thus may be mapped to a single bin in a corresponding frame-specific d3DMT. Whatever the size of the letterbox is, the letterbox may contribute only one codeword value input to the frame-specific d3DMT. As contributions from the letterbox to the distribution of codeword values are relatively limited to a single bin, the presence of the letterbox may have a relatively small influence or a relatively low impact on the MMR fitting/optimization process. Thus, the MMR coefficients generated from this process may not be particularly optimized for the letterbox and more specifically may not fit particularly well for the bin to which the pixels of the letterbox belong/contribute. As a result, the letterbox in a generated image (or the target image) such as the reshaped SDR image in the forward reshaping stage (204) or the reconstructed HDR image in the backward reshaping stage (206) sometimes appears other than black, even when the corresponding letterbox in the source (or reference) image such as the source (or reference) HDR image in the forward reshaping stage (204) or the reshaped SDR image in the backward reshaping stage (206) appears black.

To resolve this issue, the MMR coefficients obtained from expressions (14) above may be applied as a letterbox constraint to predict the letterbox chroma values in the target image such as the reshaped SDR image in the forward reshaping stage (204) and the source (or reference) HDR image in the backward reshaping stage (206).

Denote the codeword values of the letterbox in the source image (the source HDR image in the forward reshaping stage (204) or the reshaped SDR image in the backward reshaping stage (206)) as $s_{t,LB}^Y$, $s_{t,LB}^{C_0}$, and $s_{t,LB}^{C_1}$, for the three channels, respectively. For the purpose of illustration, consider a YCbCr color space in which the source image is represented. Since the letterbox is black, $s_{LB}^{C_0}$ and $s_{LB}^{C_1}$ should be very close to middle points in the chroma channels of the YCbCr color space, or should be very close to an unnormalized value of $$\frac{2^{b_s}}{2}.$$

Denote the corresponding normalized values of the letterbox in the source image as $$\tilde{s}_{t,LB}^Y = \frac{s_{t,LB}^Y}{2^{b_s}}, \tilde{s}_{t,LB}^{C_0} = \frac{s_{t,LB}^{C_0}}{2^{b_s}}, \tilde{s}_{t,LB}^{C_1} = \frac{s_{t,LB}^{C_1}}{2^{b_s}}$$

for the three channels, respectively.

A vector of MMR terms may be formed, as follows:

$$p_{t,LB}^T = [1\, \tilde{s}_{t,LB}^Y\, \tilde{s}_{t,LB}^{C_0}\, \tilde{s}_{t,LB}^{C_1}\, \tilde{s}_{t,LB}^Y \cdot \tilde{s}_{t,LB}^{C_0}\, \tilde{s}_{t,LB}^Y \cdot \tilde{s}_{t,LB}^{C_1} \ldots] \qquad (15)$$

The predicted (or target) chroma values for the target image (the reshaped SDR image in the forward reshaping stage (204) or the reconstructed HDR image in the backward reshaping stage (206)) can be obtained using the MMR coefficients (in expression (14) above) and the vector (in expression (15) above), as follows:

$$v_{t,LB}^{C_0} = p_{t,LB}^T x_t^{C_0} \qquad (16\text{-}1)$$

$$v_{t,LB}^{C_1} = p_{t,LB}^T x_t^{C_1} \qquad (16\text{-}2)$$

The predicted chroma values as normalized may be compared with the chroma values as normalized in the source image, all of which are expected to be close to ½ in the normalized value range of [0, 1].

In response to determining that the predicted (or target) chroma values (of the letterbox in the target image) as normalized are too different from the reference chroma values (of the letterbox in the source image) as normalized, a constraint may be applied to the MMR computation such that the prediction of target chroma values of the letterbox in the reshaped SDR image is relatively accurate.

The chroma values of the letterbox in the corresponding reference image are denoted $r_{t,LB}^{C_0}$ and $r_{t,LB}^{C_1}$, which should be very close to $$\frac{2^{b_r}}{2}.$$

Denote the normalized values of these chroma values as $$\tilde{r}_{t,LB}^{C_0} = \frac{r_{t,LB}^{C_0}}{2^{b_r}}, \tilde{r}_{t,LB}^{C_1} = \frac{r_{t,LB}^{C_1}}{2^{b_r}},$$

respectively.

The optimization problem for MMR with the letterbox constraint may be formulated as follows:

$$\min_{x_t^{C_0}} \|S_t x_t^{C_0} - v_t^{C_0}\|^2 \text{ s.t. } p_{t,LB}^T\, x_t^{C_0} = \tilde{r}_{t,LB}^{C_0} \qquad (17\text{-}1)$$

$$\min_{x_t^{C_1}} \|S_t x_t^{C_1} - v_t^{C_1}\|^2 \text{ s.t. } p_{t,LB}^T\, x_t^{C_1} = \tilde{r}_{t,LB}^{C_1} \qquad (17\text{-}2)$$

The equality constrained problem can be solved by forming a Lagrangian function with Lagrange multipliers $\lambda^{C_0}$ and $\lambda^{C_1}$, as follows:

$$\min_{x_t^{C_0}, \lambda^{C_0}} \|S_t x_t^{C_0} - v_t^{C_0}\|^2 + \lambda^{C_0}(p_{t,LB}^T\, x_t^{C_0} - \tilde{r}_{t,LB}^{C_0}) \qquad (18\text{-}1)$$

-continued $$\min_{x_t^{C_1}, \lambda^{C_1}} \left\| S_t x_t^{C_1} - v_t^{C_1} \right\|^2 + \lambda^{C_1} \left( p_{t,LB}^T x_t^{C_1} - \ddot{r}_{t,LB}^{C_1} \right) \quad (18\text{-}2)$$

A closed form solution for the MMR coefficients can be obtained as follows:

$$\begin{bmatrix} x_t^{C_0} \\ \lambda^{C_0} \end{bmatrix} = \quad (19\text{-}1)$$

$$\begin{bmatrix} 2S_t^T S_t & p_{t,LB} \\ p_{t,LB}^T & 0 \end{bmatrix}^{-1} \begin{bmatrix} 2S_t v_t^{C_0} \\ \ddot{r}_{t,LB}^{C_0} \end{bmatrix} = \begin{bmatrix} S_t^T S_t & \frac{1}{2} p_{t,LB} \\ \frac{1}{2} p_{t,LB}^T & 0 \end{bmatrix}^{-1} \begin{bmatrix} S_t v_t^{C_0} \\ \frac{1}{2} \ddot{r}_{t,LB}^{C_0} \end{bmatrix}$$

$$\begin{bmatrix} x_t^{C_1} \\ \lambda^{C_1} \end{bmatrix} = \quad (19\text{-}2)$$

$$\begin{bmatrix} 2S_t^T S_t & p_{t,LB} \\ p_{t,LB}^T & 0 \end{bmatrix}^{-1} \begin{bmatrix} 2S_t v_t^{C_1} \\ \ddot{r}_{t,LB}^{C_1} \end{bmatrix} = \begin{bmatrix} S_t^T S_t & \frac{1}{2} p_{t,LB} \\ \frac{1}{2} p_{t,LB}^T & 0 \end{bmatrix}^{-1} \begin{bmatrix} S_t v_t^{C_1} \\ \frac{1}{2} \ddot{r}_{t,LB}^{C_1} \end{bmatrix}$$

Let $$\tilde{A}_t = \begin{bmatrix} S_t^T S_t & \frac{1}{2} p_{t,LB} \\ \frac{1}{2} p_{t,LB}^T & 0 \end{bmatrix} = \begin{bmatrix} A_t & \frac{1}{2} p_{t,LB} \\ \frac{1}{2} = p_{t,LB}^T & 0 \end{bmatrix} \quad (20)$$

$$\tilde{b}_t^{C_0} = \begin{bmatrix} S_t v_t^{C_0} \\ \frac{1}{2} \ddot{r}_{t,LB}^{C_0} \end{bmatrix} = \begin{bmatrix} b_t^{C_0} \\ \frac{1}{2} \ddot{r}_{t,LB}^{C_0} \end{bmatrix}, \quad (21)$$

$$\tilde{b}_t^{C_1} = \begin{bmatrix} S_t v_t^{C_1} \\ \frac{1}{2} \ddot{r}_{t,LB}^{C_1} \end{bmatrix} = \begin{bmatrix} b_t^{C_1} \\ \frac{1}{2} \ddot{r}_{t,LB}^{C_1} \end{bmatrix}$$

Then the solution in expressions (19) above can be rewritten or represented as follows:

$$\begin{bmatrix} x_t^{C_0} \\ \lambda^{C_0} \end{bmatrix} = (\tilde{A}_t)^{-1} \tilde{b}_t^{C_0}, \quad \begin{bmatrix} x_t^{C_1} \\ \lambda^{C_1} \end{bmatrix} = (\tilde{A}_t)^{-1} \tilde{b}_t^{C_1} \quad (22)$$

An example procedure for performing the foregoing letterbox handling operations is shown in TABLE 4 below.

TABLE 4

//STEP 1: from frame-3DMT (trim pass corrected if forward reshaping), build matrix and vectors:

$$S_t = \begin{bmatrix} p_{t,q_0}^T \\ p_{t,q_1}^T \\ \vdots \\ p_{t,q_{K_t-1}}^T \end{bmatrix}$$

where $p_{t,q_k}^T = [1 \; \Psi_{t,Y,q_k}^{Q,s} \; \Psi_{t,C_0,q_k}^{Q,s} \; \Psi_{t,C_1,q_k}^{Q,s} \; \Psi_{t,Y,q_k}^{Q,s} \cdot \Psi_{t,C_0,q_k}^{Q,s} \; \Psi_{t,Y,q_k}^{Q,s} \cdot \Psi_{t,C_1,q_k}^{Q,s} \ldots ]$ $$v_t^{C_0} = \begin{bmatrix} \Psi_{t,C_0,q_0}^{Q,r} \\ \Psi_{t,C_0,q_1}^{Q,r} \\ \vdots \\ \Psi_{t,C_0,q_{K_t-1}}^{Q,r} \end{bmatrix}, \quad v_t^{C_1} = \begin{bmatrix} \Psi_{t,C_1,q_0}^{Q,r} \\ \Psi_{t,C_1,q_1}^{Q,r} \\ \vdots \\ \Psi_{t,C_1,q_{K_t-1}}^{Q,r} \end{bmatrix}.$$

$A_t = S_t^T S_t$, $b_t^{C_0} = S_t^T v_t^{C_0}$, $b_t^{C_1} = S_t^T v_t^{C_1}$
//STEP 2: Solve unconstrained MMR coefficients:
$x_t^{C_0} = (A_t)^{-1} b_t^{C_0}$, $x_t^{C_1} = (A_t)^{-1} b_t^{C_1}$
//STEP 3: if letterbox exists, find the normalized source values of the letterbox: $\ddot{s}_{t,LB}^Y$, $\ddot{s}_{t,LB}^{C_0}$, $\ddot{s}_{t,LB}^{C_1}$, and the normalized reference values of the letterbox: $\ddot{r}_{t,LB}^{C_0}$, $\ddot{r}_{t,LB}^{C_1}$.
$p_{t,LB}^T = [1 \; \ddot{s}_{t,LB}^Y \; \ddot{s}_{t,LB}^{C_0} \; \ddot{s}_{t,LB}^{C_1} \; \ddot{s}_{t,LB}^Y \cdot \ddot{s}_{t,LB}^{C_0} \; \ddot{s}_{t,LB}^Y \cdot \ddot{s}_{t,LB}^{C_1} \ldots ]$
$v_{t,LB}^{C_0} = p_{t,LB}^T x_t^{C_0}$
$v_{t,LB}^{C_1} = p_{t,LB}^T x_t^{C_1}$
// STEP 4: if either of the predicted letterbox chroma values is too off, then solve the constrained MMR (Δ represents a preconfigured or dynamically configurable (e.g., half, etc.) range threshold; an example value of this range threshold may be 0.01, 0.02, and so forth):
if ( ($|v_{t,LB}^{C_0} - \ddot{r}_{t,LB}^{C_0}| > \Delta$ ) || ($|v_{t,LB}^{C_1} - \ddot{r}_{t,LB}^{C_1}| > \Delta$ ) ){

$$\tilde{A}_t = \begin{bmatrix} A_t & \frac{1}{2} p_{t,LB} \\ \frac{1}{2} p_{t,LB}^T & 0 \end{bmatrix}$$

$$\tilde{b}_t^{C_0} = \begin{bmatrix} b_t^{C_0} \\ \frac{1}{2} \ddot{r}_{t,LB}^{C_0} \end{bmatrix}, \quad \tilde{b}_t^{C_1} = \begin{bmatrix} b_t^{C_1} \\ \frac{1}{2} \ddot{r}_{t,LB}^{C_1} \end{bmatrix}$$

TABLE 4-continued $$\begin{bmatrix} x_t^{C_0} \\ \lambda^{C_0} \end{bmatrix} = (\tilde{A}_t)^{-1} \tilde{b}_t^{C_0}, \begin{bmatrix} x_t^{C_1} \\ \lambda^{C_1} \end{bmatrix} = (\tilde{A}_t)^{-1} \tilde{b}_t^{C_1}$$

}

Temporal Stability in HFFR

In some embodiments, chroma reshaping may be performed over a subset of images such as a scene to provide temporal stability, for example in all images depicting the same scene. For each scene, individual statistics of all the images in the scene are collected and then aggregated to generate a single set of reshaping parameters for luma and/or chroma codeword forward and backward reshaping. An example procedure for obtaining a single set of reshaping parameters for a plurality of images (e.g., representing the same scene, etc.) for forward reshaping chroma codewords is shown in TABLE 5 below.

TABLE 5

```
// For a scene starting at t_a and ends at t_b
Ã_sum = 0, b̃_sum^C0 = 0, b̃_sum^C1 = 0;
// Pass 1: build d3DMT
for ( t = t_a; t <= t_b; t++ ) {
   // STEP 1.1: build d3DMT
   Obtain {Ψ_t,Y,q_k^Q,s}, {Ψ_t,C0,q_k^Q,s}, {Ψ_t,C1,q_k^Q,s}, {Ψ_t,C0,q_k^Q,r},
   {Ψ_t,C1,q_k^Q,r} (as TABLEs 1-2);
   Detect letterbox;
   Set letter_box_flag(t) to 1 if letterbox exists; otherwise set
   letter_box_flag(t) to 0;
   if ( letter_box_flag(t) == 1 ) {
      obtain s̈_t,LB^Y, s̈_t,LB^C0, s̈_t,LB^C1, r̈_t,LB^C0, r̈_t,LB^C1;
   }
}
// Pass 2: update 3DMT to correct trim pass, build MMR matrices
// STEP 2.1
Perform luma trim pass detection;
If trim pass exists, set is_trim to 1; otherwise set is_trim to 0;
for ( t = t_a; t <= t_b; t++ ) {
   // STEP 2.2: trim pass correction
   if ( is_trim == 1 ) {
      update {Ψ_t,C0,q_k^Q,r}, {Ψ_t,C1,q_k^Q,r} (as TABLE 3);
   // STEP 2.3: construct MMR matrices
   construct A_t, b_t^C0 and b_t^C1 from {Ψ_t,Y,q_k^Q,s}, {Ψ_t,C0,q_k^Q,s}, {Ψ_t,C1,q_k^Q,s},
   {Ψ_t,C0,q_k^Q,r}, {Ψ_t,C1,q_k^Q,r};
   if ( letter_box_flag(t) == 1 ) {
      construct Ã_t, b̃_t^C0 and b̃_t^C1 as:
      p_t,LB^T = [1 s̈_t,LB^Y s̈_t,LB^C0 s̈_t,LB^C1 s̈_t,LB^Y · s̈_t,LB^C0 s̈_t,LB^Y · s̈_t,LB^C1 ... ];
```

$$\tilde{A}_t = \begin{bmatrix} A_t & \frac{1}{2}p_{t,LB} \\ \frac{1}{2}p_{t,LB}^T & 0 \end{bmatrix}, \tilde{b}_t^{C_0} = \begin{bmatrix} b_t^{C_0} \\ \frac{1}{2}\ddot{r}_{t,LB}^{C_0} \end{bmatrix}, \tilde{b}_t^{C_1} = \begin{bmatrix} b_t^{C_1} \\ \frac{1}{2}\ddot{r}_{t,LB}^{C_1} \end{bmatrix};$$

```
   }
   else {
      construct Ã_t, b̃_t^C0 and b̃_t^C1 as:
```

$$\tilde{A}_t = \begin{bmatrix} A_t & 0 \\ 0 & 0 \end{bmatrix}, \tilde{b}_t^{C_0} = \begin{bmatrix} b_t^{C_0} \\ 0 \end{bmatrix}, \tilde{b}_t^{C_1} = \begin{bmatrix} b_t^{C_1} \\ 0 \end{bmatrix};$$

```
   }
   // STEP 2.4: accumulate matrices:
   Ã_sum = Ã_sum + Ã_t, b̃_sum^C0 = b̃_sum^C0 + b̃_t^C0, b̃_sum^C1 = b̃_sum^C1 + b̃_t^C1;
}
// Pass 3: compute MMR coefficients, check accuracy of letterbox chroma
values
// STEP 3.1: compute unconstrained MMR coefficients
// assume the dimension of Ã_sum is N x N.
```

TABLE 5-continued

```
A_sum = Ã_sum (1: N -1, 1: N -1); // extract a submatrix of Ã_sum by
removing the last row and the last column
b_sum^C0 = b̃_sum^C0 (1: N -1) ; // extract a sub-vector of b̃_sum^C0 by removing
the last row
b_sum^C1 = b̃_sum^C1 (1: N -1); // extract a sub-vector of b̃_sum^C1 by removing
the last row
x^C0 = (A_sum)^-1 b_sum^C0;
x^C1 = (A_sum)^-1 b_sum^C1;
flag = 0; // a flag indicating whether constrained MMR is required
for ( t = t_a; t <= t_b; t++ ) {
   if ( letter_box_flag(t) == 1 ) {
      p_t,LB^T = [1 s̈_t,LB^Y s̈_t,LB^C0 s̈_t,LB^C1 s̈_t,LB^Y · s̈_t,LB^C0 s̈_t,LB^Y · s̈_t,LB^C1 ... ];
      v_t,LB^C0 = p_t,LB^T x_t^C0;
      v_t,LB^C1 = p_t,LB^T x_t^C1;
      if ( (|v_t,LB^C0 - r̈_t,LB^C0| > Δ ) || (|v_t,LB^C1 - r̈_t,LB^C1| > Δ ) ){
         flag = 1;
         break;
      }
   }
}
// STEP 3.2: switch to constrained MMR
if ( flag == 1 ) {
```

$$\begin{bmatrix} x^{C_0} \\ \lambda^{C_0} \end{bmatrix} = (\tilde{A}_{sum})^{-1} \tilde{b}_{sum}^{C_0};$$

$$\begin{bmatrix} x^{C_1} \\ \lambda^{C_1} \end{bmatrix} = (\tilde{A}_{sum})^{-1} \tilde{b}_{sum}^{C_1};$$

}

Additionally, optionally or alternatively, a single set of reshaping parameters may be obtained for the plurality of images (e.g., representing the same scene, etc.) for each of backward reshaping chroma codewords, forward reshaping luma codewords, backward reshaping luma codewords, and so forth.

In some embodiments, linear and segment-based SLBC forward and/or backward reshaping operations are performed as a part of video encoding operations using statistics generated with sliding window operations based on three levels of sliding windows. Example sliding window operations are described in the previously mentioned U.S. Provisional Application Ser. No. 62/636,388.

An overall sequence of images may be used to define a plurality of overlapping segments of images. Each overlapping segment in the plurality of overlapping segments of images may represent an individual sequence of images.

For each current (or currently processed) input image (or frame at time t), frame-level statistics—such as some or all of: scalars, vectors and/or matrixes, etc., used to compute/derive the FLUTs, BLUTs, MMR coefficients—can be computed and stored in a level 3 (or L3) sliding window. Some or all of the frame-level statistics can be computed using some or all of source HDR codewords, reference SDR codewords, reshaped SDR codewords, etc. The statistics for the new input frame may be inserted in a memory structure such as a ring buffer as the most recent L3 data displacing the statistics for the least recent input frame in the memory structure. New output data (or statistics) can be computed using a sliding window operation such as any of: a relatively simple averaging operation, a weighted linear/non-linear combination operation, etc. The new output data can serve as the representative statistics at time $t-\tau_3^a$, where $\tau_3^a$ represents a delay in the L3 sliding window.

The new output data from the L3 sliding window can be inserted into a level 2 (or L2) sliding window as the most recent L2 data displacing the least recent L2 data in a second memory structure. At each new statistics insertion (or at each insertion of the new output data from the L3 sliding window), new statistics based on the L2 sliding window is computed and output. These new statistics computed based on the L2 sliding window can serve as the representative statistics at time $t-\tau_3^a-\tau_2^a$, where $\tau_3^a+\tau_2^a$ represents a delay in the L2 sliding window.

The new output data from L2 window can be inserted into a level 1 (or L1) sliding window as the most recent L1 data displacing the least recent L1 data in a third memory structure. At each such insertion, a new set of statistics is computed based on the L1 sliding window and is used as the final output data (or statistics) for time $t-\tau_3^a-\tau_2^a-\tau_1^a$, where $(\tau_3^a+\tau_2^a+\tau_1^a)$ adds up all delays from each sliding window operation and represents the total delay (latency) in output.

High-Efficiency Reduced Reference SLBC Codec

FIG. 4C illustrates an example process flow for high-efficiency reduced reference SLBC chroma forward and backward reshaping under techniques as described herein. In some embodiments, one or more computing devices or components (e.g., an encoding device/module, a transcoding device/module, a decoding device/module, an inverse tone mapping device/module, a tone mapping device/module, a media device/module, etc.) may perform this process flow. For example, a forward reshaping stage (e.g., 204 of FIG. 2A or FIG. 2C, etc.) of an end-to-end encoding pipeline may be used to carry out some or all operations in this process flow related to forward reshaping, whereas a backward reshaping stage (e.g., 206 of FIG. 2A or FIG. 2C, etc.) of the end-to-end encoding pipeline may be used to carry out some or all operations in this process flow related to backward reshaping.

Forward reshaping MMR coefficients generated with this process flow can be used to forward reshape chroma codewords in a source (or reference) HDR video signal to reshaped chroma codewords in a reshaped SDR video signal and can preserve color fidelity in reshaped SDR images in the reshaped SDR video signal in relation to source (or reference) HDR images in the source HDR video signal.

Backward reshaping MMR coefficients generated with this process flow can be provided to as backward reshaping image metadata, and used by, a recipient device to backward reshape chroma codewords in a reshaped SDR image (e.g., 240, etc.) to reconstructed chroma codewords in a reconstructed HDR image and can preserve color fidelity in the reconstructed HDR image in relation to a source (or reference) HDR image (e.g., 208, etc.) used to generate the reshaped SDR image (240).

A video encoder may implement high-efficiency reduced reference codec architecture as described herein to reduce computational complexity. As illustrated in FIG. 4C, mapping side information (e.g., 246, etc.)—instead of a reference SDR image (e.g., 244 of FIG. 4A or FIG. 4B, etc.) comprising (e.g., all, substantially all, etc.) pixel values of (e.g., all, substantially all, etc.) individual pixels—can be sent from a mapping information stage (e.g., 202, etc.) to later processing stages such as a forward reshaping stage (e.g., 204, etc.), a backward reshaping stage (e.g., 206, etc.), and so forth, of the video encoder. In the HERR encoding operations as illustrated in FIG. 2C and FIG. 4C, a source (or reference) HDR image (e.g., 208, etc.) and the mapping side information (246) associated with the source (or reference) HDR image (208) are used by the later processing stages to construct forward reshaping function(s) (e.g., FLUT, MMR coefficients, etc.), to generate a (forward) reshaped SDR image (e.g., 240, etc.) by forward reshaping the source HDR image (208) based on the forward reshaping function(s), generate backward reshaping image metadata (e.g., 242, etc.) to be used by a recipient device (or a recipient video decoder) to generate a reconstructed HDR image closely approximating the source HDR image (208), to encode the reshaped SDR image (240) with the backward reshaping image metadata (242) in a SLBC video signal, and so forth. In some operational scenarios, the mapping side information (246) may include a reduced number of colors as compared with those represented in the full reference SDR image.

In the HFFR code, a reference SDR image (e.g., 244 of FIG. 4A, etc.) is generated by applying content mapping to each pixel of the source HDR image (208), used to build a d3DMT for chroma forward reshaping. In the HFFR mode, the reference SDR image (244) is not encoded into a SLBC video signal, but rather serves as an approximation reference for building the d3DMT for chroma forward reshaping. Thus, in the HFFR mode, there are many encoding related operations performed at each individual pixel level (e.g., for each of millions of pixels in an image, etc.).

In contrast, in the HERR mode, in block a d3DMT can be generated from the mapping side information (246) such as content mapping information at a reduced number (e.g., 10,000, much fewer than millions, etc.) of sampled points without generating or operating with the full reference SDR image at each individual pixel level. As a result, a large amount of computation or encoding related operations can be saved or avoided As in the full-reference mode, to generate the mapping side information (246) at the mapping information stage (202) in the reduced-reference mode, codewords in the source HDR image (208) (denoted as frame t) can be partitioned into Q bins for each color channel based on minimum and maximum codeword value in each such channel. In total, there are Q×Q×Q 3D bins. Denote the un-normalized minimum codeword value as $L_t^{EDR,ch}$ and the un-normalized maximum codeword value as $H_t^{ERD,ch}$, where channel ch={Y,$C_0$, $C_1$}. The range of bin j is given as follows:

$$\left[L_t^{EDR,ch} + \frac{j \cdot 2^{b_{EDR}}}{g_t^{ch} \cdot Q}, L_t^{EDR,ch} + \frac{(j+1) \cdot 2^{b_{EDR}}}{g_t^{ch} \cdot Q}\right) \quad (23)$$

where $$g_t^{ch} = \left\lfloor \frac{2^{b_{EDR}} - 1}{(H_t^{EDR,ch} - L_t^{EDR,ch})} \right\rfloor$$

and j∈{0, 1, . . . , Q−1}, and where $b_{EDR}$ is the bit depth of HDR (or EDR).

A 3D histogram (denoted as $\Omega_t^{Q,EDR}$) for HDR pixel values (or codeword values) is collected with each 3D bin in the 3D histogram specified by a bin index q=($q^Y$,$q^{C_0}$,$q^{C_1}$) Channel-specific sums (denoted as $\Psi_{t,Y,q}^{Q,EDR}$, $\Psi_{t,C_0,q}^{Q,EDR}$ and $\Psi_{t,C_1,q}^{Q,EDR}$) of HDR pixel values in each 3D bin are computed, respectively. For a non-empty bin (of the 3D histogram $\Omega_t^{Q,EDR}$) having a non-zero number of pixels, channel-specific average HDR pixel values (or codeword values) (denoted as $[\overline{\Psi}_{t,Y,q}^{Q,EDR}, \overline{\Psi}_{t,C_0,q}^{Q,EDR}, \overline{\Psi}_{t,C_1,q}^{Q,EDR}]$) can be computed for all color channels, respectively; mapped SDR pixel values for the HDR pixel values represented in the non-empty bin may also be determined or computed using the content mapping at the average HDR pixel values for all color channels, respectively. Denote $\{q_0, q_1, \ldots, q_{K_t-1}\}$ as $K_t$ bins where $\Omega_{t,q}^{Q,EDR} \neq 0$. Denote the mapped SDR pixel values $\tilde{\Psi}_{t,Y,q}^{Q,SDR}, \tilde{\Psi}_{t,C_0,q}^{Q,SDR}$ and $\tilde{\Psi}_{t,C_1,q}^{Q,SDR}$. An example procedure for collecting mapping statistics such as channel-specific average HDR pixel values $[\overline{\Psi}_{t,Y,q}^{Q,EDR}, \overline{\Psi}_{t,C_0,q}^{Q,EDR}, \overline{\Psi}_{t,C_1,q}^{Q,EDR}]$ and the mapped SDR pixel values $\tilde{\Psi}_{t,Y,q}^{Q,SDR}, \tilde{\Psi}_{t,C_0,q}^{Q,SDR}$ and $\tilde{\Psi}_{t,C_1,q}^{Q,SDR}$ is shown in TABLE 6 below.

TABLE 6

```
// STEP 1: 3D source histogram and 3DMT initialization
```
$\Omega_{t,q}^{Q,EDR} = 0$ where $q = (q^Y, q^{C_0}, q^{C_1})$ and $q^{ch} = 0, \ldots, Q-1$, for each ch = $\{Y, C_0, C_1\}$
$\Psi_{t,Y,q}^{Q,EDR} = 0$ where $q = (q^Y, q^{C_0}, q^{C_1})$ and $q^{ch} = 0, \ldots, Q-1$, for each ch = $\{Y, C_0, C_1\}$
$\Psi_{t,C_0,q}^{Q,EDR} = 0$ where $q = (q^Y, q^{C_0}, q^{C_1})$ and $q^{ch} = 0, \ldots, Q-1$, for each ch = $\{Y, C_0, C_1\}$
$\Psi_{t,C_1,q}^{Q,EDR} = 0$ where $q = (q^Y, q^{C_0}, q^{C_1})$ and $q^{ch} = 0, \ldots, Q-1$, for each ch = $\{Y, C_0, C_1\}$
```
// STEP 2: scan for each pixel in the source and reference
// The number of pixels in the chroma plane is P
// s_{t,i}^{ch} is the un-normalized value of pixel i of channel ch in frame t of the HDR (or EDR)
image
for ( i = 0; i < P; i ++ ){
```

$$q^Y = \left\lfloor \frac{(s_{t,i}^Y - L_t^{EDR,Y}) \cdot g_t^Y}{2^{b_{EDR}}} \cdot Q \right\rfloor; \quad \text{// source luma quantized value}$$

$$q^{C_0} = \left\lfloor \frac{(s_{t,i}^{C_0} - L_t^{EDR,C_0}) \cdot g_t^{C_0}}{2^{b_{EDR}}} \cdot Q \right\rfloor; \quad \text{// source chroma 0 quantized value}$$

$$q^{C_1} = \left\lfloor \frac{(s_{t,i}^{C_1} - L_t^{EDR,C_1}) \cdot g_t^{C_1}}{2^{b_{EDR}}} \cdot Q \right\rfloor; \quad \text{// source chroma 1 quantized value}$$

$\Omega_{t,q}^{Q,EDR}$ ++;      // 3D source histogram $$\Psi_{t,Y,q}^{Q,EDR} = \Psi_{t,Y,q}^{Q,EDR} + \frac{s_{t,i}^Y}{2^{b_{EBR}}}; \quad \text{// sum of source } Y \text{ values}$$

$$\Psi_{t,C_0,q}^{Q,EDR} = \Psi_{t,C_0,q}^{Q,EDR} + \frac{s_{t,i}^{C_0}}{2^{b_{EBR}}}; \quad \text{// sum of source } C_0 \text{ values}$$

$$\Psi_{t,C_1,q}^{Q,EDR} = \Psi_{t,C_1,q}^{Q,EDR} + \frac{s_{t,i}^{C_1}}{2^{b_{EBR}}}; \quad \text{// sum of source } C_1 \text{ values}$$

```
}
K_t = 0;
for ( q^Y = 0; q^Y < Q; q^Y ++ )
  for ( q^{C_0} = 0; q^{C_0} < Q; q^{C_0} ++ )
    for ( q^{C_1} = 0; q^{C_1} < Q; q^{C_1} ++ ) {
      if ( Ω_{t,q}^{Q,EDR} ≠ 0) {
```

$$\overline{\Psi}_{t,Y,q}^{Q,EDR} = \frac{\Psi_{t,Y,q}^{Q,EDR}}{\Omega_{t,q}^{Q,EDR}}; \quad \text{// Average source } Y \text{ values}$$

$$\overline{\Psi}_{t,C_0,q}^{Q,EDR} = \frac{\Psi_{t,C_0,q}^{Q,EDR}}{\Omega_{t,q}^{Q,EDR}}; \quad \text{// Average source } C_0 \text{ values}$$

$$\overline{\Psi}_{t,C_1,q}^{Q,EDR} = \frac{\Psi_{t,C_1,q}^{Q,EDR}}{\Omega_{t,q}^{Q,EDR}}; \quad \text{// Average source } C_1 \text{ values}$$

Obtain the corresponding SDR chroma values: $\tilde{\Psi}_{t,Y,q}^{Q,SDR}, \tilde{\Psi}_{t,C_0,q}^{Q,SDR}$ and $\tilde{\Psi}_{t,C_1,q}^{Q,SDR}$,
    by applying content mapping to the HDR (or EDR) value
$[\overline{\Psi}_{t,Y,q}^{Q,EDR}, \overline{\Psi}_{t,C_0,q}^{Q,EDR}, \overline{\Psi}_{t,C_1,q}^{Q,EDR}]$;
```
      K_t ++; // count the number of non-zero bins
    }
}
```

As can be seen in TABLE 6 above, unlike the full-reference mode, the mapped SDR pixel values in the reduced-reference mode are obtained by applying content mapping to HDR pixel values at the sampled points, instead of averaging the individual SDR pixel values in a reference SDR image. Such content mapping may be applied only to the non-zero bins of the 3D histogram $\Omega_t^{Q,EDR}$ representing the d3DMT. The d3DMT represented by the 3D histogram $\Omega_t^{Q,EDR}$ comprising sampled HDR and SDR codeword statistics $\{\bar{\Psi}_{t,Y,q_k}^{Q,EDR}\}$, $\{\bar{\Psi}_{t,C_0,q_k}^{Q,EDR}\}$, $\{\bar{\Psi}_{t,C_1,q_k}^{Q,EDR}\}$, $\{\tilde{\Psi}_{t,Y,q_k}^{Q,SDR}\}$, $\{\tilde{\Psi}_{t,C_0,q_k}^{Q,SDR}\}$, $\{\tilde{\Psi}_{t,C_1,q_k}^{Q,SDR}\}$, along with the histograms $\{\Omega_{t,q_k}^{Q,EDR}\}$ may be sent as the mapping side information (246) from the mapping information stage (e.g., 202 of FIG. 2C, etc.) to the forward reshaping stage (e.g., 204 of FIG. 2C, etc.) and/or the backward reshaping stage (e.g., 206 of FIG. 2C, etc.) and used to construct forward and backward reshaping functions in the forward reshaping stage (e.g., 204 of FIG. 2C, etc.) and the backward reshaping stage (e.g., 206 of FIG. 2C, etc.).

As used herein, example mapping side information sent with each source HDR image from the mapping information stage (e.g., 202 of FIG. 2C, etc.) to the forward reshaping stage (e.g., 204 of FIG. 2C, etc.) and/or the backward reshaping stage (e.g., 206 of FIG. 2C, etc.) may include, but is not necessarily limited to only, any of: 3DMT information such as $\{\bar{\Psi}_{t,Y,q_k}^{Q,EDR}\}$, $\{\bar{\Psi}_{t,C_0,q_k}^{Q,EDR}\}$, $\{\bar{\Psi}_{t,C_1,q_k}^{Q,EDR}\}$, $\{\tilde{\Psi}_{t,Y,q_k}^{Q,SDR}\}$, $\{\tilde{\Psi}_{t,C_0,q_k}^{Q,SDR}\}$, $\{\tilde{\Psi}_{t,C_1,q_k}^{Q,SDR}\}$ and $\{\Omega_{t,q_k}^{Q,EDR}\}$ where k=0, 1, . . . , $K_t$; letterbox information such as a letterbox indicator (denoted as "letter_box_flag"), source HDR pixel (or codeword) values $[\ddot{s}_{t,LB}^{Y}, \ddot{s}_{t,LB}^{C_0}, \ddot{s}_{t,LB}^{C_1}]$ of the letterbox if any, mapped SDR pixel (or codeword) values $[\ddot{r}_{t,LB}^{Y}, \ddot{r}_{t,LB}^{C_0}, \ddot{r}_{t,LB}^{C_1}]$ of the letterbox in the SDR domain; and so forth.

Chroma Forward Reshaping

The d3DMT from the mapping information stage (202 of FIG. 2C) is received by an unconstrained MMR matrix construction 460 in the forward reshaping stage (204 of FIG. 2C). In block 468, an unconstrained least-squares problem is formulated to solve for MMR coefficients that are to be used to forward reshape chroma codewords (including any letterbox source HDR chroma codewords if applicable) in the source HDR image (208) into reshaped chroma codewords (including any letterbox reshaped SDR chroma codewords if applicable) in a reshaped SDR image (e.g., 240, etc.).

From the d3DMT provided in the mapping side information (246), two vectors can be constructed using the SDR chroma values of the non-zero bins (or the non-empty bins) of the 3D histogram representing the d3DMT, as follows:

$$v_t^{C_0,fwd} = \begin{bmatrix} \Psi_{t,C_0,q_0}^{Q,SDR} \\ \Psi_{t,C_0,q_1}^{Q,SDR} \\ \vdots \\ \Psi_{t,C_0,q_{K_t-1}}^{Q,SDR} \end{bmatrix}, v_t^{C_1,fwd} = \begin{bmatrix} \Psi_{t,C_1,q_0}^{Q,SDR} \\ \Psi_{t,C_1,q_1}^{Q,SDR} \\ \vdots \\ \Psi_{t,C_1,q_{K_t-1}}^{Q,SDR} \end{bmatrix} \quad (24)$$

Further, a matrix can be constructed using the average HDR pixel values of the non-zero bins, as follows:

$$S_t^{fwd} = \begin{bmatrix} p_{t,q_0}^{fwd^T} \\ p_{t,q_1}^{fwd^T} \\ \vdots \\ p_{t,q_{K_t-1}}^{fwd^T} \end{bmatrix} \quad (25)$$

where $$p_{t,q_k}^{fwd^T} = [1 \; \bar{\Psi}_{t,Y,q_k}^{Q,EDR} \bar{\Psi}_{t,C_0,q_k}^{Q,EDR} \bar{\Psi}_{t,C_1,q_k}^{Q,EDR} \\ \bar{\Psi}_{t,Y,q_k}^{Q,EDR} \bar{\Psi}_{t,C_0,q_k}^{Q,EDR} \bar{\Psi}_{t,Y,q_k}^{Q,EDR} \bar{\Psi}_{t,C_1,q_k}^{Q,EDR} \\ \bar{\Psi}_{t,C_1,q_k}^{Q,EDR} \ldots] \quad (26)$$

which contains all supported MMR terms.

Let $$A_t^{fwd} = (S_t^{fwd})^T S_t^{fwd}, b_t^{C_0,fwd} = (S_t^{fwd})^T v_t^{C_0,fwd}, b_t^{C_1,fwd} = (S_t^{fwd})^T v_t^{C_1,fwd} \quad (27)$$

The unconstrained MMR coefficients may be obtained in a closed form by solving the unconstrained least-squares problem using the unconstrained MMR matrix, as follows:

$$x_t^{C_0,fwd} = (A_t^{fwd})^{-1} b_t^{C_0,fwd}, x_t^{C_1,fwd} = (A_t^{fwd})^{-1} b_t^{C_1,fwd} \quad (28)$$

The source HDR image (208), or distributions of luma and/or chroma codewords therein, can be analyzed in the mapping information stage (202 of FIG. 2C) to detect any existence of a letterbox in the source HDR image (208). The mapping side information (246) may include a letterbox indicator from the mapping information stage (202 of FIG. 2C) to the latter processing stages such as the forward reshaping stage (204 of FIG. 2C) and the backward reshaping stage (206 of FIG. 2C). In block 466, it is determined, for example in the forward reshaping stage (204 of FIG. 2C) based on the letterbox indicator in the mapping side information (246) received from the mapping information stage (202 of FIG. 2C), whether a letterbox (e.g., a single letterbox, multiple letterboxes, etc.) exists in the source HDR image (208).

In response to determining that a letterbox does not exist in the source HDR image (208), in block 464, the MMR coefficients generated by the unconstrained MMR matrix construction block (462) by solving the unconstrained least-squares problem are applied to forward reshape chroma codewords in the source HDR image (208) into reshaped chroma codewords in a reshaped SDR image (e.g., 240, etc.), which can be outputted to recipient devices in a coded bitstream (e.g., a SLBC video signal, 112 of FIG. 1, etc.). Reshaped luma codewords in the reshaped SDR image (240) may be obtained by a luma forward reshaping part (e.g., 214 of FIG. 2A or FIG. 2B, etc.) by forward reshaping luma codewords in the source HDR image (208).

On the other hand, in response to determining that a letterbox exists in the source HDR image (208), to guarantee the color (or to maintain color fidelity, etc.) of the letterbox in the reshaped SDR image (240), in block 468, the MMR coefficients generated by the unconstrained MMR matrix construction block (462) by solving the unconstrained least-squares problem are applied to forward reshape chroma codewords of the letterbox in the source HDR image (208) into reshaped chroma codewords of a corresponding letterbox in a reshaped SDR image (240).

In some embodiments, when the letterbox in the source HDR image is detected in the mapping information stage (202 of FIG. 2C), the normalized HDR pixel values (denoted as $[\ddot{s}_{t,LB}^{Y}, \ddot{s}_{t,LB}^{C_0}, \ddot{s}_{t,LB}^{C_1}]$) of the letterbox is determined. Content mapping can be applied to the normalized HDR pixel values $[\ddot{s}_{t,LB}^{Y}, \ddot{s}_{t,LB}^{C_0}, \ddot{s}_{t,LB}^{C_1}]$ to obtain corresponding mapped SDR pixel values (denoted as $[\ddot{r}_{t,LB}^{Y}, \ddot{r}_{t,LB}^{C_0}, \ddot{r}_{t,LB}^{C_1}]$) of the letterbox in the SDR domain. Letterbox information including but not necessarily limited to only any, some or all of the normalized HDR pixel values $[\ddot{s}_{t,LB}^{Y}, \ddot{s}_{t,LB}^{C_0}, \ddot{s}_{t,LB}^{C_1}]$ and the corresponding mapped SDR pixel values $[\ddot{r}_{t,LB}^{Y}, \ddot{r}_{t,LB}^{C_0}, \ddot{r}_{t,LB}^{C_1}]$ can be sent as a part of mapping side information (246) from the mapping information stage (202 of FIG. 2C) to the forward reshaping stage (204 of FIG. 2C) and/or the backward reshaping stage (206 of FIG. 2C).

In block 470, a vector can be constructed as follows:

$$p_{t,LB}^{fwd^T} = [1 \, \bar{s}_{t,LB}^{Y} \bar{s}_{t,LB}^{C_0} \bar{s}_{t,LB}^{C_1} \bar{s}_{t,LB}^{Y} \cdot \bar{s}_{t,LB}^{C_0} \bar{s}_{t,LB}^{Y} \cdot \bar{s}_{t,LB}^{C_1} \, \ldots \,] \quad (29)$$

Predicted letterbox values may be computed using the unconstrained MMR coefficients, as follows:

$$v_{t,LB}^{C_0,fwd} = p_{t,LB}^{fwd^T} x_t^{C_0,fwd}, \text{ and } v_{t,LB}^{C_1,fwd} = p_{t,LB}^{fwd^T} x_t^{C_1,fwd} \quad (30)$$

It is then determined in block 470 whether the reshaped chroma codewords of the corresponding letterbox in the reshaped SDR image (240), as predicted with the MMR coefficients generated from solving the unconstrained least-squares problem in expressions (30) above, are sufficiently accurate (e.g., based on one or more accuracy/range thresholds such as Δ, etc.).

In response to determining that the reshaped chroma codewords of the corresponding letterbox in the reshaped SDR image (240), as predicted with the MMR coefficients generated from solving the unconstrained least-squares problem, are sufficiently accurate, the process flow goes to block 464 in which the MMR coefficients generated by the unconstrained MMR matrix construction block (462) by solving the unconstrained least-squares problem are applied to forward reshape chroma codewords in the source HDR image (208) into reshaped chroma codewords in a reshaped SDR image (e.g., 240, etc.), which can be outputted to recipient devices in a coded bitstream (e.g., a SLBC video signal, 112 of FIG. 1, etc.). Reshaped luma codewords in the reshaped SDR image (240) may be obtained by a luma forward reshaping part (e.g., 214 of FIG. 2A or FIG. 2C, etc.) by forward reshaping luma codewords in the source HDR image (208).

On the other hand, in response to determining that the reshaped chroma codewords of the corresponding letterbox in the reshaped SDR image (240), as predicted with the MMR coefficients generated from solving the unconstrained least-squares problem, are not sufficiently accurate, a constrained MMR matrix is constructed by a constrained MMR matrix construction block 490.

For example, the reshaped chroma codewords of the corresponding letterbox in the reshaped SDR image (240) are deemed as not sufficient accurate if either of the predicted pixel values of the letterbox for the reshaped chroma codewords of the letterbox is too different (e.g., $(|v_{t,LB}^{C_0,fwd} - \ddot{r}_{t,LB}^{C_0}| > \Delta) \| (|v_{t,LB}^{C_1,fwd} - \ddot{r}_{t,LB}^{C_1}| > \Delta)$) from the mapped SDR pixel values of the letterbox as received in the mapping side information (246). Otherwise, the reshaped chroma codewords of the corresponding letterbox in the reshaped SDR image (240) are deemed as sufficient accurate.

In block 486, MMR coefficients that are to be used to forward reshape chroma codewords of the letterbox in the source HDR image (208) into reshaped chroma codewords of the corresponding letterbox in the reshaped SDR image (240) are generated through solving the optimization problem (e.g., a minimization problem, etc.) using the constrained MMR matrix.

For example, the MMR coefficients can be obtained using the constrained MMR matrix as follows:

$$\tilde{A}_t^{fwd} = \begin{bmatrix} A_t^{fwd} & \frac{1}{2} p_{t,LB}^{fwd} \\ \frac{1}{2} p_{t,LB}^{fwd^T} & 0 \end{bmatrix} \quad (31)$$

$$\tilde{b}_t^{C_0,fwd} = \begin{bmatrix} b_t^{C_0,fwd} \\ \frac{1}{2} r_{t,LB}^{C_0} \end{bmatrix}, \tilde{b}_t^{C_1,fwd} = \begin{bmatrix} b_t^{C_1,fwd} \\ \frac{1}{2} r_{t,LB}^{C_1} \end{bmatrix} \quad (32)$$

$$\begin{bmatrix} x_t^{C_0,fwd} \\ \lambda^{C_0,fwd} \end{bmatrix} = (\tilde{A}_t^{fwd})^{-1} \tilde{b}_t^{C_0,fwd}, \quad (33)$$

$$\begin{bmatrix} x_t^{C_1,fwd} \\ \lambda^{C_1,fwd} \end{bmatrix} = (\tilde{A}_t^{fwd})^{-1} \tilde{b}_t^{C_1,fwd}$$

The process flow then goes to block 464 in which the MMR coefficients generated by the constrained MMR matrix construction block (420) by solving the constrained least-squares problem are applied to forward reshape chroma codewords in the source HDR image (208) into reshaped chroma codewords in a reshaped SDR image (e.g., 240, etc.), which can be outputted to recipient devices in a coded bitstream (e.g., a SLBC video signal, 112 of FIG. 1, etc.). Reshaped luma codewords in the reshaped SDR image (240) may be obtained by a luma forward reshaping part (e.g., 214 of FIG. 2A or FIG. 2C, etc.) by forward reshaping luma codewords in the source HDR image (208).

Chroma Backward Reshaping

In the full-reference mode, a first d3DMT is constructed for forward reshaping based on a source HDR image (e.g., 208, etc.) and a reference SDR image; and a second different d3DMT is constructed for backward reshaping based on the source HDR image and a reshaped SDR image (e.g., 240, etc.) generated by forward reshaping the source HDR image (208). In the reduced-reference mode, the same d3DMT, as constructed by the mapping information stage (202 of FIG. 2C), can be used for both forward and backward reshaping to reduce computational complexity.

The d3DMT from the mapping information stage (202 of FIG. 2C) is received by an unconstrained MMR matrix construction 472 in the backward reshaping stage (206 of FIG. 2C). In block 480, an unconstrained least-squares problem is formulated to solve for MMR coefficients that are to be used to backward reshape chroma codewords (including any letterbox reshaped SDR chroma codewords if applicable) in the reshaped SDR image (240) into reconstructed chroma codewords (including any letterbox reconstructed HDR chroma codewords if applicable) in a reconstructed HDR image.

From the d3DMT provided in the mapping side information (246), two vectors can be constructed using the average HDR chroma values of the non-zero bins (or the non-empty bins) of the 3D histogram representing the d3DMT, as follows:

$$v_t^{C_0} = \begin{bmatrix} \Psi_{t,C_0,q_0}^{Q,EDR} \\ \Psi_{t,C_0,q_1}^{Q,EDR} \\ \vdots \\ \Psi_{t,C_0,q_{K_t-1}}^{Q,EDR} \end{bmatrix}, v_t^{C_1} = \begin{bmatrix} \Psi_{t,C_1,q_0}^{Q,EDR} \\ \Psi_{t,C_1,q_1}^{Q,EDR} \\ \vdots \\ \Psi_{t,C_1,q_{K_t-1}}^{Q,EDR} \end{bmatrix} \quad (34)$$

Further, a matrix can be constructed using the SDR pixel values of the non-zero bins as follows:

$$S_t^{bwd} = \begin{bmatrix} p_{t,q_0}^{bwd^T} \\ p_{t,q_1}^{bwd^T} \\ \vdots \\ p_{t,q_{K_t-1}}^{bwd^T} \end{bmatrix} \quad (35)$$

where $$p_{t,q_k}^{bwd^T} = [1 \; \tilde{\psi}_{t,Y,q_k}^{Q,SDR} \tilde{\psi}_{t,C_0,q_k}^{Q,SDR} \; \tilde{\psi}_{t,C_1,q_k}^{Q,SDR} \tilde{\psi}_{t,Y,q_k}^{Q,SDR} \tilde{\psi}_{t,C_0,q_k}^{Q,SDR} \; \tilde{\psi}_{t,Y,q_k}^{Q,SDR} \tilde{\psi}_{t,C_1,q_k}^{Q,SDR} \; \ldots ] \quad (36)$$

which contains all supported MMR terms.
Let $$A_t^{bwd} = (S_t^{bwd})^T S_t^{bwd}, b_t^{C_0,bwd} = (S_t^{bwd})^T v_t^{C_0,bwd} \quad (37)$$

$$b_t^{C_1,bwd} = (S_t^{bwd})^T v_t^{C_1,bwd} \quad (38)$$

The unconstrained MMR coefficients may be obtained in a closed form by solving the unconstrained least-squares problem using the unconstrained MMR matrix, as follows:

$$x_t^{C_0,bwd} = (A_t^{bwd})^{-1} b_t^{C_0,bwd}, x_t^{C_1,bwd} = (A_t^{bwd})^{-1} b_t^{C_1,bwd}. \quad (39)$$

In block 474, it is determined, for example in the backward reshaping stage (206 of FIG. 2C) based on the letterbox indicator in the mapping side information (246) received from the mapping information stage (202 of FIG. 2C), whether a letterbox (e.g., a single letterbox, multiple letterboxes, etc.) exists in the source HDR image (208).

In response to determining that a letterbox does not exist in the source HDR image (208), in block 488, the MMR coefficients generated by the unconstrained MMR matrix construction block (480) by solving the unconstrained least-squares problem are written as backward reshaping image metadata along with the reshaped SDR image (240) in the coded bitstream.

On the other hand, in response to determining that a letterbox exists in the source HDR image (208), to guarantee the color (or to maintain color fidelity, etc.) of the letterbox in the reshaped SDR image (240), in block 476, the MMR coefficients generated by the unconstrained MMR matrix construction block (480) by solving the unconstrained least-squares problem are applied to backward reshape chroma codewords of the letterbox in the reshaped SDR image (240) into reconstructed chroma codewords of a corresponding letterbox in the reconstructed HDR image.

In some embodiments, when the letterbox in the source HDR image is detected in the mapping information stage (202 of FIG. 2C), a vector is constructed as follows:

$$p_{t,LB}^{bwd^T} = [1 \; \ddot{r}_{t,LB}^Y \; \ddot{r}_{t,LB}^{C_0} \; \ddot{r}_{t,LB}^{C_1} \; \ddot{r}_{t,LB}^Y \cdot \ddot{r}_{t,LB}^{C_0} \; \ddot{r}_{t,LB}^Y \cdot \ddot{r}_{t,LB}^{C_1} \; \ldots ] \quad (40)$$

Predicted letterbox values may be computed using the unconstrained MMR coefficients, as follows:

$$v_{t,LB}^{C_0,bwd} = p_{t,LB}^{bwd^T} x_t^{C_0,bwd}, \text{ and } v_{t,LB}^{C_1,bwd} = p_{t,LB}^{bwd^T} x_t^{C_1,bwd} \quad (41)$$

It is then determined in block 478 whether the reconstructed chroma codewords of the corresponding letterbox in the reconstructed HDR image, as predicted with the MMR coefficients generated from solving the unconstrained least-squares problem in expressions (41) above, are sufficiently accurate (e.g., based on one or more accuracy/range thresholds such as Δ, etc.).

In response to determining that the reconstructed chroma codewords of the corresponding letterbox in the reconstructed HDR image, as predicted with the MMR coefficients generated from solving the unconstrained least-squares problem, are sufficiently accurate, the process flow goes to block 488 in which the MMR coefficients generated by the unconstrained MMR matrix construction block (480) by solving the unconstrained least-squares problem are written as backward reshaping image metadata along with the reshaped SDR image (240) in the coded bitstream.

On the other hand, in response to determining that the reconstructed chroma codewords of the corresponding letterbox in the reconstructed HDR image, as predicted with the MMR coefficients generated from solving the unconstrained least-squares problem, are not sufficiently accurate, a constrained MMR matrix is constructed by a constrained MMR matrix construction block 482.

For example, the reshaped chroma codewords of the corresponding letterbox in the reshaped SDR image (240) are deemed as not sufficient accurate if either of the predicted values is too different $((|v_{t,LB}^{C_0,bwd} - \ddot{s}_{t,LB}^{C_0}| > \Delta) \| (|v_{t,LB}^{C_1,bwd} - \ddot{s}_{t,LB}^{C_1}| > \Delta))$. Otherwise, the reconstructed chroma codewords of the corresponding letterbox in the reconstructed HDR image are deemed as sufficient accurate.

In block 484, MMR coefficients that are to be used to backward reshape chroma codewords of the letterbox in the reshaped SDR image (240) into reconstructed chroma codewords of the corresponding letterbox in the reconstructed HDR image are generated through solving the optimization problem (e.g., a minimization problem, etc.) using the constrained MMR matrix.

For example, the MMR coefficients can be obtained using the constrained MMR matrix as follows:

$$\tilde{A}_t^{bwd} = \begin{bmatrix} A_t^{bwd} & \frac{1}{2} p_{t,LB}^{bwd} \\ \frac{1}{2} p_{t,LB}^{bwd^T} & 0 \end{bmatrix} \quad (42)$$

$$\tilde{b}_t^{C_0,bwd} = \begin{bmatrix} b_t^{C_0,bwd} \\ \frac{1}{2} \ddot{s}_{t,LB}^{C_0} \end{bmatrix}, \tilde{b}_t^{C_1,bwd} = \begin{bmatrix} b_t^{C_1,bwd} \\ \frac{1}{2} \ddot{s}_{t,LB}^{C_1} \end{bmatrix} \quad (43)$$

$$\begin{bmatrix} x_t^{C_0,bwd} \\ \lambda^{C_0,bwd} \end{bmatrix} = (\tilde{A}_t^{bwd})^{-1} \tilde{b}_t^{C_0,bwd}, \quad (44)$$

$$\begin{bmatrix} x_t^{C_1,bwd} \\ \lambda^{C_1,bwd} \end{bmatrix} = (\tilde{A}_t^{bwd})^{-1} \tilde{b}_t^{C_1,bwd}$$

The process flow then goes to block 488 in which the MMR coefficients generated by the constrained MMR matrix construction block (484) by solving the constrained least-squares problem are written as backward reshaping image metadata along with the reshaped SDR image (240) in the coded bitstream.

Luma Forward and Backward Reshaping

In some embodiments, CDF matching can be employed to build a forward reshaping look-up table (FLUT). In block 450, a 1D luma histograms is constructed using the d3DMT generated from source HDR codeword values and SDR codeword values at sampled points (e.g., a sampling grid in each of the HDR and SDR image frames, etc.), not from the source HDR image (208) and a reference SDR image at each unsampled pixel level. Since a 3D histogram representing the d3DMT is already available in the mapping side information (246) from the mapping information stage (202 of FIG. 2C), the forward reshaping stage (204 of FIG. 2C) can build the 1D luma histogram by summing up in the 3D histogram all 3D bins whose luma values correspond to the same luma bin in the 1D luma histogram.

CDF matching may be performed by a CDF matching block (e.g., 218, etc.) to generate an interpolated FLUT 452 based on the 1D luma histogram. The interpolated FLUT may be smoothened to generate a smoothed FLUT. In addition, a backward reshaping LUT (BLUT) may be constructed by a BLUT construction block 456 using codeword mappings or curve (e.g., 8-piece second order polynomials, etc.) represented in the smoothened FLUT.

Two example methods or procedures for build the 1D luma histograms with different computational costs are illustrated in TABLEs 7 and 8 below. In the first method as illustrated in TABLE 7, the centroid of each bin is computed. CDF matching is performed using the centroids. This requires relatively high-cost computation but generate mappings with relatively high precision. In the second method as illustrated in TABLE 8, each bin is represented by its mid-point, which can be easily determined with relatively low-cost computation. The two methods are presented in the following.

TABLE 7

```
// initialization
h̃_t^EDR(n) = 0 for n = 0, . . . , Q-1;
h̃_t^SDR(n) = 0 for n = 0, . . . , Q-1;
ṽ_t^EDR(n) = 0 for n = 0, . . . , Q-1;
ṽ_t^SDR(n) = 0 for n = 0, . . . , Q-1;
// STEP 1: build histograms for HDR (or EDR) and SDR from mapping side information
for ( k = 0; k < K_t; k++){
    extract HDR (or EDR) luma value, Ψ̄_{t,Y,q_k}^{Q,EDR};
    extract SDR luma value, Ψ̃_{t,Y,q_k}^{Q,SDR};
    // find the bin index in the 1D luma histograms
    n^EDR = round (Ψ̄_{t,Y,q_k}^{Q,EDR} · Q);
    n^SDR = round (Ψ̃_{t,Y,q_k}^{Q,SDR} · Q);
    // accumulate 1D luma histograms
    h̃_t^EDR(n^EDR) = h̃_t^EDR(n^EDR) + Ω_{t,q_k}^{Q,EDR} ;
    h̃_t^SDR(n^SDR) = h̃_t^SDR(n^SDR) + Ω_{t,q_k}^{Q,EDR} ;
    // find the centroid of the bin
    ṽ_t^EDR(n^EDR) = ṽ_t^EDR(n^EDR) + Ω_{t,q_k}^{Q,EDR} · Ψ̄_{t,Y,q_k}^{Q,EDR};
    ṽ_t^SDR(n^SDR) = ṽ_t^SDR(n^SDR) + Ω_{t,q_k}^{Q,EDR} · Ψ̃_{t,Y,q_k}^{Q,SDR};
}
// STEP 2: if a bin has non-zero pixels, use the centroid of the bin as the sample point;
otherwise use the mid-point of the bin
for ( n = 0; n < Q; n++ ) {
    if ( h̃_t^EDR (n) > 0 )
        ṽ_t^EDR(n) = ṽ_t^EDR(n)/h̃_t^EDR(n); // bin centroid
    else
```

$$\tilde{v}_t^{SDR}(n) = \frac{n + 0.5}{Q}; \quad // \text{ bin mid-point}$$

```
    if ( h̃_t^SDR (n) > 0 )
        ṽ_t^SDR(n) = ṽ_t^SDR(n)/h̃_t^SDR(n); // bin centroid
    else
```

$$\tilde{v}_t^{EDR}(n) = \frac{n + 0.5}{Q}; \quad // \text{ bin mid-point}$$

```
}
// STEP 3: perform CDF matching
Obtain transfer function F_t^Q(n) via CDF matching based on {h̃_t^EDR(n)} and {h̃_t^SDR(n)},
where the SDR sample point of each bin is {ṽ_t^SDR(n)}.
// STEP 4: perform interpolation
bi-linear interpolation from Q-bin F_t^Q(n) to full b_EDR -bit F_t^EDR(·), where the Q sample
points are {ṽ_t^EDR(n)}.
// STEP 5: perform smoothing
The interpolated FLUT is not smooth enough for us to construct the backward reshaping
LUT and approximated by 8-piece 2^nd order polynomial. We need to use average filter to
smooth the non-flat region of the FLUT. Assume the start point of the non-flat region is
x_1, and the end point of the non-flat region is x_2.
```

$$FLUT_t(x) = \sum_{k=-W}^{W} \frac{1}{2W+1} F_t^{EDR}(x+k) \quad \text{for } x = x_1, x_1 + 1, \ldots, x_2$$

```
// STEP 6: construct the backward reshaping LUT by tracking back FLUT.
//approximate histograms of HDR (or EDR) at each codeword using {h̃_t^EDR(n)}:
for ( k = 0; k < 2^{b_EDR} ; k++ ){
```

$$n = \left\lfloor \frac{k}{2^{b_{EDR}}} \cdot Q \right\rfloor;$$

TABLE 7-continued $$h_t^{EDR}(k) = \frac{\tilde{h}_t^{EDR}(n)}{Q};$$

}
Obtain BLUT using FLUT$_t$ and {h$_t^{EDR}$ (k)}. (refer to Sec. II)

TABLE 8

// initialization
$\tilde{h}_t^{EDR}$(n) = 0 for n = 0, . . . , Q-1;
$\tilde{h}_t^{SDR}$(n) = 0 for n = 0, . . . , Q-1;
// STEP 1: build histograms for HDR (or EDR) and SDR from mapping table
for ( k = 0; k < K$_t$; k++){
   extract EDR luma value, $\Psi_{t,Y,q_k}^{Q,EDR}$;
   extract SDR luma value, $\Psi_{t,Y,q_k}^{Q,SDR}$;
   // find bin index in the 1D luma histograms
   n$^{EDR}$ = round ($\Psi_{t,Y,q_k}^{Q,EDR}$ · Q);
   n$^{SDR}$ = round ($\Psi_{t,Y,q_k}^{Q,SDR}$ · Q);
   // accumulate 1D luma histograms
   $\tilde{h}_t^{EDR}$ (n$^{EDR}$) = $\tilde{h}_t^{EDR}$ (n$^{EDR}$) + $\Omega_{t,q_k}^{Q,EDR}$;
   $\tilde{h}_t^{SDR}$ (n$^{SDR}$) = $\tilde{h}_t^{SDR}$ (n$^{SDR}$) + $\Omega_{t,q_k}^{Q,EDR}$;
}
// STEP 2: compute mid-points of bins
for ( n = 0; n < Q; n++ ) {
   // bin mid-point $$\tilde{v}_t^{EDR}(n) = \frac{n+0.5}{Q};$$

$$\tilde{v}_t^{SDR}(n) = \frac{n+0.5}{Q};$$

}
// STEP 3: perform CDF matching
Obtain transfer function F$_t^Q$(n) via CDF matching based on {$\tilde{h}_t^{EDR}$(n)} and {$\tilde{h}_t^{SDR}$(n)},
where the SDR sample point of each bin is {$\tilde{v}_t^{SDR}$(n)}.
// STEP 4: perform interpolation
bi-linear interpolation from Q-bin F$_t^Q$(n) to full b$_{EDR}$ –bit F$_t^{EDR}$(·), where the Q sample
points are {$\tilde{v}_t^{EDR}$(n)}.
// STEP 5: perform smoothing
The interpolated FLUT is not smooth enough for us to construct the backward reshaping
LUT and approximated by 8-piece 2$^{nd}$ order polynomial. We need to use average filter to
smooth the non-flat region of the FLUT. Assume the start point of the non-flat region is
x$_1$, and the end point of the non-flat region is x$_2$.

$$FLUT_t(x) = \sum_{k=-W}^{W} \frac{1}{2W+1} F_t^{EDR}(x+k) \text{ for } x = x_1, x_1+1, \ldots, x_2$$

// STEP 6: construct the backward reshaping LUT by tracking back FLUT.
//approximate histograms of HDR (or EDR) at each codeword using {$\tilde{h}_t^{EDR}$(n)}:
for ( k = 0; k < 2$^{b_{EDR}}$; k++ ){

$$n = \left\lfloor \frac{k}{2^{b_{EDR}}} \cdot Q \right\rfloor;$$

$$h_t^{EDR}(k) = \frac{\tilde{h}_t^{EDR}(n)}{Q};$$

}
Obtain BLUT using FLUT$_t$ and {h$_t^{EDR}$(k)}.

Temporal Stability in HERR

In some embodiments, as in the HFFR mode, in the HERR mode, luma and chroma reshaping may be performed over a subset of images such as a scene to provide temporal stability, for example in all images depicting the same scene. For each scene, individual statistics of all the images in the scene are collected and then aggregated to generate a single set of reshaping parameters for luma and/or chroma codeword forward and backward reshaping. An example procedure for obtaining a single set of reshaping parameters for a plurality of images (e.g., representing the same scene, etc.) for forward and/backward reshaping luma and/or chroma codewords is shown in TABLE 9 below.

TABLE 9

```
// the side information of each frame is available to the encoder
// For a scene starting at t_a and ends at t_b
// initialization
```
$\tilde{A}_{sum}^{fwd} = 0, \tilde{b}_{sum}^{C_0,fwd} = 0, \tilde{b}_{sum}^{C_1,fwd} = 0, \tilde{A}_{sum}^{bwd} = 0, \tilde{b}_{sum}^{C_0,bwd} = 0, \tilde{b}_{sum}^{C_1,bwd} = 0$
$\tilde{h}_{sum}^{EDR}(n) = 0, \tilde{h}_{sum}^{SDR}(n) = 0$ for $n = 0, \ldots, Q-1$;
$\tilde{v}_{sum}^{EDR}(n) = 0, \tilde{v}_{sum}^{SDR}(n) = 0$ for $n = 0, \ldots, Q-1$;

```
// STEP 1: compute 1D luma histograms, build MMR matrices
for ( t = t_a; t <= t_b; t++ ) {
    // STEP 1.1: construct 1D luma histograms (Box 10)
```
Obtain $\tilde{h}_t^{EDR}(n), \tilde{h}_t^{SDR}(n)$ for $n = 0, \ldots, Q-1$;
Obtain $\tilde{v}_t^{EDR}(n), \tilde{v}_t^{SDR}(n)$ for $n = 0, \ldots, Q-1$;
```
    // STEP 1.2: accumulate histograms
    for ( n = 0; n < Q; n++ ){
```
$\quad\tilde{h}_{sum}^{EDR}(n) = \tilde{h}_{sum}^{EDR}(n) + \tilde{h}_t^{EDR}(n);$
$\quad\tilde{h}_{sum}^{SDR}(n) = \tilde{h}_{sum}^{SDR}(n) + \tilde{h}_t^{SDR}(n);$
$\quad\tilde{v}_{sum}^{EDR}(n) = \tilde{v}_{sum}^{EDR}(n) + \tilde{v}_t^{EDR}(n);$
$\quad\tilde{v}_{sum}^{SDR}(n) = \tilde{v}_{sum}^{SDR}(n) + \tilde{v}_t^{SDR}(n);$
```
}
    // STEP 1.3: construct forward reshaping MMR matrices
```
construct $A_t^{fwd}, b_t^{C_0,fwd}$ and $b_t^{C_1,fwd}$ from $\{\Psi_{t,Y,q_k}^{Q,EDR}\}, \{\Psi_{t,C_0,q_k}^{Q,EDR}\}, \{\Psi_{t,C_1,q_k}^{Q,EDR}\},$
$\{\Psi_{t,C_0,q_k}^{Q,SDR}\}, \{\Psi_{t,C_1,q_k}^{Q,SDR}\};$ // Sec. IV.2
```
    if ( letter_box_flag(t) == 1 ) {
        construct
```
$\tilde{A}_t^{fwd}, \tilde{b}_t^{C_0,fwd}$ and $\tilde{b}_t^{C_1,fwd}$ as:
$p_{t,LB}^{fwd^T} = [1 \; \ddot{s}_{t,LB}^Y \; \ddot{s}_{t,LB}^{C_0} \; \ddot{s}_{t,LB}^{C_1} \; \ddot{s}_{t,LB}^Y \cdot \ddot{s}_{t,LB}^{C_0} \; \ddot{s}_{t,LB}^Y \cdot \ddot{s}_{t,LB}^{C_1} \; \ldots ];$ $$\tilde{A}_t^{fwd} = \begin{bmatrix} A_t^{fwd} & \frac{1}{2}p_{t,LB}^{fwd} \\ \frac{1}{2}p_{t,LB}^{fwd^T} & 0 \end{bmatrix}, \tilde{b}_t^{C_0,fwd} = \begin{bmatrix} b_t^{C_0,fwd} \\ \frac{1}{2}\ddot{r}_{t,LB}^{C_0} \end{bmatrix}, \tilde{b}_t^{C_1,fwd} = \begin{bmatrix} b_t^{C_1,fwd} \\ \frac{1}{2}\ddot{r}_{t,LB}^{C_1} \end{bmatrix};$$

```
    }
    else {
        construct
```
$\tilde{A}_t^{fwd}, \tilde{b}_t^{C_0,fwd}$ and $\tilde{b}_t^{C_1,fwd}$ as:

$$\tilde{A}_t^{fwd} = \begin{bmatrix} A_t^{fwd} & 0 \\ 0 & 0 \end{bmatrix}, \tilde{b}_t^{C_0,fwd} = \begin{bmatrix} b_t^{C_0,fwd} \\ 0 \end{bmatrix}, \tilde{b}_t^{C_1,fwd} = \begin{bmatrix} b_t^{C_1,fwd} \\ 0 \end{bmatrix};$$

```
}
```
$\tilde{A}_{sum}^{fwd} = \tilde{A}_{sum}^{fwd} + \tilde{A}_t^{fwd}; \tilde{b}_{sum}^{C_0,fwd} = \tilde{b}_{sum}^{C_0,fwd} + \tilde{b}_t^{C_0,fwd}; \tilde{b}_{sum}^{C_1,fwd} = \tilde{b}_{sum}^{C_1,fwd} + \tilde{b}_t^{C_1,fwd};$
```
    // STEP 1.4: construct backward reshaping MMR matrices
```
construct $A_t^{bwd}, b_t^{C_0,bwd}$ and $b_t^{C_1,bwd}$ from $\{\tilde{\Psi}_{t,Y,q_k}^{Q,SDR}\}, \{\tilde{\Psi}_{t,C_0,q_k}^{Q,SDR}\}, \{\tilde{\Psi}_{t,C_1,q_k}^{Q,SDR}\},$
$\{\tilde{\Psi}_{t,C_0,q_k}^{Q,EDR}\}, \{\tilde{\Psi}_{t,C_1,q_k}^{Q,EDR}\};$
```
    if ( letter_box_flag(t) == 1 ) {
        construct
```
$\tilde{A}_t^{bwd}, \tilde{b}_t^{C_0,bwd}$ and $\tilde{b}_t^{C_1,bwd}$ as:
$p_{t,LB}^{bwd^T} = [1 \; \ddot{r}_{t,LB}^Y \; \ddot{r}_{t,LB}^{C_0} \; \ddot{r}_{t,LB}^{C_1} \; \ddot{r}_{t,LB}^Y \cdot \ddot{r}_{t,LB}^{C_0} \; \ddot{r}_{t,LB}^Y \cdot \ddot{r}_{t,LB}^{C_1} \; \ldots ];$ $$\tilde{A}_t^{bwd} = \begin{bmatrix} A_t^{bwd} & \frac{1}{2}p_{t,LB}^{bwd} \\ \frac{1}{2}p_{t,LB}^{bwd^T} & 0 \end{bmatrix}, \tilde{b}_t^{C_0,bwd} = \begin{bmatrix} b_t^{C_0,bwd} \\ \frac{1}{2}\ddot{s}_{t,LB}^{C_0} \end{bmatrix}, \tilde{b}_t^{C_1,bwd} = \begin{bmatrix} b_t^{C_1,bwd} \\ \frac{1}{2}\ddot{s}_{t,LB}^{C_1} \end{bmatrix};$$

```
    }
    else {
        construct
```
$\tilde{A}_t^{bwd}, \tilde{b}_t^{C_0,bwd}$ and $\tilde{b}_t^{C_1,bwd}$ as:

$$\tilde{A}_t^{bwd} = \begin{bmatrix} A_t^{bwd} & 0 \\ 0 & 0 \end{bmatrix}, \tilde{b}_t^{C_0,bwd} = \begin{bmatrix} b_t^{C_0,bwd} \\ 0 \end{bmatrix}, \tilde{b}_t^{C_1,bwd} = \begin{bmatrix} b_t^{C_1,bwd} \\ 0 \end{bmatrix};$$

```
    }
```
$\tilde{A}_{sum}^{bwd} = \tilde{A}_{sum}^{bwd} + \tilde{A}_t^{bwd}; \tilde{b}_{sum}^{C_0,bwd} = \tilde{b}_{sum}^{C_0,bwd} + \tilde{b}_t^{C_0,bwd}; \tilde{b}_{sum}^{C_1,bwd} = \tilde{b}_{sum}^{C_1,bwd} + \tilde{b}_t^{C_1,bwd};$
```
}
// STEP 2: build luma reshaping functions
// STEP 2.1: compute sample points of each bin
for ( n = 0; n < Q; n++ ) {
    if ( 
```
$\tilde{h}_{sum}^{EDR}(n) > 0$ )
$\quad\tilde{v}_{sum}^{EDR}(n) = \tilde{v}_{sum}^{EDR}(n)/\tilde{h}_{sum}^{EDR}(n);$
```
    else
```
$$\tilde{v}_{sum}^{EDR}(n) = \frac{n + 0.5}{Q}; \quad \text{// bin mid-point}$$

```
    if ( 
```
$\tilde{h}_{sum}^{SDR}(n) > 0$ )
$\quad\tilde{v}_{sum}^{SDR}(n) = \tilde{v}_{sum}^{SDR}(n)/\tilde{h}_{sum}^{SDR}(n);$
```
    else
```

TABLE 9-continued $$\tilde{v}_{sum}^{SDR}(n) = \frac{n + 0.5}{Q}; \quad // \text{ bin mid-point}$$

}
// STEP 2.2 perform CDF matching
Obtain transfer function $F^Q(n)$ via CDF matching based on $\{\tilde{h}_{sum}^{EDR}(n)\}$ and $\{\tilde{h}_{sum}^{SDR}(n)\}$,
where the SDR sample point of each bin is $\{\tilde{v}_{sum}^{SDR}(n)\}$.
// STEP 2.3 perform interpolation
bi-linear interpolation from Q-bin $F^Q(n)$ to full $b_{EDR}$ –bit $F^{EDR}(\cdot)$, where the Q sample
points are $\{\tilde{v}_{sum}^{EDR}(n)\}$.
// STEP 2.4 perform smoothing to the non-flat region of the FLUT. Assume the start
point of the non-flat region is $x_1$, and the end point of the non-flat region is $x_2$.

$$FLUT(x) = \sum_{k=-W}^{W} \frac{1}{2W + 1} F^{EDR}(x + k) \quad \text{for } x = x_1, x_1 + 1, \ldots, x_2$$

// STEP 2.5 construct the backward reshaping LUT by tracking back FLUT.
//approximate histograms of HDR (or EDR) at each codeword using $\{\tilde{h}_{sum}^{EDR}(n)\}$:
for ( k = 0; k < $2^{b_{EDR}}$ ; k++ ){

$$n = \left\lfloor \frac{k}{2^{b_{EDR}}} \cdot Q \right\rfloor;$$

$$h_{sum}^{EDR}(k) = \frac{\tilde{h}_{sum}^{EDR}(n)}{Q};$$

}
Obtain BLUT using FLUT and $\{h_{sum}^{EDR}(k)\}$. (refer to Sec. II)
// STEP 3: compute MMR coefficients, check accuracy of letterbox chroma values
// STEP 3.1: forward reshaping MMR
$A_{sum}^{fwd} = \tilde{A}_{sum}^{fwd}$ (1: N −1, 1: N −1); // extract a submatrix of $\tilde{A}_{sum}^{fwd}$ by removing the last
row and the last column
$b_{sum}^{C0,fwd} = \tilde{b}_{sum}^{C0,fwd}$ (1: N −1); // extract a sub-vector of $\tilde{b}_{sum}^{C0,fwd}$ by removing the last row
$b_{sum}^{C1,fwd} = \tilde{b}_{sum}^{C1,fwd}$ (1: N −1); // extract a sub-vector of $\tilde{b}_{sum}^{C1,fwd}$ by removing the last row
// compute unconstrained MMR coefficients
$x^{C0,fwd} = (A_{sum}^{fwd})^{-1} b_{sum}^{C0,fwd}$;
$x^{C1,fwd} = (A_{sum}^{fwd})^{-1} b_{sum}^{C1,fwd}$;
flag = 0; // a flag indicating whether constrained MMR is required
for ( t = $t_a$; t <= $t_b$; t++ ) {
   if ( letter_box_flag(t) == 1 ) {
      $p_{t,LB}^{fwd T} = [1 \; \ddot{s}_{t,LB}^{Y} \; \ddot{s}_{t,LB}^{C0} \; \ddot{s}_{t,LB}^{C1} \; \ddot{s}_{t,LB}^{Y} \cdot \ddot{s}_{t,LB}^{C0} \; \ddot{s}_{t,LB}^{Y} \cdot \ddot{s}_{t,LB}^{C1} \ldots ]$ ;
      $v_{t,LB}^{C0} = p_{t,LB}^{fwd T} x_t^{C0,fwd}$;
      $v_{t,LB}^{C1} = p_{t,LB}^{fwd T} x_t^{C1,fwd}$;
      if ( ( $|v_{t,LB}^{C0} - \ddot{r}_{t,LB}^{C0}| > \Delta$ ) || ( $|v_{t,LB}^{C1} - \ddot{r}_{t,LB}^{C1}| > \Delta$ ) ){
         flag = 1;
         break;
      }
   }
}
// switch to constrained MMR
if ( flag == 1 ) {

$$\begin{bmatrix} x^{C_0,fwd} \\ \lambda^{C_0,fwd} \end{bmatrix} = (\tilde{A}_{sum}^{fwd})^{-1} \tilde{b}_{sum}^{C_0,fwd};$$

$$\begin{bmatrix} x^{C_1,fwd} \\ \lambda^{C_1,fwd} \end{bmatrix} = (\tilde{A}_{sum}^{fwd})^{-1} \tilde{b}_{sum}^{C_1,fwd};$$

}
// STEP 3.2: backward reshaping MMR
$A_{sum}^{bwd} = \tilde{A}_{sum}^{bwd}$ (1: N −1, 1: N −1); // extract a submatrix of $\tilde{A}_{sum}^{bwd}$ by removing the last
row and the last column
$b_{sum}^{C0,bwd} = \tilde{b}_{sum}^{C0,bwd}$ (1: N −1); // extract a sub-vector of $\tilde{b}_{sum}^{C0,bwd}$ by removing the last row
$b_{sum}^{C1,bwd} = \tilde{b}_{sum}^{C1,bwd}$ (1: N −1); // extract a sub-vector of $\tilde{b}_{sum}^{C1,bwd}$ by removing the last row
// compute unconstrained MMR coefficients
$x^{C0,bwd} = (A_{sum}^{bwd})^{-1} b_{sum}^{C0,bwd}$;
$x^{C1,bwd} = (A_{sum}^{bwd})^{-1} b_{sum}^{C1,bwd}$;
flag = 0; // a flag indicating whether constrained MMR is required
for ( t = $t_a$; t <= $t_b$; t++ ) {
   if ( letter_box_flag(t) == 1 ) {
      $p_{t,LB}^{bwd T} = [1 \; \ddot{r}_{t,LB}^{Y} \; \ddot{r}_{t,LB}^{C0} \; \ddot{r}_{t,LB}^{C1} \; \ddot{r}_{t,LB}^{Y} \cdot \ddot{r}_{t,LB}^{C0} \; \ddot{r}_{t,LB}^{Y} \cdot \ddot{r}_{t,LB}^{C1} \ldots ]$;
      $v_{t,LB}^{C0} = p_{t,LB}^{bwd T} x_t^{C0,bwd}$;
      $v_{t,LB}^{C1} = p_{t,LB}^{bwd T} x_t^{C0,bwd}$;

TABLE 9-continued

```
    if ( ( (|v_{t,LB}^{C0} - r̈_{t,LB}^{C0} |> Δ ) || (|v_{t,LB}^{C1} - r̈_{t,LB}^{C1} |> Δ ) ){
        flag = 1;
        break;
      }
    }
}
// switch to constrained MMR
if ( flag == 1 ) {
```

$$\begin{bmatrix} x^{C_0,bwd} \\ \lambda^{C_0,bwd} \end{bmatrix} = (\tilde{A}_{sum}^{bwd})^{-1} \tilde{b}_{sum}^{C_0,bwd};$$

$$\begin{bmatrix} x^{C_1,bwd} \\ \lambda^{C_1,bwd} \end{bmatrix} = (\tilde{A}_{sum}^{bwd})^{-1} \tilde{b}_{sum}^{C_1,bwd};$$

```
}
```

In some embodiments, as in the HFFR mode, in the HERR mode, linear and segment-based SLBC forward and/or backward reshaping operations are performed as a part of video encoding operations using statistics generated with sliding window operations based on three levels of sliding windows.

Example Process Flows

FIG. 4D illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 4002, an image processing device (e.g., coding block (120), etc.) generates three-dimensional (3D) mapping statistics for a first image of a first dynamic range and a second image that corresponds to the first image. The second image is of a second dynamic range different from the first dynamic range.

In block 4004, the image processing device generates multivariate multiple regression (MMR) coefficients by solving an optimization problem formulated using an MMR matrix built at least in part with the 3D mapping statistics without a letterbox constraint. The MMR coefficients are used to generate chroma mappings for predicting chroma codeword values of the second image.

In block 4006, the image processing device determines whether a letterbox exists in at least one of the first image or the second image.

In block 4008, in response to determining that a letterbox exists in at least one of the first image or the second image, the image processing device determines whether the chroma mappings generated from solving the unconstrained optimization problem accurately predict chroma codeword values in the second image.

In block 4010, the image processing device provides one of the first image or a third image approximating the second image to cause a reconstructed image generated by a recipient device at least by backward reshaping the one of the first image or a third image approximating the second image to be rendered by a display device operating in conjunction with the recipient device.

In an embodiment, the 3D mapping statistics is represented by a histogram with a plurality of bin partitions dynamic created according to minimum and maximum codeword values in each color channel of a color space in which one or both of the first image and the second image are represented.

In an embodiment, the 3D mapping statistics is represented by a histogram with a plurality of bin partitions; the image processing device is further configured to compute a set of centroids based on codewords belonging to each bin partition in the plurality of bin partitions.

In an embodiment, the third image is a forward reshaped standard dynamic range (SDR) image; the first image represents a source high dynamic range (HDR) image; the second image represents a reference SDR image that is generated from the source HDR image through content mapping.

In an embodiment, the second image represents a source high dynamic range (HDR) image; the first image represents a forward reshaped standard dynamic range (SDR) image that is generated from the source HDR image; the third image represents a reconstructed HDR image approximating the source HDR image; the reconstructed HDR image is generated from the forward reshaped SDR image through backward reshaping based on backward reshaping image metadata provided in a bitstream to the recipient device.

In an embodiment, the image processing device is further configured to perform: providing backward reshaping image metadata with the forward reshaped SDR image in a coded bitstream to a video decoder operating with the display device. The backward reshaping image metadata includes image metadata used by the video decoder to generate the chroma mappings to backward reshape chroma codeword values in the forward reshaped SDR image into reconstructed codeword values in the reconstructed HDR image.

In an embodiment, the image processing device is further configured to perform: in response to determining that a letterbox does not exist in at least one of the first image or the second image, using the chroma mappings generated by solving the unconstrained optimization problem to generate chroma codeword values in the second image.

In an embodiment, the image processing device is further configured to, in response to determining that the chroma mappings generated by solving the unconstrained optimization problem do not accurately predict chroma codeword values in the second image, perform: re-generating the chroma mappings from new MMR coefficients generated by solving a constrained optimization problem to obtain a set of MMR coefficients, the constrained optimization problem being formulated with (a) the unconstrained MMR matrix and (b) a specific letterbox constraint that relates specific letterbox chroma codeword values of the first dynamic range to specific letterbox chroma codeword values of the second dynamic range; using the chroma mappings re-generated from the new MMR coefficients to generate chroma codeword values in the third image.

In an embodiment, the 3D mapping statistics is generated at a per-pixel level using individual pixel values of (a) the first image representing a source image of the first dynamic range and (b) a reference image of the second dynamic range; the reference image of the second dynamic range is content mapped from the source image of the first dynamic range; the image processing device is further configured to perform: determining whether clipping exists in the reference image of the second dynamic range; in response to determining that clipping exists in the reference image of the second dynamic range, modifying the 3D mapping statistics by merging the 3D mapping statistics with trained 3D mapping statistics.

In an embodiment, the trained 3D mapping statistics are generated from a training dataset comprising first training image pairs of the first dynamic range and second training images of the second dynamic range.

In an embodiment, the trained 3D mapping statistics constitute a set of 3D mapping statistics selected from a plurality of sets of 3D mapping statistics based on a color space type and an electro-optical transfer function type.

In an embodiment, the 3D mapping statistics is generated at a sampled-point level using (a) sampled point pixel values of the first image representing a source image of the first dynamic range and (b) corresponding sampled point pixel values of the second dynamic range; the corresponding sampled point pixel values of the second dynamic range are content mapped from sampled point pixel values of the source image of the first dynamic range.

In an embodiment, the sampled point pixel values are those of sample points selecting using one or more of a 3D grid or a density distribution.

In an embodiment, the first image represents a source high dynamic range (HDR) image; the third image represents a forward reshaped standard dynamic range (SDR) image that is generated from the source HDR image through forward reshaping; the chroma mappings represent chroma forward reshaping mappings; the image processing device is further configured to perform: generating second MMR coefficients by solving a second optimization problem formulated using a second MMR matrix built at least in part with the 3D mapping statistics without a letterbox constraint, the second MMR coefficients being used to generate second chroma mappings for predicting reconstructed HDR chroma codeword values of a reconstructed HDR image that is to approximate the source HDR image; causing the reconstructed HDR image to be rendered by a display device.

In an embodiment, determining whether the chroma mappings generated from solving the unconstrained optimization problem are to be used to generate chroma codeword values in the second image including determining whether the chroma mappings predict letterbox chroma values of the second dynamic range with a specific range of tolerance as specified by one or more range thresholds.

In an embodiment, the 3D mapping statistics represent a set of frame-specific 3D mapping statistics for the first image.

In an embodiment, the first image is among a plurality of images of the first dynamic range that represent a scene; the MMR matrix is built with scene-specific 3D mapping statistics generated from a plurality of sets of frame-specific 3D mapping statistics for the plurality of images of the first dynamic range representing the scene.

In an embodiment, the MMR matrix is built with one or more sliding windows from a plurality of sets of frame-specific 3D mapping statistics for a plurality of images of the first dynamic range.

In an embodiment, the third image represents a forward reshaped image; the third image of the second dynamic range is provided to a video decoder operating with the display device in a single-layer-backward-compatible coded bitstream.

In an embodiment, at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, a standard dynamic range (SDR) color space, etc.

In an embodiment, at least one of the first image or the second image is encoded in a sequence of images of the same dynamic range in a video signal of a bit depth of one of 8, 9, 10, 11, 12, 13, 14, or 15+ bits.

FIG. 4E illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 4022, an image processing device (e.g., coding block (120), etc.) identifies, in one or more source HDR images, a set of one or more high dynamic range (HDR) luma codeword values that are mapped by luma forward reshaping mappings to a forward reshaped standard dynamic range (SDR) luma codeword value in one or more SDR images generated from the one or more source HDR images via forward reshaping based at least in part on the luma forward reshaping mappings.

In block 4024, the image processing device uses the set of one or more HDR luma codeword values to determine a weighted HDR luma codeword value.

In block 4026, the image processing device constructs backward reshaping mappings that comprise at least a backward reshaping luma mapping that maps the forward reshaped SDR luma codeword value to the weighted HDR luma codeword value. The backward reshaping mappings are used to backward reshape the one or more reshaped SDR images into one or more reconstructed HDR images to approximate the one or more source HDR images.

In block 4028, the image processing device causes backward reshaping image metadata generated at least in part from the backward reshaping mappings to be provided with the one or more forward reshaped images to a recipient device to render the one or more reconstructed HDR images.

In an embodiment, the luma forward reshaping mappings are built from matching an SDR cumulative density function (CDF) constructed from an SDR histogram generated from a distribution of content mapped SDR codeword values with an HDR CDF constructed from an HDR histogram generated from a distribution of source HDR codeword values that are used to generate the content mapped SDR codeword values through content mapping operations.

Figure 4F:
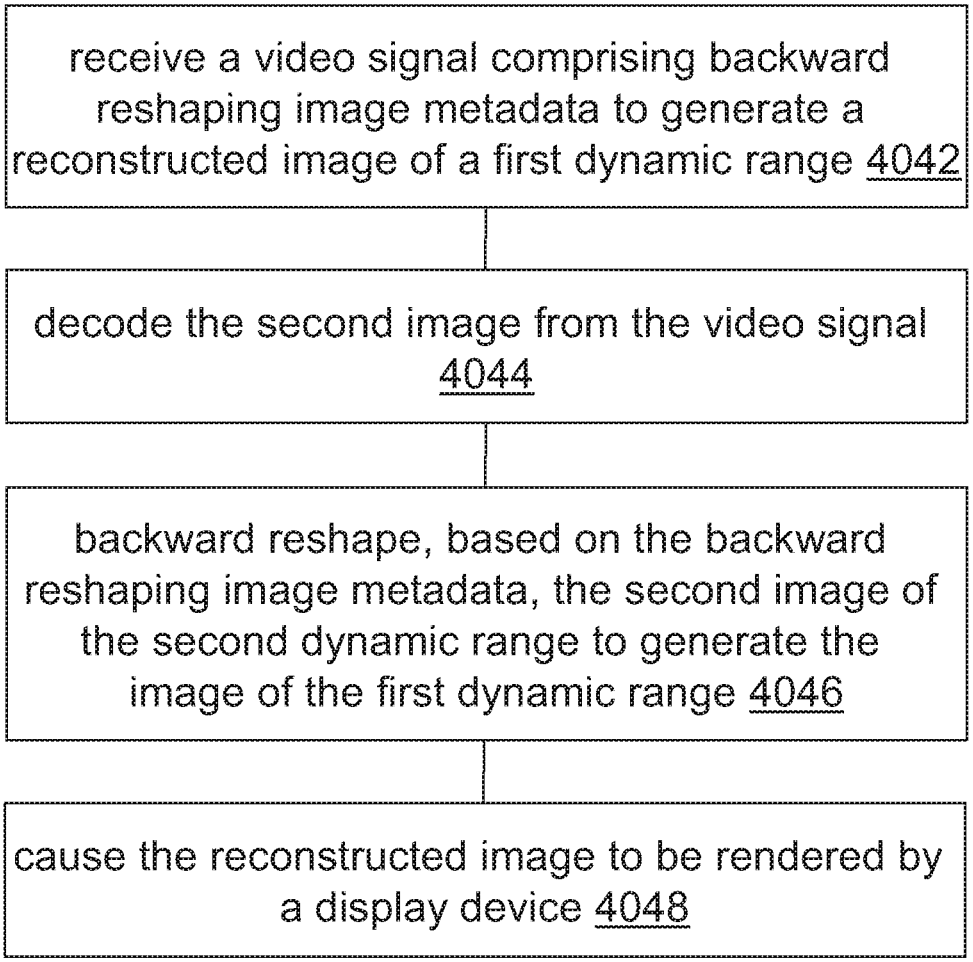

FIG. 4F illustrates an example process flow according to an embodiment of the present invention. In some embodiments, one or more computing devices or components (e.g., an encoding device/module, a transcoding device/module, a decoding device/module, an inverse tone mapping device/ module, a tone mapping device/module, a media device/module, etc.) may perform this process flow. In block 4042, an image processing device (e.g., decoding block (130), etc.) receives a video signal comprising backward reshaping image metadata to generate a reconstructed image of a first dynamic range. The reconstructed image is to approximate a first image of the first dynamic range. The reconstructed image is to be generated by backward reshaping, based on the backward reshaping image metadata, a second image of a second dynamic range different from the first dynamic range. The second image corresponds to the first image.

The backward reshaping image metadata comprises chroma mappings generated from multivariate multiple regression (MMR) coefficients. The MMR coefficients are generated by solving an optimization problem formulated using an MMR matrix built at least in part from three-dimensional (3D) mapping statistics that are generated for the first image and the second image that corresponds to the first image.

In block 4044, the image processing device decodes the second image from the video signal.

In block 4046, the image processing device backward reshapes, based on the backward reshaping image metadata, the second image of the second dynamic range to generate the reconstructed image of the first dynamic range.

In block 4048, the image processing device causes the reconstructed image to be rendered by a display device.

Figure 4G:
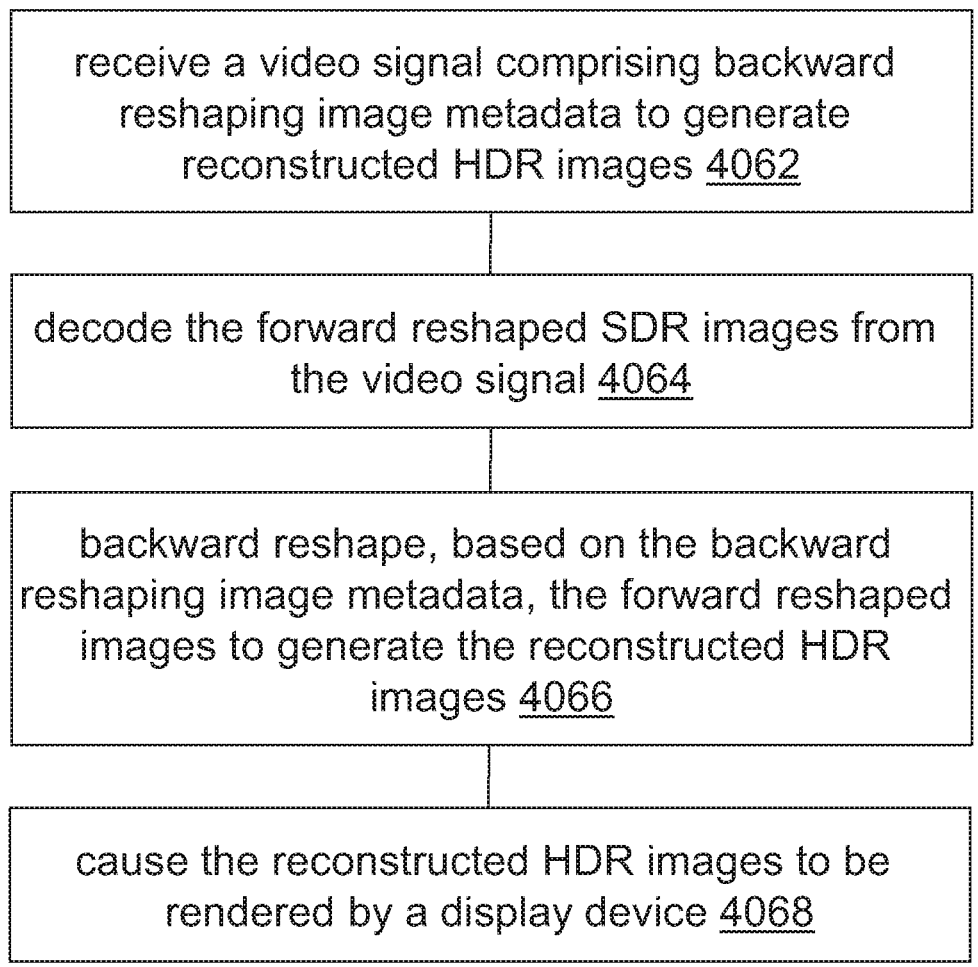

FIG. 4G illustrates an example process flow according to an embodiment of the present invention. In some embodiments, one or more computing devices or components (e.g., an encoding device/module, a transcoding device/module, a decoding device/module, an inverse tone mapping device/module, a tone mapping device/module, a media device/module, etc.) may perform this process flow. In block 4062, an image processing device (e.g., decoding block (130), etc.) receives a video signal comprising backward reshaping image metadata to generate one or more reconstructed high dynamic range (HDR) images. The one or more reconstructed HDR images are to approximate one or more source HDR images. The one or more reconstructed HDR images are to be generated by backward reshaping, based on the backward reshaping image metadata, one or more forward reshaped SDR images corresponding to the one or more source HDR images.

The backward reshaping image metadata is generated at least in part from backward reshaping mappings that comprise at least a backward reshaping luma mapping that maps a forward reshaped SDR luma codeword value in the one or more forward reshaped SDR images to a weighted HDR luma codeword value. A set of one or more HDR luma codeword values is used to determine the weighted HDR luma codeword value. The set of one or more HDR luma codeword values is identified in the one or more source HDR images. Each HDR luma codeword value in the set of one or more HDR luma codeword values in the one or more source HDR images is mapped by luma forward reshaping mappings to the forward reshaped SDR luma codeword value in the one or more forward reshaped SDR images. The one or more forward reshaped SDR images are generated from the one or more source HDR images via forward reshaping based at least in part on the luma forward reshaping mappings.

In block 4064, the image processing device decodes the one or more forward reshaped SDR images from the video signal.

In block 4066, the image processing device backward reshapes, based on the backward reshaping image metadata, the one or more forward reshaped images to generate the one or more reconstructed HDR images.

In block 4068, the image processing device causes the one or more reconstructed HDR images to be rendered by a display device.

In an embodiment, a computing device such as a display device, a mobile device, a set-top box, a multimedia device, etc., is configured to perform any of the foregoing methods. In an embodiment, an apparatus comprises a processor and is configured to perform any of the foregoing methods. In an embodiment, a non-transitory computer readable storage medium, storing software instructions, which when executed by one or more processors cause performance of any of the foregoing methods.

In an embodiment, a computing device comprising one or more processors and one or more storage media storing a set of instructions which, when executed by the one or more processors, cause performance of any of the foregoing methods.

Note that, although separate embodiments are discussed herein, any combination of embodiments and/or partial embodiments discussed herein may be combined to form further embodiments.

Example Computer System Implementation

Embodiments of the present invention may be implemented with a computer system, systems configured in electronic circuitry and components, an integrated circuit (IC) device such as a microcontroller, a field programmable gate array (FPGA), or another configurable or programmable logic device (PLD), a discrete time or digital signal processor (DSP), an application specific IC (ASIC), and/or apparatus that includes one or more of such systems, devices or components. The computer and/or IC may perform, control, or execute instructions relating to the adaptive perceptual quantization of images with enhanced dynamic range, such as those described herein. The computer and/or IC may compute any of a variety of parameters or values that relate to the adaptive perceptual quantization processes described herein. The image and video embodiments may be implemented in hardware, software, firmware and various combinations thereof.

Certain implementations of the invention comprise computer processors which execute software instructions which cause the processors to perform a method of the invention. For example, one or more processors in a display, an encoder, a set top box, a transcoder or the like may implement methods related to adaptive perceptual quantization of HDR images as described above by executing software instructions in a program memory accessible to the processors. The invention may also be provided in the form of a program product. The program product may comprise any non-transitory medium which carries a set of computer-readable signals comprising instructions which, when executed by a data processor, cause the data processor to execute a method of the invention. Program products according to the invention may be in any of a wide variety of forms. The program product may comprise, for example, physical media such as magnetic data storage media including floppy diskettes, hard disk drives, optical data storage media including CD ROMs, DVDs, electronic data storage media including ROMs, flash RAM, or the like. The computer-readable signals on the program product may optionally be compressed or encrypted.

Where a component (e.g. a software module, processor, assembly, device, circuit, etc.) is referred to above, unless otherwise indicated, reference to that component (including a reference to a "means") should be interpreted as including as equivalents of that component any component which performs the function of the described component (e.g., that is functionally equivalent), including components which are not structurally equivalent to the disclosed structure which performs the function in the illustrated example embodiments of the invention.

According to one embodiment, the techniques described herein are implemented by one or more special-purpose computing devices. The special-purpose computing devices may be hard-wired to perform the techniques, or may include digital electronic devices such as one or more application-specific integrated circuits (ASICs) or field programmable gate arrays (FPGAs) that are persistently programmed to perform the techniques, or may include one or more general purpose hardware processors programmed to perform the techniques pursuant to program instructions in firmware, memory, other storage, or a combination. Such special-purpose computing devices may also combine custom hard-wired logic, ASICs, or FPGAs with custom programming to accomplish the techniques. The special-purpose computing devices may be desktop computer systems, portable computer systems, handheld devices, networking devices or any other device that incorporates hard-wired and/or program logic to implement the techniques.

Figure 5:
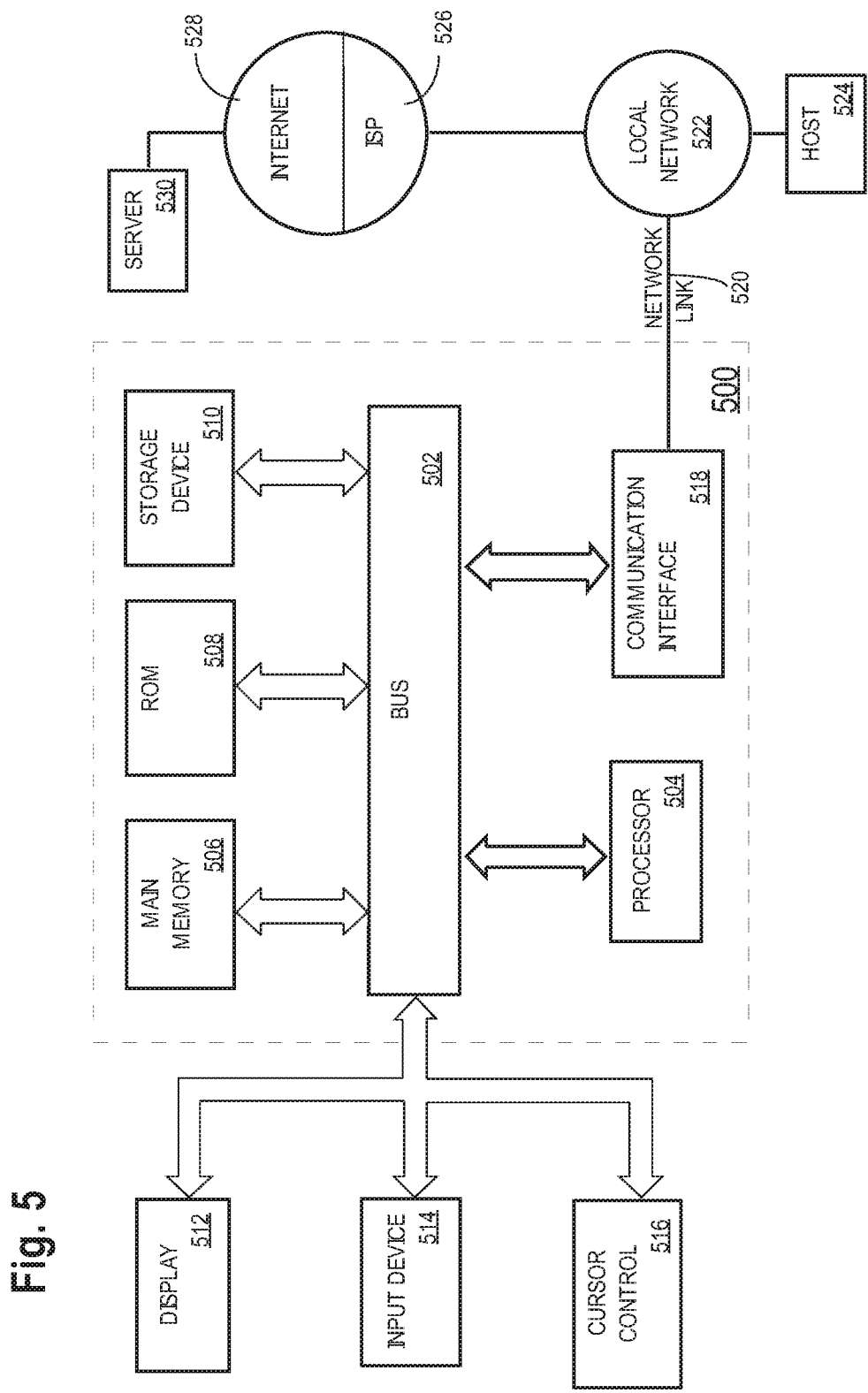
FIG. 5 illustrates a simplified block diagram of an example hardware platform on which a computer or a computing device as described herein may be implemented.

For example, FIG. 5 is a block diagram that illustrates a computer system 500 upon which an embodiment of the invention may be implemented. Computer system 500 includes a bus 502 or other communication mechanism for communicating information, and a hardware processor 504 coupled with bus 502 for processing information. Hardware processor 504 may be, for example, a general purpose microprocessor.

Computer system 500 also includes a main memory 506, such as a random access memory (RAM) or other dynamic storage device, coupled to bus 502 for storing information and instructions to be executed by processor 504. Main memory 506 also may be used for storing temporary variables or other intermediate information during execution of instructions to be executed by processor 504. Such instructions, when stored in non-transitory storage media accessible to processor 504, render computer system 500 into a special-purpose machine that is customized to perform the operations specified in the instructions.

Computer system 500 further includes a read only memory (ROM) 508 or other static storage device coupled to bus 502 for storing static information and instructions for processor 504. A storage device 510, such as a magnetic disk or optical disk, is provided and coupled to bus 502 for storing information and instructions.

Computer system 500 may be coupled via bus 502 to a display 512, such as a liquid crystal display, for displaying information to a computer user. An input device 514, including alphanumeric and other keys, is coupled to bus 502 for communicating information and command selections to processor 504. Another type of user input device is cursor control 516, such as a mouse, a trackball, or cursor direction keys for communicating direction information and command selections to processor 504 and for controlling cursor movement on display 512. This input device typically has two degrees of freedom in two axes, a first axis (e.g., x) and a second axis (e.g., y), that allows the device to specify positions in a plane.

Computer system 500 may implement the techniques described herein using customized hard-wired logic, one or more ASICs or FPGAs, firmware and/or program logic which in combination with the computer system causes or programs computer system 500 to be a special-purpose machine. According to one embodiment, the techniques as described herein are performed by computer system 500 in response to processor 504 executing one or more sequences of one or more instructions contained in main memory 506. Such instructions may be read into main memory 506 from another storage medium, such as storage device 510. Execution of the sequences of instructions contained in main memory 506 causes processor 504 to perform the process steps described herein. In alternative embodiments, hard-wired circuitry may be used in place of or in combination with software instructions.

The term "storage media" as used herein refers to any non-transitory media that store data and/or instructions that cause a machine to operation in a specific fashion. Such storage media may comprise non-volatile media and/or volatile media. Non-volatile media includes, for example, optical or magnetic disks, such as storage device 510. Volatile media includes dynamic memory, such as main memory 506. Common forms of storage media include, for example, a floppy disk, a flexible disk, hard disk, solid state drive, magnetic tape, or any other magnetic data storage medium, a CD-ROM, any other optical data storage medium, any physical medium with patterns of holes, a RAM, a PROM, and EPROM, a FLASH-EPROM, NVRAM, any other memory chip or cartridge.

Storage media is distinct from but may be used in conjunction with transmission media. Transmission media participates in transferring information between storage media. For example, transmission media includes coaxial cables, copper wire and fiber optics, including the wires that comprise bus 502. Transmission media can also take the form of acoustic or light waves, such as those generated during radio-wave and infra-red data communications.

Various forms of media may be involved in carrying one or more sequences of one or more instructions to processor 504 for execution. For example, the instructions may initially be carried on a magnetic disk or solid state drive of a remote computer. The remote computer can load the instructions into its dynamic memory and send the instructions over a telephone line using a modem. A modem local to computer system 500 can receive the data on the telephone line and use an infra-red transmitter to convert the data to an infra-red signal. An infra-red detector can receive the data carried in the infra-red signal and appropriate circuitry can place the data on bus 502. Bus 502 carries the data to main memory 506, from which processor 504 retrieves and executes the instructions. The instructions received by main memory 506 may optionally be stored on storage device 510 either before or after execution by processor 504.

Computer system 500 also includes a communication interface 518 coupled to bus 502. Communication interface 518 provides a two-way data communication coupling to a network link 520 that is connected to a local network 522. For example, communication interface 518 may be an integrated services digital network (ISDN) card, cable modem, satellite modem, or a modem to provide a data communication connection to a corresponding type of telephone line. As another example, communication interface 518 may be a local area network (LAN) card to provide a data communication connection to a compatible LAN. Wireless links may also be implemented. In any such implementation, communication interface 518 sends and receives electrical, electromagnetic or optical signals that carry digital data streams representing various types of information.

Network link 520 typically provides data communication through one or more networks to other data devices. For example, network link 520 may provide a connection through local network 522 to a host computer 524 or to data equipment operated by an Internet Service Provider (ISP) 526. ISP 526 in turn provides data communication services through the world wide packet data communication network now commonly referred to as the "Internet" 528. Local network 522 and Internet 528 both use electrical, electromagnetic or optical signals that carry digital data streams. The signals through the various networks and the signals on network link 520 and through communication interface 518, which carry the digital data to and from computer system 500, are example forms of transmission media.

Computer system 500 can send messages and receive data, including program code, through the network(s), network link 520 and communication interface 518. In the Internet example, a server 530 might transmit a requested code for an application program through Internet 528, ISP 526, local network 522 and communication interface 518.

The received code may be executed by processor 504 as it is received, and/or stored in storage device 510, or other non-volatile storage for later execution.

EQUIVALENTS, EXTENSIONS, ALTERNATIVES AND MISCELLANEOUS

In the foregoing specification, embodiments of the invention have been described with reference to numerous specific details that may vary from implementation to implementation. Thus, the sole and exclusive indicator of what is the invention, and is intended by the applicants to be the invention, is the set of claims that issue from this application, in the specific form in which such claims issue, including any subsequent correction. Any definitions expressly set forth herein for terms contained in such claims shall govern the meaning of such terms as used in the claims. Hence, no limitation, element, property, feature, advantage or attribute that is not expressly recited in a claim should limit the scope of such claim in any way. The specification and drawings are, accordingly, to be regarded in an illustrative rather than a restrictive sense.

Various aspects of the present invention may be appreciated from the following enumerated example embodiments (EEEs):

EEE1. A method for encoding image data, the method comprising:
generating three-dimensional (3D) mapping statistics for a first image of a first dynamic range and a second image that corresponds to the first image, wherein the second image is of a second dynamic range different from the first dynamic range;
generating multivariate multiple regression (MMR) coefficients by solving an optimization problem formulated using an MMR matrix built at least in part with the 3D mapping statistics without a letterbox constraint, wherein the MMR coefficients are used to generate chroma mappings for predicting chroma codeword values of the second image;
determining whether a letterbox exists in at least one of the first image or the second image;
in response to determining that a letterbox exists in at least one of the first image or the second image, determining whether the chroma mappings generated from solving the unconstrained optimization problem accurately predict chroma codeword values in the second image;
providing one of the first image or a third image approximating the second image to a recipient device to cause a reconstructed image to be generated by the recipient device at least by backward reshaping the one of the first image or a third image approximating the second image to be rendered by a display device.

EEE2. The method of EEE 1, wherein the third image is a forward reshaped standard dynamic range (SDR) image, wherein the first image represents a source high dynamic range (HDR) image, and wherein the second image represents a reference SDR image that is generated from the source HDR image through content mapping.

EEE3. The method of EEE 1, wherein the second image represents a source high dynamic range (HDR) image, wherein the first image represents a forward reshaped standard dynamic range (SDR) image that is generated from the source HDR image, wherein the third image represents a reconstructed HDR image approximating the source HDR image, and where the reconstructed HDR image is generated from the forward reshaped SDR image through backward reshaping based on backward reshaping image metadata provided in a bitstream to the recipient device.

EEE4. The method of EEE 3, further comprising: providing backward reshaping image metadata with the forward reshaped SDR image in a coded bitstream to a video decoder operating with the display device, wherein the backward reshaping image metadata includes image metadata used by the video decoder to generate the chroma mappings to backward reshape chroma codeword values in the forward reshaped SDR image into reconstructed codeword values in the reconstructed HDR image.

EEE5. The method of any of EEEs 1-4, further comprising: in response to determining that a letterbox does not exist in at least one of the first image or the second image, using the chroma mappings generated by solving the unconstrained optimization problem to generate chroma codeword values in the second image.

EEE6. The method of any of EEEs 1-5, further comprising: in response to determining that the chroma mappings generated by solving the unconstrained optimization problem do not accurately predict chroma codeword values in the second image, performing
re-generating the chroma mappings from new MMR coefficients generated by solving a constrained optimization problem to obtain a set of MMR coefficients, wherein the constrained optimization problem is formulated with (a) the unconstrained MMR matrix and (b) a specific letterbox constraint that relates specific letterbox chroma codeword values of the first dynamic range to specific letterbox chroma codeword values of the second dynamic range;
using the chroma mappings re-generated from the new MMR coefficients to generate chroma codeword values in the third image.

EEE7. The method of any of EEEs 1-6, wherein the 3D mapping statistics is generated at a per-pixel level using individual pixel values of (a) the first image representing a source image of the first dynamic range and (b) a reference image of the second dynamic range; wherein the reference image of the second dynamic range is content mapped from the source image of the first dynamic range; the method further comprising:
determining whether clipping exists in the reference image of the second dynamic range; in response to determining that clipping exists in the reference image of the second dynamic range, modifying the 3D mapping statistics by merging the 3D mapping statistics with trained 3D mapping statistics.

EEE8. The method of EEE 7, wherein the trained 3D mapping statistics are generated from a training dataset comprising first training images of the first dynamic range and second training images of the second dynamic range.

EEE9. The method of EEE 7, wherein the trained 3D mapping statistics constitute a set of 3D mapping statistics selected from a plurality of sets of 3D mapping statistics based on a color space type and an electro-optical transfer function type.

EEE10. The method of any of EEEs 1-6, wherein the 3D mapping statistics is generated at a sampled-point level using (a) sampled point pixel values of the first image representing a source image of the first dynamic range and (b) corresponding sampled point pixel values of the second dynamic range; wherein the corresponding sampled point pixel values of the second dynamic range are content mapped from sampled point pixel values of the source image of the first dynamic range.

EEE11. The method of EEE 10, wherein the sampled point pixel values are those of sample points selecting using one or more of a 3D grid or a density distribution.

EEE12. The method of EEE 10 or EEE 11, wherein the first image represents a source high dynamic range (HDR) image, and wherein the third image represents a forward reshaped standard dynamic range (SDR) image that is generated from the source HDR image through forward reshaping; wherein the chroma mappings represent chroma forward reshaping mappings; the method further comprising:
generating second MMR coefficients by solving a second optimization problem formulated using a second MMR matrix built at least in part with the 3D mapping statistics without a letterbox constraint, wherein the second MMR coefficients are used to generate second chroma mappings for predicting reconstructed HDR chroma codeword values of a reconstructed HDR image that is to approximate the source HDR image;
causing the reconstructed HDR image to be rendered by a display device.

EEE13. The method of any of EEEs 1-12, wherein determining whether the chroma mappings generated from solving the unconstrained optimization problem are to be used to generate chroma codeword values in the second image includes determining whether the chroma mappings predict letterbox chroma values of the second dynamic range with a specific range of tolerance as specified by one or more range thresholds.

EEE14. The method of any of EEEs 1-13, wherein the 3D mapping statistics represent a set of frame-specific 3D mapping statistics for the first image.

EEE15. The method of any of EEEs 1-14, wherein the first image is among a plurality of images of the first dynamic range that represent a scene; wherein the MMR matrix is built with scene-specific 3D mapping statistics generated from a plurality of sets of frame-specific 3D mapping statistics for the plurality of images of the first dynamic range representing the scene.

EEE16. The method of any of EEEs 1-15, wherein the MMR matrix is built with one or more sliding windows from a plurality of sets of frame-specific 3D mapping statistics for a plurality of images of the first dynamic range.

EEE17. The method of any of EEEs 1-16, wherein the third image represents a forward reshaped image, and wherein the third image of the second dynamic range is provided to a video decoder operating with the display device in a single-layer-backward-compatible coded bitstream.

EEE18. The method of any of EEEs 1-17, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

EEE19. The method of any of EEEs 1-18, wherein at least one of the first image or the second image is encoded in a sequence of images of the same dynamic range in a video signal of a bit depth of one of 8, 9, 10, 11, 12, 13, 14, or 15+ bits.

EEE20. The method of any of EEEs 1-19, wherein the 3D mapping statistics is represented by a histogram with a plurality of bin partitions dynamic created according to minimum and maximum codeword values in each color channel of a color space in which one or both of the first image and the second image are represented.

EEE21. The method of any of EEEs 1-20, wherein the 3D mapping statistics is represented by a histogram with a plurality of bin partitions; the method further comprising computing a set of centroids based on codewords belonging to each bin partition in the plurality of bin partitions.

EEE22. A method for encoding image data, the method comprising:
identifying, in one or more source high dynamic range (HDR) images, a set of one or more HDR luma codeword values that are mapped by luma forward reshaping mappings to a forward reshaped standard dynamic range (SDR) luma codeword value in one or more SDR images generated from the one or more source HDR images via forward reshaping based at least in part on the luma forward reshaping mappings;
using the set of one or more HDR luma codeword values to determine a weighted HDR luma codeword value;
constructing backward reshaping mappings that comprise at least a backward reshaping luma mapping that maps the forward reshaped SDR luma codeword value to the weighted HDR luma codeword value, wherein the backward reshaping mappings are used to backward reshape the one or more reshaped SDR images into one or more reconstructed HDR images to approximate the one or more source HDR images;
causing backward reshaping image metadata generated at least in part from the backward reshaping mappings to be provided with the one or more forward reshaped images to a recipient device to render the one or more reconstructed HDR images.

EEE23. The method of EEE 22, wherein the luma forward reshaping mappings are built from matching an SDR cumulative density function (CDF) constructed from an SDR histogram generated from a distribution of content mapped SDR codeword values with an HDR CDF constructed from an HDR histogram generated from a distribution of source HDR codeword values that are used to generate the content mapped SDR codeword values through content mapping operations.

EEE24. A method for decoding image data, the method comprising:
receiving a video signal comprising backward reshaping image metadata to generate a reconstructed image of a first dynamic range, wherein the reconstructed image is to approximate a first image of the first dynamic range, wherein the reconstructed image is to be generated by backward reshaping, based on the backward reshaping image metadata, a second image of a second dynamic range different from the first dynamic range, wherein the second image corresponds to the first image;
wherein the backward reshaping image metadata comprises chroma mappings generated from multivariate multiple regression (MMR) coefficients, wherein the MMR coefficients are generated by solving an optimization problem formulated using an MMR matrix built at least in part from three-dimensional (3D) mapping statistics that are generated for the first image and the second image that corresponds to the first image;

decoding the second image from the video signal;

backward reshaping, based on the backward reshaping image metadata, the second image of the second dynamic range to generate the reconstructed image of the first dynamic range; causing the reconstructed image to be rendered by a display device.

EEE25. A method for decoding image data, the method comprising:

receiving a video signal comprising backward reshaping image metadata to generate one or more reconstructed high dynamic range (HDR) images, wherein the one or more reconstructed HDR images are to approximate one or more source HDR images, wherein the one or more reconstructed HDR images are to be generated by backward reshaping, based on the backward reshaping image metadata, one or more forward reshaped SDR images corresponding to the one or more source HDR images;

wherein the backward reshaping image metadata is generated at least in part from backward reshaping mappings that comprise at least a backward reshaping luma mapping that maps a forward reshaped SDR luma codeword value in the one or more forward reshaped SDR images to a weighted HDR luma codeword value, wherein a set of one or more HDR luma codeword values is used to determine the weighted HDR luma codeword value, wherein the set of one or more HDR luma codeword values is identified in the one or more source HDR images, wherein each HDR luma codeword value in the set of one or more HDR luma codeword values in the one or more source HDR images is mapped by luma forward reshaping mappings to the forward reshaped SDR luma codeword value in the one or more forward reshaped SDR images, wherein the one or more forward reshaped SDR images are generated from the one or more source HDR images via forward reshaping based at least in part on the luma forward reshaping mappings;

decoding the one or more forward reshaped SDR images from the video signal;

backward reshaping, based on the backward reshaping image metadata, the one or more forward reshaped images to generate the one or more reconstructed HDR images;

causing the one or more reconstructed HDR images to be rendered by a display device.

EEE26. A computer system configured to perform any one of the methods recited in EEEs 1-25.

EEE27. An apparatus comprising a processor and configured to perform any one of the methods recited in EEEs 1-25.

EEE28. A non-transitory computer-readable storage medium having stored thereon computer-executable instruction for executing a method in accordance with any of the EEEs 1-25.

EEE29. A computer program product having instructions which, when executed by a computing device or system, cause said computing device or system to perform the method according to any of the EEEs 1-25.

What is claimed is:

1. A method for encoding image data, the method comprising:

generating three-dimensional (3D) color space mapping statistics represented by a histogram with a plurality of bin partitions for each color channel for a first image of a first dynamic range and a second image that corresponds to the first image, wherein the second image is of a second dynamic range different from the first dynamic range;

generating multivariate multiple regression (MMR) coefficients to generate chroma mappings for predicting chroma codeword values of the second image, wherein the MMR coefficients are generated by solving an unconstrained least-squares problem formulated using an MMR matrix built at least in part with the 3D color space mapping statistics without a letterbox constraint that relates specific letterbox chroma codeword values of the first dynamic range to specific letterbox chroma codeword values of the second dynamic range;

determining whether a letterbox exists in at least one of the first image or the second image;

in response to determining that a letterbox exists in at least one of the first image or the second image, determining whether the chroma mappings generated from solving the unconstrained least-squares problem accurately predict chroma codeword values in the second image based on one or more accuracy thresholds;

in response to determining that a letterbox does not exist in at least one of the first image or the second image, using the chroma mappings generated by solving the unconstrained optimization problem to generate chroma codeword values in the second image;

in response to determining that the chroma mappings generated by solving the unconstrained least-squares problem do not accurately predict chroma codeword values in the second image, performing re-generating the chroma mappings from new MMR coefficients generated by solving a constrained least-squares problem to obtain a set of MMR coefficients, wherein the constrained least-squares problem is formulated with (a) the unconstrained MMR matrix and (b) the letterbox constraint;

using the chroma mappings re-generated from the new MMR coefficients to generate chroma codeword values in a third image approximating the second image; and providing the first image to a recipient device.

2. A method for encoding image data, the method comprising:

generating three-dimensional (3D) color space mapping statistics represented by a histogram with a plurality of bin partitions for each color channel for a first image of a first dynamic range and a second image that corresponds to the first image, wherein the second image is of a second dynamic range different from the first dynamic range;

generating multivariate multiple regression (MMR) coefficients to generate chroma mappings for predicting chroma codeword values of the second image, wherein the MMR coefficients are generated by solving an unconstrained least-squares problem formulated using an MMR matrix built at least in part with the 3D color space mapping statistics without a letterbox constraint that relates specific letterbox chroma codeword values of the first dynamic range to specific letterbox chroma codeword values of the second dynamic range;

determining whether a letterbox exists in at least one of the first image or the second image;

in response to determining that a letterbox exists in at least one of the first image or the second image, determining whether the chroma mappings generated from solving the unconstrained least-squares problem accurately predict chroma codeword values in the second image based on one or more accuracy thresholds;

in response to determining that a letterbox does not exist in at least one of the first image or the second image, using the chroma mappings generated by solving the unconstrained optimization problem to generate chroma codeword values in the second image;

in response to determining that the chroma mappings generated by solving the unconstrained least-squares problem do not accurately predict chroma codeword values in the second image, performing re-generating the chroma mappings from new MMR coefficients generated by solving a constrained least-squares problem to obtain a set of MMR coefficients, wherein the constrained least-squares problem is formulated with (a) the unconstrained MMR matrix and (b) the letterbox constraint;

using the chroma mappings re-generated from the new MMR coefficients to generate chroma codeword values in a third image approximating the second image; and providing the third image approximating the second image and metadata for the chroma mappings to a recipient device to cause a reconstructed image to be generated by the recipient device at least by backward reshaping.

3. The method of claim 2, wherein the third image is a forward reshaped standard dynamic range (SDR) image, wherein the first image represents a source high dynamic range (HDR) image, and wherein the second image represents a reference SDR image that is generated from the source HDR image through content mapping.

4. The method of claim 1, wherein the second image represents a source high dynamic range (HDR) image, wherein the first image represents a forward reshaped standard dynamic range (SDR) image that is generated from the source HDR image, wherein the third image represents a reconstructed HDR image approximating the source HDR image, and where the reconstructed HDR image is generated from the forward reshaped SDR image through backward reshaping based on backward reshaping image metadata provided in a bitstream to the recipient device.

5. The method of claim 1, further comprising:
in response to determining that the chroma mappings generated by solving the unconstrained least-squares problem do accurately predict chroma codeword values in the second image, using the chroma mappings to generate chroma codewords in the third image.

6. The method of claim 1, wherein the 3D color space mapping statistics is generated at a per-pixel level using individual pixel values of (a) the first image representing a source image of the first dynamic range and (b) a reference image of the second dynamic range; wherein the reference image of the second dynamic range is content mapped from the source image of the first dynamic range; the method further comprising:
determining whether clipping exists in the reference image of the second dynamic range;
in response to determining that clipping exists in the reference image of the second dynamic range, modifying the 3D color space mapping statistics by merging the 3D color space mapping statistics with trained 3D color space mapping statistics.

7. The method of claim 6, wherein the trained 3D color space mapping statistics are generated from a training dataset comprising pairs of first training images of the first dynamic range and second training images of the second dynamic range.

8. The method of claim 1, wherein the 3D color space mapping statistics is generated at a sampled-point level using (a) sampled point pixel values of the first image representing a source image of the first dynamic range and (b) corresponding sampled point pixel values of the second dynamic range; wherein the corresponding sampled point pixel values of the second dynamic range are content mapped from sampled point pixel values of the source image of the first dynamic range.

9. The method of claim 8, wherein the sampled point pixel values are those of sample points selected using one or more of a 3D grid or a density distribution.

10. The method of claim 1, wherein the first image is among a plurality of images of the first dynamic range that represent a scene; wherein the MMR matrix is built with scene-specific 3D color space mapping statistics generated from a plurality of sets of frame-specific 3D color space mapping statistics for the plurality of images of the first dynamic range representing the scene.

11. The method of claim 1, wherein the MMR matrix is built with one or more sliding windows from a plurality of sets of frame-specific 3D color space mapping statistics for a plurality of images of the first dynamic range.

12. The method of claim 1, wherein the plurality of bin partitions is dynamically created according to minimum and maximum codeword values in each color channel of a color space in which one or both of the first image and the second image are represented.

13. The method of claim 1, wherein the method further comprises computing a set of centroids based on codewords belonging to each bin partition in the plurality of bin partitions.

14. The method of claim 4, further comprising: providing backward reshaping image metadata with the forward reshaped SDR image in a coded bitstream to a video decoder operating with the display device, wherein the backward reshaping image metadata includes image metadata used by the video decoder to generate the chroma mappings to backward reshape chroma codeword values in the forward reshaped SDR image into reconstructed codeword values in the reconstructed HDR image.

15. The method of claim 6, wherein the first image represents a source high dynamic range (HDR) image, and wherein the third image represents a forward reshaped standard dynamic range (SDR) image that is generated from the source HDR image through forward reshaping; wherein the chroma mappings represent chroma forward reshaping mappings; the method further comprising:
generating second MMR coefficients by solving a second optimization problem formulated using a second MMR matrix built at least in part with the 3D color space mapping statistics without the letterbox constraint, wherein the second MMR coefficients are used to generate second chroma mappings for predicting reconstructed HDR chroma codeword values of a reconstructed HDR image that is to approximate the source HDR image;
causing the reconstructed HDR image to be rendered by a display device.

16. The method of claim 1, wherein determining whether the chroma mappings generated from solving the unconstrained optimization problem are to be used to generate chroma codeword values in the second image includes determining whether the chroma mappings predict letterbox chroma values of the second dynamic range with a specific range of tolerance as specified by one or more range thresholds.

17. The method of claim 1, wherein the 3D color space mapping statistics represent a set of frame-specific 3D color space mapping statistics for the first image.

18. The method of claim 1, wherein the third image represents a forward reshaped image, and wherein the third image of the second dynamic range is provided to a video decoder operating with the display device in a single-layer-backward-compatible coded bitstream.

19. The method of claim 1, wherein at least one of the first or the second images are represented in one of: an IPT PQ (ICtCp) color space, an YCbCr color space, an RGB color space, a Rec. 2020 color space, a Rec. 709 color space, an extended dynamic range (EDR) color space, a gamma/HLG/PQ color space, or a standard dynamic range (SDR) color space.

20. The method of claim 1, wherein at least one of the first image or the second image is encoded in a sequence of images of the same dynamic range in a video signal of a bit depth of one of 8, 9, 10, 11, 12, 13, 14, or 15+ bits.

21. The method of claim 1, wherein the plurality of bin partitions are dynamically created according to minimum and maximum codeword values in each color channel of a color space in which one or both of the first image and the second image are represented.

22. A method for decoding image data, the method comprising:
receiving a video signal comprising backward reshaping image metadata to generate a reconstructed image of a first dynamic range, wherein the reconstructed image is to approximate a first image of the first dynamic range, wherein the reconstructed image is to be generated by backward reshaping, based on the backward reshaping image metadata, a second image of a second dynamic range different from the first dynamic range, wherein the second image corresponds to the first image;
wherein the backward reshaping image metadata comprises chroma mappings generated from multivariate multiple regression (MMR) coefficients, wherein the MMR coefficients are generated by solving a least-squares problem formulated using an MMR matrix built at least in part from three-dimensional (3D) color space mapping statistics that are generated for the first image and the second image that corresponds to the first image;
decoding the second image from the video signal;
backward reshaping, based on the backward reshaping image metadata, the second image of the second dynamic range to generate the reconstructed image of the first dynamic range;
causing the reconstructed image to be rendered by a display device.

23. The method of claim 22, wherein the luma forward reshaping mappings are built from matching an SDR cumulative density function (CDF) constructed from an SDR histogram generated from a distribution of content mapped SDR codeword values with an HDR CDF constructed from an HDR histogram generated from a distribution of source HDR codeword values that are used to generate the content mapped SDR codeword values through content mapping operations.

24. A method for decoding image data, the method comprising:
receiving a video signal comprising backward reshaping image metadata to generate one or more reconstructed high dynamic range (HDR) images, wherein the one or more reconstructed HDR images are to approximate one or more source HDR images, wherein the one or more reconstructed HDR images are to be generated by backward reshaping, based on the backward reshaping image metadata, one or more forward reshaped SDR images corresponding to the one or more source HDR images;
wherein the backward reshaping image metadata is generated at least in part from backward reshaping mappings that comprise at least a backward reshaping luma mapping that maps a forward reshaped SDR luma codeword value in the one or more forward reshaped SDR images to a weighted HDR luma codeword value, wherein a set of one or more HDR luma codeword values is used to determine the weighted HDR luma codeword value, wherein the set of one or more HDR luma codeword values is identified in the one or more source HDR images, wherein each HDR luma codeword value in the set of one or more HDR luma codeword values in the one or more source HDR images is mapped by luma forward reshaping mappings to the forward reshaped SDR luma codeword value in the one or more forward reshaped SDR images, wherein the one or more forward reshaped SDR images are generated from the one or more source HDR images via forward reshaping based at least in part on the luma forward reshaping mappings;
decoding the one or more forward reshaped SDR images from the video signal; backward reshaping, based on the backward reshaping image metadata, the one or more forward reshaped images to generate the one or more reconstructed HDR images;
causing the one or more reconstructed HDR images to be rendered by a display device.

25. A computer system configured to perform the method recited in claim 1.

26. An apparatus comprising a processor and configured to perform the method recited in claim 1.

27. A non-transitory computer-readable storage medium having stored thereon computer-executable instruction for executing a method in accordance with claim 1.

* * * * *